US010222060B2

(12) United States Patent
Chandran et al.

(10) Patent No.: US 10,222,060 B2
(45) Date of Patent: Mar. 5, 2019

(54) TWO-STAGE ENERGY-INTEGRATED PRODUCT GAS GENERATION SYSTEM AND METHOD

(71) Applicant: ThermoChem Recovery International, Inc., Baltimore, MD (US)

(72) Inventors: Ravi Chandran, Ellicott City, MD (US); Daniel A. Burciaga, Manchester, MD (US); Daniel Michael Leo, Baltimore, MD (US); Shawn Robert Freitas, Corvallis, OR (US); Dave G. Newport, Cumberland, ME (US); Justin Kevin Miller, Durham, NC (US); Kaitlin Emily Harrington, Hillsborough, NC (US); Brian Christopher Attwood, Cary, NC (US)

(73) Assignee: ThermoChem Recovery International, Inc., Baltimore, MD (US)

( * ) Notice: Subject to any disclaimer, the term of this patent is extended or adjusted under 35 U.S.C. 154(b) by 0 days.

(21) Appl. No.: 16/100,258

(22) Filed: Aug. 10, 2018

(65) Prior Publication Data

US 2018/0347810 A1    Dec. 6, 2018

Related U.S. Application Data

(63) Continuation of application No. PCT/US2016/018117, filed on Feb. 16, 2016.

(51) Int. Cl.
*F23G 5/30* (2006.01)
*F23G 5/00* (2006.01)
(Continued)

(52) U.S. Cl.
CPC .............. *F23G 5/30* (2013.01); *F23G 5/006* (2013.01); *B01J 8/1809* (2013.01); *B01J 8/1818* (2013.01);
(Continued)

(58) Field of Classification Search
CPC ...... C07C 29/1518; C10J 3/721; C01B 3/382; C01B 2203/142; F23C 10/005; F23C 10/10; B01J 8/26
See application file for complete search history.

(56) References Cited

U.S. PATENT DOCUMENTS 2,603,608 A    7/1952    Lewis et al.
2,619,124 A    11/1952   Bertin et al.
(Continued)

FOREIGN PATENT DOCUMENTS

| CA | 975643 | 10/1975 |
| CA | 2820091 A1 | 2/2010 |
| CN | 2319410 | 5/1999 |
| EP | 2275513 | 1/2011 |
| GB | 1395953 A | 5/1975 |
| WO | WO 93/23709 | 11/1993 |
| WO | WO 00/69994 | 11/2000 |
| WO | WO 03/013714 A1 | 2/2003 |
| WO | WO 2006/071109 | 7/2006 |
| WO | WO 2006/100572 | 9/2006 |
| WO | WO 2007/117590 A2 | 10/2007 |
| WO | WO 2010/096626 A1 | 8/2010 |

OTHER PUBLICATIONS

Hall et al., "Installation and Operation of Sorbathene Solvent Vapor Recovery Units to Recover and Recycle Volatile Organic Compounds at Operating Sites Within the Dow Chemical Company," Proceedings from the Sixteenth National Industrial Energy Technology Converence, Houston, TX (Apr. 13-14, 1994).
(Continued)

*Primary Examiner* — Imran Akram
(74) *Attorney, Agent, or Firm* — Womble Bond Dickinson (US) LLP

(57) ABSTRACT

A multi-stage product gas generation system converts a carbonaceous material, such as municipal solid waste, into a product gas which may subsequently be converted into a
(Continued)

liquid fuel or other material. One or more reactors containing bed material may be used to conduct reactions to effect the conversions. Unreacted inert feedstock contaminants present in the carbonaceous material may be separated from bed material using a portion of the product gas. A heat transfer medium collecting heat from a reaction in one stage may be applied as a reactant input in another, earlier stage.

30 Claims, 34 Drawing Sheets

(51) Int. Cl.
B01J 8/18 (2006.01)
B01J 8/26 (2006.01)
(52) U.S. Cl.
CPC ............ B01J 8/1872 (2013.01); B01J 8/26 (2013.01); B01J 2208/00132 (2013.01); F23G 2200/00 (2013.01); F23G 2202/101 (2013.01); F23G 2202/103 (2013.01); F23G 2202/50 (2013.01); F23G 2203/503 (2013.01); F23G 2206/10 (2013.01)

(56) References Cited

U.S. PATENT DOCUMENTS

| | | |
|---|---|---|
| 2,642,895 A | 6/1953 | Bertin et al. |
| 2,670,011 A | 2/1954 | Bertin et al. |
| 2,680,065 A | 6/1954 | Atwell |
| 2,727,535 A | 12/1955 | Linderoth |
| 2,795,931 A | 6/1957 | Foll |
| 2,812,635 A | 11/1957 | Foll et al. |
| 2,825,203 A | 3/1958 | Bertin et al. |
| 2,903,416 A | 9/1959 | Metrailer |
| 2,912,821 A | 11/1959 | Horak |
| 2,929,774 A | 3/1960 | Smith |
| 3,039,955 A | 6/1962 | Honnold, Jr. |
| 3,674,409 A | 7/1972 | Desty et al. |
| 3,840,354 A | 10/1974 | Donath |
| 3,844,733 A | 10/1974 | Donath |
| 3,853,498 A | 12/1974 | Bailie |
| 3,894,562 A | 7/1975 | Moseley, Jr. et al. |
| 3,910,494 A | 10/1975 | Melton, Jr. |
| 3,927,996 A | 12/1975 | Knudsen et al. |
| 3,954,380 A | 5/1976 | Valaev et al. |
| 3,957,458 A | 5/1976 | Squires |
| 3,976,592 A | 8/1976 | Lacey et al. |
| 4,061,562 A | 12/1977 | McKinney et al. |
| 4,069,024 A | 1/1978 | Fernandes |
| 4,078,973 A | 3/1978 | Choi et al. |
| 4,080,149 A | 3/1978 | Wolfe |
| 4,097,361 A | 6/1978 | Ashworth |
| 4,105,545 A | 8/1978 | Muller et al. |
| 4,219,402 A | 8/1980 | DeGeorge |
| 4,279,710 A | 7/1981 | Coughlin |
| 4,300,916 A | 11/1981 | Frewer et al. |
| 4,347,064 A | 8/1982 | Reh et al. |
| 4,356,151 A | 10/1982 | Woebcke et al. |
| 4,359,326 A | 11/1982 | Hoffert et al. |
| 4,370,858 A * | 2/1983 | Awerbuch ............ B01D 9/0059 60/641.5 |
| 4,372,940 A * | 2/1983 | Brandenburg ...... C01B 17/0253 423/551 |
| 4,389,391 A * | 6/1983 | Dunn, Jr. ............ C01G 23/047 423/149 |
| 4,400,181 A | 8/1983 | Snell et al. |
| 4,426,810 A * | 1/1984 | Rudolph ................ C10J 3/02 252/373 |
| 4,484,885 A | 11/1984 | Machii et al. |
| 4,519,810 A | 5/1985 | Haas |
| 4,522,685 A | 6/1985 | Feldmann |
| 4,532,024 A | 7/1985 | Haschke et al. |
| 4,569,310 A | 2/1986 | Davis |
| 4,639,208 A | 1/1987 | Inui et al. |
| 4,688,521 A | 8/1987 | Korenberg |
| 4,697,358 A | 10/1987 | Kitchen |
| 4,857,084 A | 8/1989 | Robbins et al. |
| 4,879,021 A * | 11/1989 | Hippo .................... C10G 1/006 208/413 |
| 4,909,914 A | 3/1990 | Chiba et al. |
| 4,959,009 A | 9/1990 | Hemsath |
| 5,059,404 A | 10/1991 | Mansour et al. |
| 5,064,444 A | 11/1991 | Kubiak et al. |
| 5,125,965 A | 6/1992 | Sebenik |
| 5,133,297 A | 7/1992 | Mansour |
| 5,156,099 A | 10/1992 | Ohshita et al. |
| 5,168,835 A | 12/1992 | Last |
| 5,197,399 A | 3/1993 | Mansour |
| 5,205,728 A | 4/1993 | Mansour |
| 5,211,704 A | 5/1993 | Mansour |
| 5,255,634 A | 10/1993 | Mansour |
| 5,306,481 A | 4/1994 | Mansour et al. |
| 5,353,721 A | 10/1994 | Mansour et al. |
| 5,366,371 A | 11/1994 | Mansour et al. |
| 5,439,491 A | 8/1995 | Kubiak et al. |
| 5,473,885 A | 12/1995 | Hunter, Jr. et al. |
| 5,536,488 A | 7/1996 | Mansour et al. |
| 5,624,470 A | 4/1997 | Tanca |
| 5,635,147 A | 6/1997 | Herbert et al. |
| 5,637,192 A | 6/1997 | Mansour et al. |
| 5,638,609 A | 6/1997 | Chandran et al. |
| 5,667,560 A | 9/1997 | Dunne |
| 5,696,203 A | 12/1997 | Hummel et al. |
| 5,700,310 A | 12/1997 | Bowman et al. |
| 5,752,994 A | 5/1998 | Monacelli et al. |
| 5,800,153 A | 9/1998 | DeRoche |
| 5,842,289 A | 12/1998 | Chandran et al. |
| 5,853,548 A | 12/1998 | Piskorz et al. |
| 5,861,046 A | 1/1999 | Andersson |
| 5,937,635 A | 8/1999 | Winfree et al. |
| 6,114,399 A | 9/2000 | Roberts et al. |
| 6,133,499 A | 10/2000 | Horizoe et al. |
| 6,149,765 A | 11/2000 | Mansour et al. |
| 6,216,446 B1 | 4/2001 | Stram |
| 6,248,297 B1 | 6/2001 | Stine et al. |
| 6,248,796 B1 | 6/2001 | Jackson et al. |
| 6,446,428 B1 | 9/2002 | Kaemming et al. |
| 6,494,034 B2 | 12/2002 | Kaemming et al. |
| 6,495,610 B1 | 12/2002 | Brown |
| 6,548,197 B1 | 4/2003 | Chandran et al. |
| 6,584,765 B1 | 7/2003 | Tew et al. |
| 6,662,550 B2 | 12/2003 | Eidelman et al. |
| 6,667,022 B2 | 12/2003 | Cole |
| 6,680,137 B2 | 1/2004 | Paisley |
| 6,753,353 B2 | 6/2004 | Jackson et al. |
| 6,758,032 B2 | 7/2004 | Hunter et al. |
| 6,793,174 B2 | 9/2004 | Ouellette et al. |
| 6,824,383 B2 | 11/2004 | Cain |
| 6,863,878 B2 | 3/2005 | Klepper |
| 6,883,543 B2 | 4/2005 | Tew et al. |
| 6,923,004 B2 | 8/2005 | Chandran et al. |
| 6,931,833 B2 | 8/2005 | Lupkes |
| 6,938,588 B2 | 9/2005 | Jacobsen et al. |
| 6,997,118 B2 | 2/2006 | Chandran et al. |
| 7,047,724 B2 | 5/2006 | Nordeen et al. |
| 7,214,720 B2 | 5/2007 | Bayle et al. |
| 7,220,390 B2 | 5/2007 | Tonkovich et al. |
| 7,309,378 B2 | 12/2007 | Bancon et al. |
| 7,434,401 B2 | 10/2008 | Hayashi |
| 7,526,912 B2 | 5/2009 | Tangirala et al. |
| 7,531,014 B2 | 5/2009 | Chandran |
| 7,569,086 B2 | 8/2009 | Chandran |
| 7,572,362 B2 | 8/2009 | Freel et al. |
| 7,601,303 B1 | 10/2009 | Karer et al. |
| 7,637,096 B2 | 12/2009 | Razzell et al. |
| 7,735,311 B2 | 6/2010 | Eidelman et al. |
| 7,739,867 B2 | 6/2010 | Kenyon et al. |
| 7,758,334 B2 | 7/2010 | Shimo et al. |
| 7,775,460 B2 | 8/2010 | Berg et al. |
| 7,784,265 B2 | 8/2010 | Rasheed et al. |
| 7,828,546 B2 | 11/2010 | Wiedenhoefer et al. |
| 7,836,682 B2 | 11/2010 | Rasheed et al. |

(56) References Cited

U.S. PATENT DOCUMENTS

| | | |
|---|---|---|
| 7,841,167 B2 | 11/2010 | Rasheed et al. |
| 7,842,110 B2 | 11/2010 | Mansour et al. |
| 7,857,995 B2 | 12/2010 | Johnson et al. |
| 7,879,919 B2 | 2/2011 | Ernst et al. |
| 7,882,926 B2 | 2/2011 | Fullerton |
| 7,886,866 B2 | 2/2011 | Fullerton |
| 7,905,990 B2 | 3/2011 | Freel |
| 7,914,280 B2 | 3/2011 | Schlote et al. |
| 7,950,219 B2 | 5/2011 | Tangirala et al. |
| 7,964,004 B2 | 6/2011 | Koch et al. |
| 7,980,056 B2 | 7/2011 | Rasheed et al. |
| 8,007,688 B2 | 8/2011 | Dahlin et al. |
| 8,082,724 B2 | 12/2011 | Hirata et al. |
| 8,083,494 B2 | 12/2011 | LaForest et al. |
| 8,084,656 B2 | 12/2011 | Feldmann |
| 8,136,624 B2 | 3/2012 | Fullerton |
| 8,137,655 B2 | 3/2012 | Chornet et al. |
| 8,168,686 B2 | 5/2012 | Blevins et al. |
| 8,205,433 B2 | 6/2012 | Boespflug et al. |
| 8,302,377 B2 | 11/2012 | Rasheed et al. |
| 8,312,706 B2 | 11/2012 | LaForest et al. |
| 8,356,467 B2 | 1/2013 | Sprouse et al. |
| 8,381,527 B2 | 2/2013 | LaForest et al. |
| 8,539,752 B2 | 9/2013 | Brumgerg et al. |
| 8,580,152 B2 | 11/2013 | Sutradhar et al. |
| 8,585,789 B2 | 11/2013 | Sutradhar et al. |
| 8,707,674 B2 | 4/2014 | Moscinski et al. |
| 8,721,299 B2 | 5/2014 | Koch et al. |
| 8,726,800 B2 | 5/2014 | Murray et al. |
| 8,813,474 B2 | 8/2014 | Daniau et al. |
| 8,889,746 B2 | 11/2014 | Kresnyak |
| 8,894,885 B2 | 11/2014 | Bell et al. |
| 8,899,010 B2 | 12/2014 | Kenyon et al. |
| 8,955,303 B2 | 2/2015 | Brzek et al. |
| 8,968,433 B2 | 3/2015 | Chandran |
| 9,080,513 B2 | 7/2015 | Ziminsky et al. |
| 9,084,978 B2 | 7/2015 | Peters |
| 9,140,456 B2 | 9/2015 | Kenyon et al. |
| 9,163,179 B2 | 10/2015 | McComish et al. |
| 9,168,501 B2 | 10/2015 | Ibsen et al. |
| 9,217,569 B2 | 12/2015 | Prade |
| 9,227,790 B2 | 1/2016 | Perez |
| 9,268,048 B2 | 2/2016 | Fullerton |
| 9,279,503 B2 | 3/2016 | DiSalvo et al. |
| 9,359,973 B2 | 6/2016 | Farshchian et al. |
| 9,512,997 B2 | 12/2016 | Zettner |
| 9,738,579 B2 | 8/2017 | Lucas et al. |
| 9,920,926 B1 | 3/2018 | Chandran et al. |
| 2002/0142172 A1 | 10/2002 | Brinker et al. |
| 2003/0143126 A1 | 7/2003 | Samson |
| 2003/0173291 A1* | 9/2003 | Schimel ............... C02F 3/006 210/603 |
| 2004/0182000 A1 | 9/2004 | Mansour et al. |
| 2005/0050759 A1 | 3/2005 | Chandran et al. |
| 2006/0117952 A1 | 6/2006 | Bancon et al. |
| 2006/0130444 A1 | 6/2006 | Smith et al. |
| 2006/0131235 A1 | 6/2006 | Offeman et al. |
| 2006/0162500 A1* | 7/2006 | Nuber ................ B01J 8/1818 75/613 |
| 2006/0246388 A1 | 11/2006 | Feese et al. |
| 2006/0251821 A1 | 11/2006 | Eidelman |
| 2007/0049781 A1* | 3/2007 | Brown ................ C10G 50/00 585/517 |
| 2007/0137435 A1 | 6/2007 | Orth et al. |
| 2007/0245627 A1 | 10/2007 | Chandran |
| 2007/0245629 A1 | 10/2007 | Chandran |
| 2008/0023338 A1 | 1/2008 | Stoots et al. |
| 2008/0115415 A1 | 5/2008 | Agrawal et al. |
| 2008/0169449 A1 | 7/2008 | Mundschau |
| 2008/0196308 A1 | 8/2008 | Hutton et al. |
| 2008/0222956 A1 | 9/2008 | Tsangaris et al. |
| 2008/0244976 A1 | 10/2008 | Paisley |
| 2008/0260629 A1 | 10/2008 | Morin et al. |
| 2008/0264254 A1 | 10/2008 | Song et al. |
| 2008/0282892 A1 | 11/2008 | Deckman et al. |
| 2008/0308769 A1 | 12/2008 | Marty et al. |
| 2009/0056225 A1 | 3/2009 | Schinski |
| 2009/0056537 A1 | 3/2009 | Neumann |
| 2009/0084035 A1 | 4/2009 | Wei |
| 2009/0084036 A1 | 4/2009 | Neumann |
| 2009/0084666 A1 | 4/2009 | Agrawal et al. |
| 2009/0139203 A1 | 6/2009 | Rasheed et al. |
| 2009/0151250 A1 | 6/2009 | Agrawal |
| 2009/0183431 A1 | 7/2009 | Smit et al. |
| 2009/0191104 A1 | 7/2009 | Murakami et al. |
| 2009/0217584 A1 | 9/2009 | Raman et al. |
| 2009/0229464 A1 | 9/2009 | Robertson |
| 2009/0232729 A1 | 9/2009 | Genkin et al. |
| 2009/0247796 A1* | 10/2009 | Waycuilis ............... C01B 7/093 570/254 |
| 2009/0320446 A1 | 12/2009 | Gutmark et al. |
| 2010/0011955 A1 | 1/2010 | Hufton et al. |
| 2010/0011956 A1 | 1/2010 | Neumann et al. |
| 2010/0018115 A1 | 1/2010 | Wallace et al. |
| 2010/0024300 A1 | 2/2010 | Chornet et al. |
| 2010/0040510 A1 | 2/2010 | Randhava et al. |
| 2010/0051875 A1 | 3/2010 | Chornet et al. |
| 2010/0096594 A1 | 4/2010 | Dahlin et al. |
| 2010/0129691 A1 | 5/2010 | Dooher et al. |
| 2010/0158792 A1 | 6/2010 | Drnevich et al. |
| 2010/0162625 A1 | 7/2010 | Mills |
| 2010/0181539 A1 | 7/2010 | Apanel et al. |
| 2010/0196227 A1 | 8/2010 | Venderbosch et al. |
| 2010/0243961 A1 | 9/2010 | Hilton et al. |
| 2010/0270505 A1 | 10/2010 | Gallaspy et al. |
| 2010/0273899 A1 | 10/2010 | Winter |
| 2010/0307335 A1 | 12/2010 | Hayward |
| 2011/0031103 A1 | 2/2011 | Deckman et al. |
| 2011/0036014 A1 | 2/2011 | Tsangaris et al. |
| 2011/0047961 A1 | 3/2011 | Kenyon et al. |
| 2011/0047962 A1 | 3/2011 | Keynon et al. |
| 2011/0048296 A1* | 3/2011 | Maghdissian ........... C01B 3/344 110/345 |
| 2011/0095233 A1 | 4/2011 | Hildebrandt et al. |
| 2011/0116986 A1 | 5/2011 | Balint et al. |
| 2011/0127469 A1 | 6/2011 | Chaubey et al. |
| 2011/0139603 A1 | 6/2011 | Booth |
| 2011/0146152 A1 | 6/2011 | Vimalchand et al. |
| 2011/0146285 A1 | 6/2011 | Glaser et al. |
| 2011/0218254 A1 | 9/2011 | Chakravarti |
| 2011/0248218 A1 | 10/2011 | Sutradhar et al. |
| 2011/0250661 A1 | 10/2011 | Sutradhar et al. |
| 2011/0297885 A1 | 12/2011 | Boerrigter et al. |
| 2012/0061618 A1 | 3/2012 | Santoianni et al. |
| 2012/0094198 A1 | 4/2012 | Chandran |
| 2012/0111109 A1 | 5/2012 | Chandran et al. |
| 2012/0131901 A1 | 5/2012 | Westervelt et al. |
| 2012/0204814 A1 | 8/2012 | Zhang et al. |
| 2012/0213647 A1 | 8/2012 | Koch et al. |
| 2013/0042595 A1 | 2/2013 | Rasheed et al. |
| 2013/0056685 A1 | 3/2013 | Badhe et al. |
| 2013/0306913 A1 | 11/2013 | Li et al. |
| 2014/0158940 A1 | 6/2014 | Navaee-Ardeh et al. |
| 2014/0224706 A1 | 8/2014 | Do et al. |
| 2014/0252276 A1 | 9/2014 | Chandran et al. |
| 2014/0296586 A1 | 10/2014 | Chandran et al. |
| 2014/0364676 A1* | 12/2014 | Chen ..................... B01J 8/00 588/312 |
| 2015/0093664 A1 | 4/2015 | Berlowitz et al. |
| 2015/0184091 A1* | 7/2015 | Chandran ............ B01J 8/0055 252/373 |
| 2015/0315499 A1 | 11/2015 | Chandran et al. |
| 2015/0376510 A1 | 12/2015 | Lucas et al. |
| 2016/0001304 A1 | 1/2016 | Pavel et al. |
| 2016/0003480 A1 | 1/2016 | McCormish et al. |
| 2016/0200993 A1 | 7/2016 | Lucas et al. |
| 2017/0058222 A1 | 3/2017 | Lucas et al. |
| 2017/0082067 A1 | 3/2017 | Maqbool |
| 2017/0320731 A1* | 11/2017 | Sozinho ............... B01J 8/0055 |

(56) References Cited

U.S. PATENT DOCUMENTS

2017/0369805 A1    12/2017    Lucas et al.
2018/0057762 A1     3/2018    Lucas et al.

OTHER PUBLICATIONS

International Search Report dated Apr. 11, 2016, issued in counterpart PCT application No. PCT/US2016/018117.
Written Opinion of the International Searching Authority dated Apr. 11, 2016, issued in counterpart PCT application (No. PCT/US2016/018117).
International Preliminary Report on Patentability dated Feb. 22, 2018, issued in counterpart PCT application (No. PCT/US2016/018117).

* cited by examiner

PRODUCT GAS GENERATION (3A & 3B)

PRODUCT GAS GENERATION (3A & 3B)

PRODUCT GAS GENERATION (3A & 3B)

PRODUCT GAS GENERATION (3A & 3B)

PRODUCT GAS GENERATION (3A & 3B)

PRODUCT GAS GENERATION (3A & 3B)

PRODUCT GAS GENERATION (3A & 3B)

PRODUCT GAS GENERATION (3A & 3B)

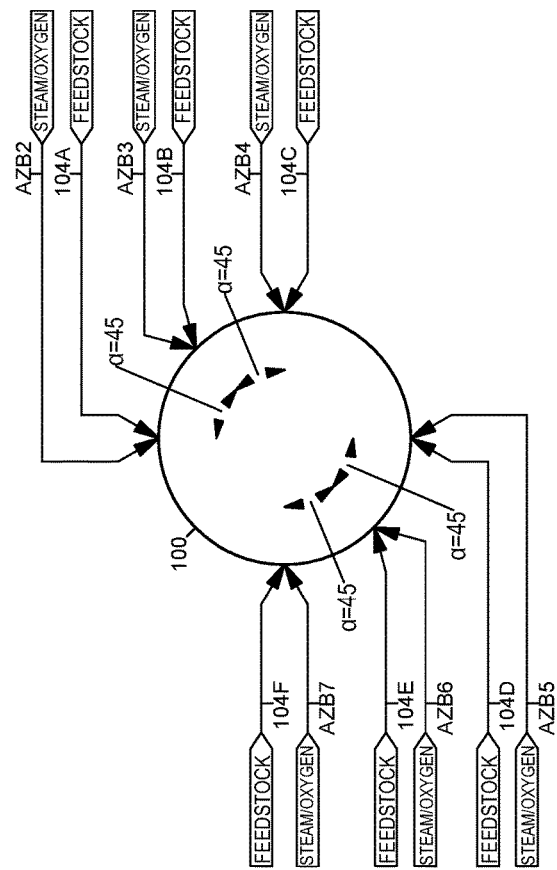

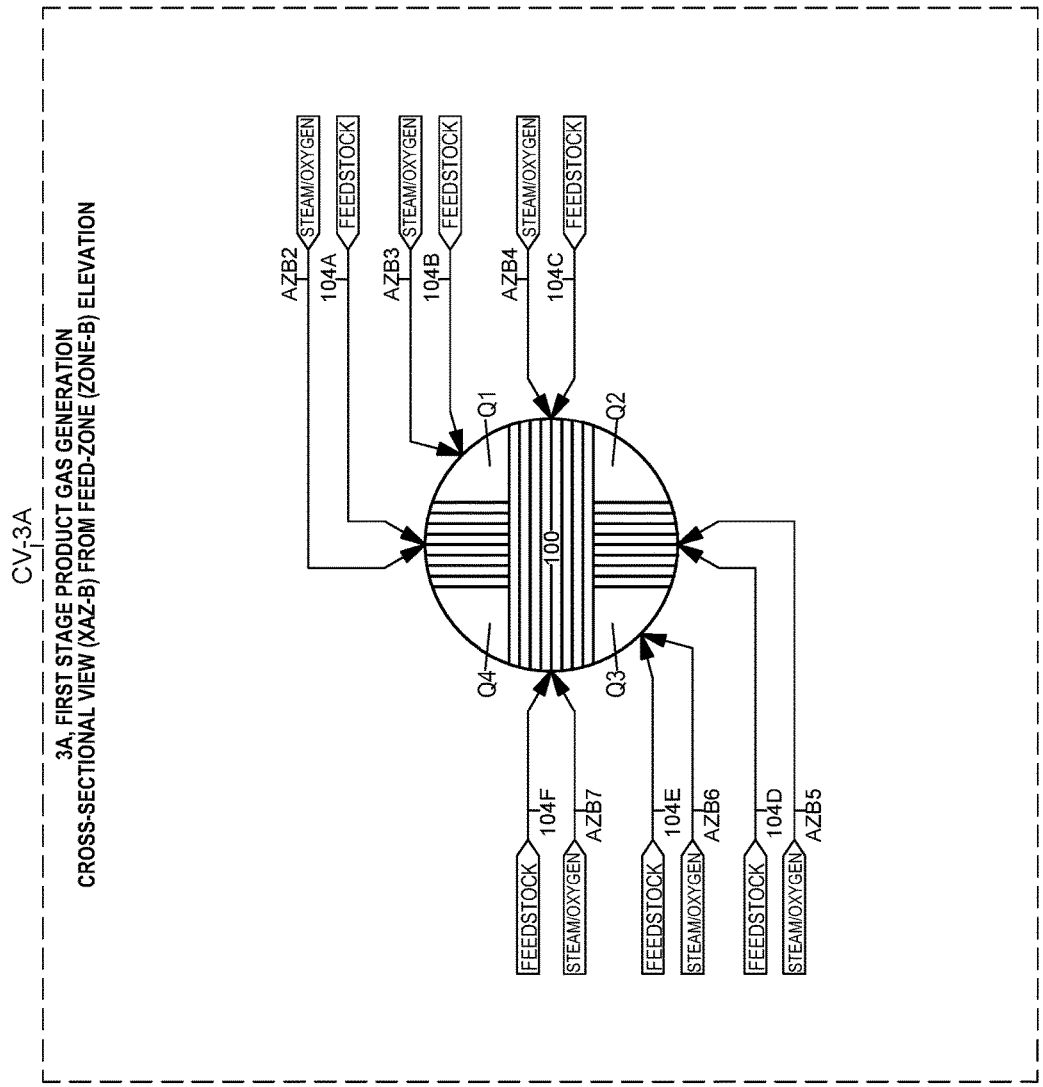

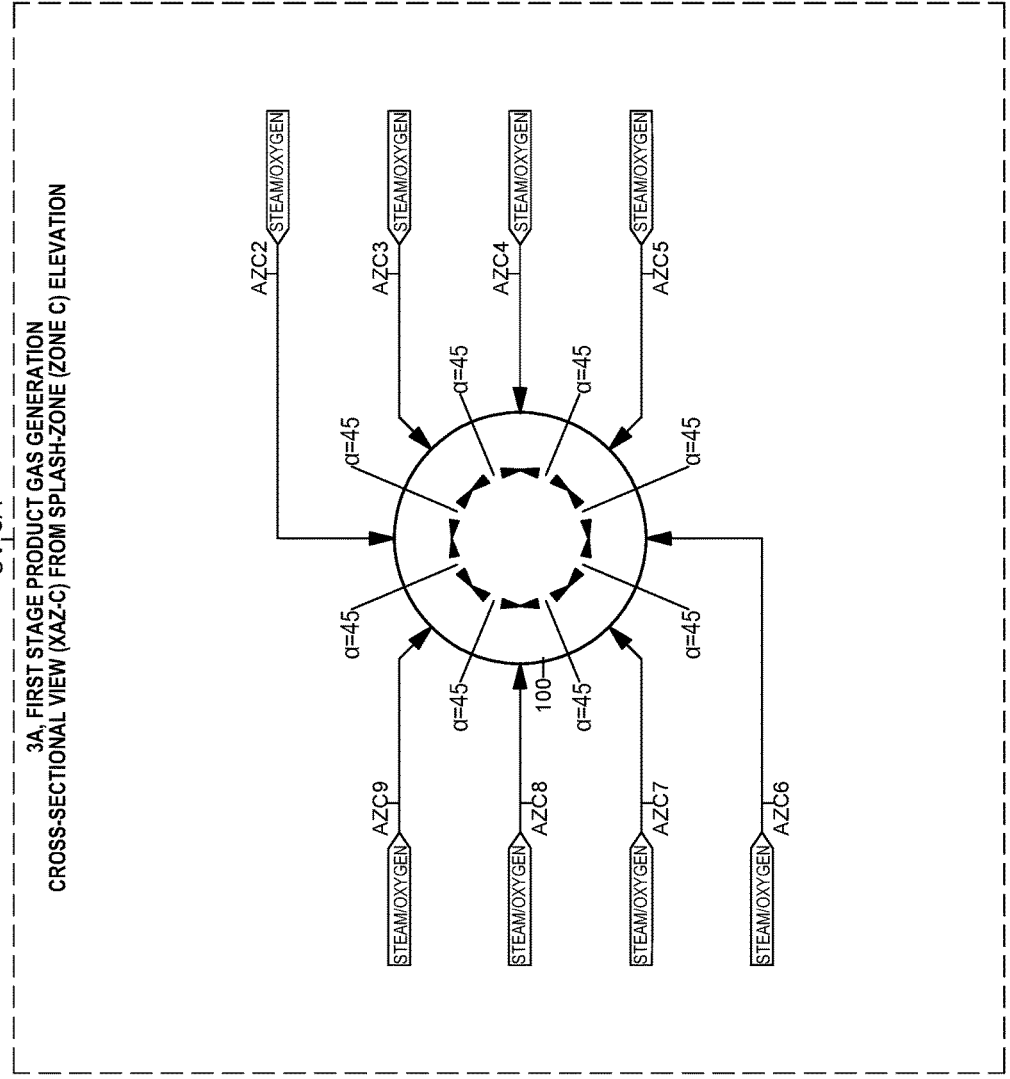

PRODUCT GAS GENERATION 3A

FIGURE 29
Classification Valve States for Automated Controller Operation

| STATE # | STATE 1 | STATE 2 | STATE 3 | STATE 4 | STATE 5 |
|---|---|---|---|---|---|
| DESCRIPTION | PREPARATION | TRANSFER | CLASSIFICATION | VENT | DRAIN |
| mixture transfer valve (V9,V9A,V9AA,V9B) | CLOSED | OPEN | CLOSED | CLOSED | CLOSED |
| classification gas transfer valve (V10,V10A,V10AA,V10B) | CLOSED | CLOSED | OPEN | CLOSED | CLOSED |
| bed material riser recycle transfer valve (V11,V11A,V11AA,V11B) | CLOSED | CLOSED | OPEN | CLOSED | CLOSED |
| depressurization vent valve (V12,V12A,V12AA,V12B) | CLOSED | CLOSED | CLOSED | OPEN | CLOSED |
| inert feedstock contaminant drain valve (V13,V13A,V13AA,V13B) | CLOSED | CLOSED | CLOSED | CLOSED | OPEN |

PRODUCT GAS GENERATION SUBSYSTEMS 3A & 3B

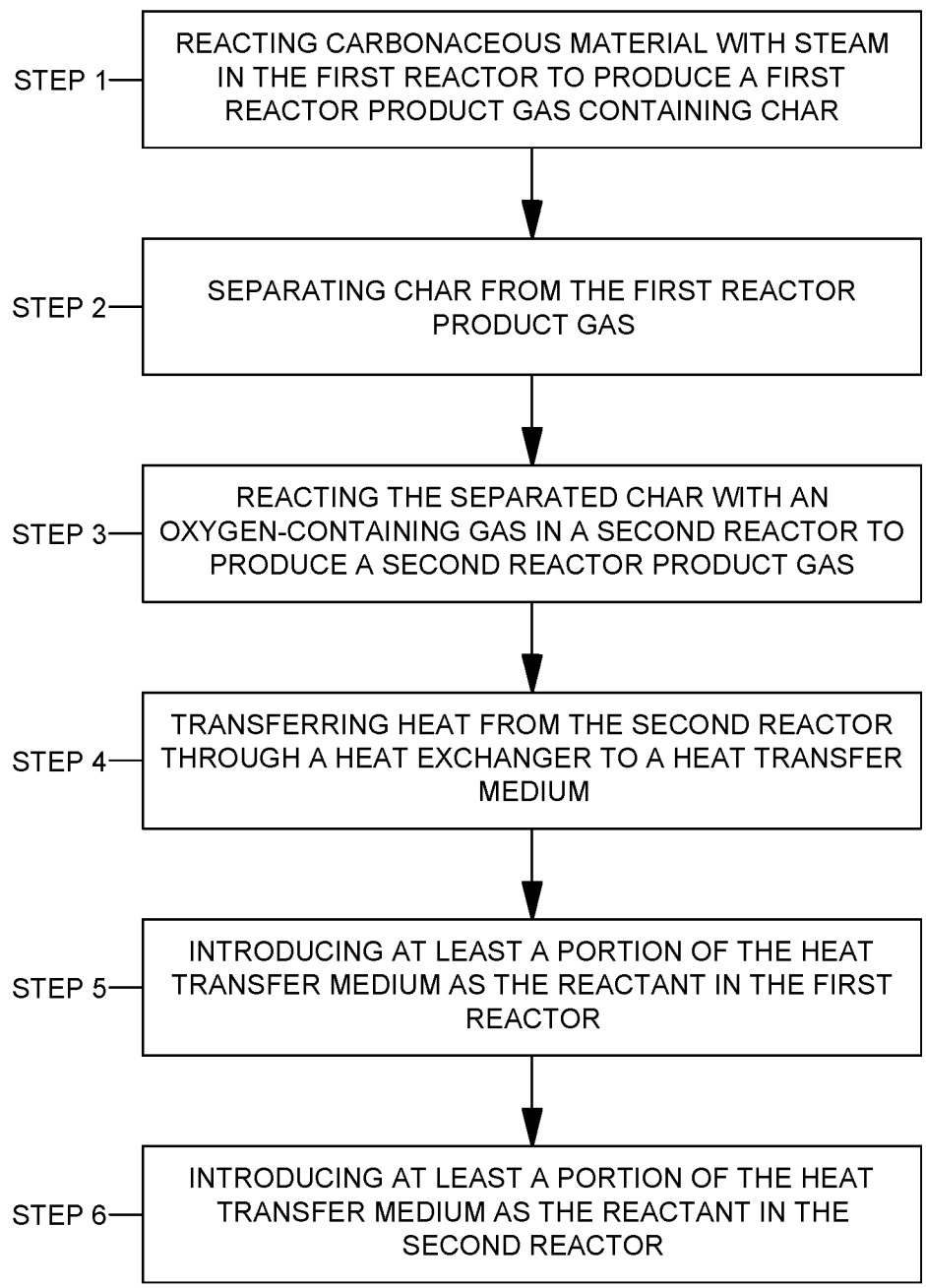

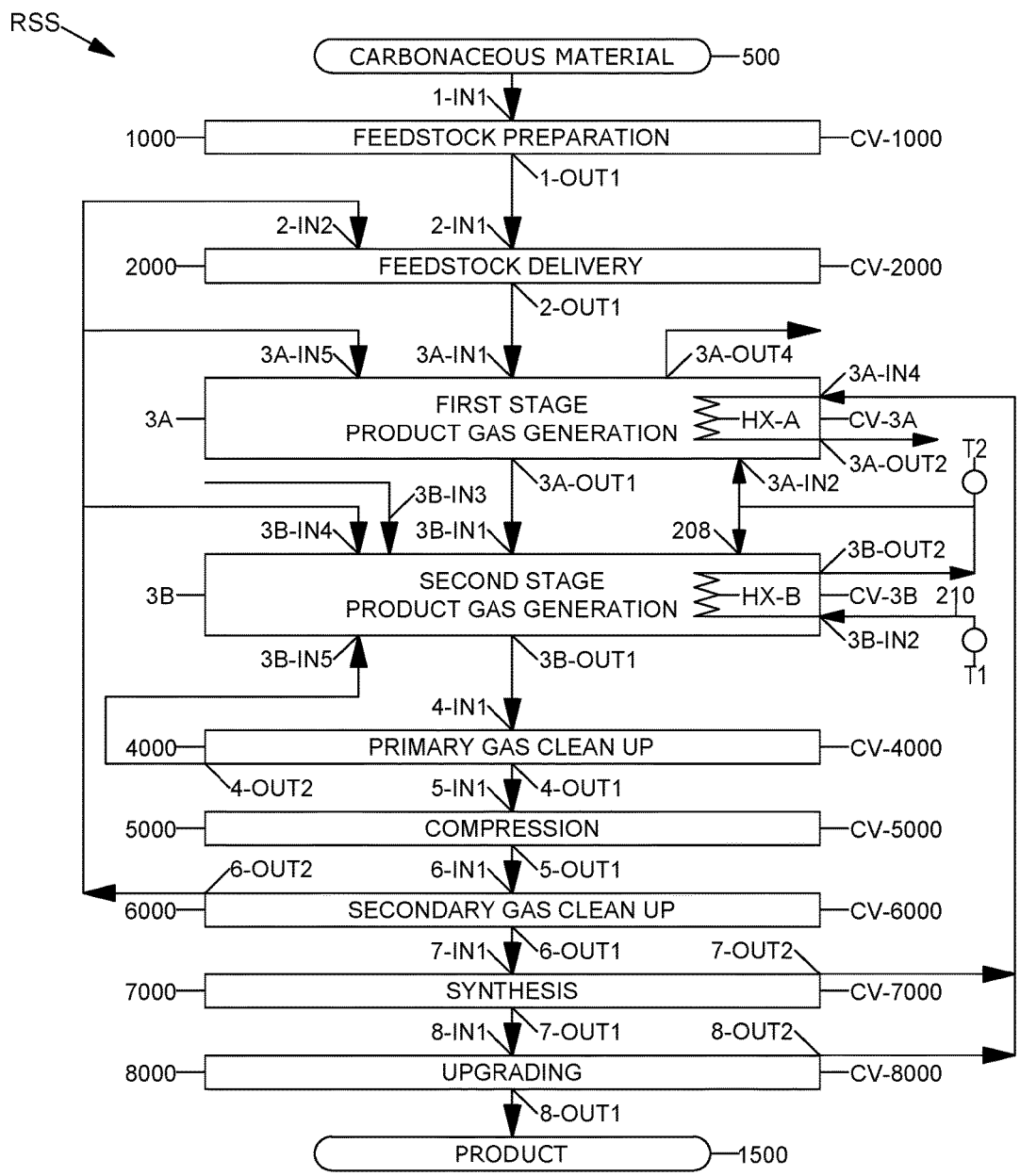

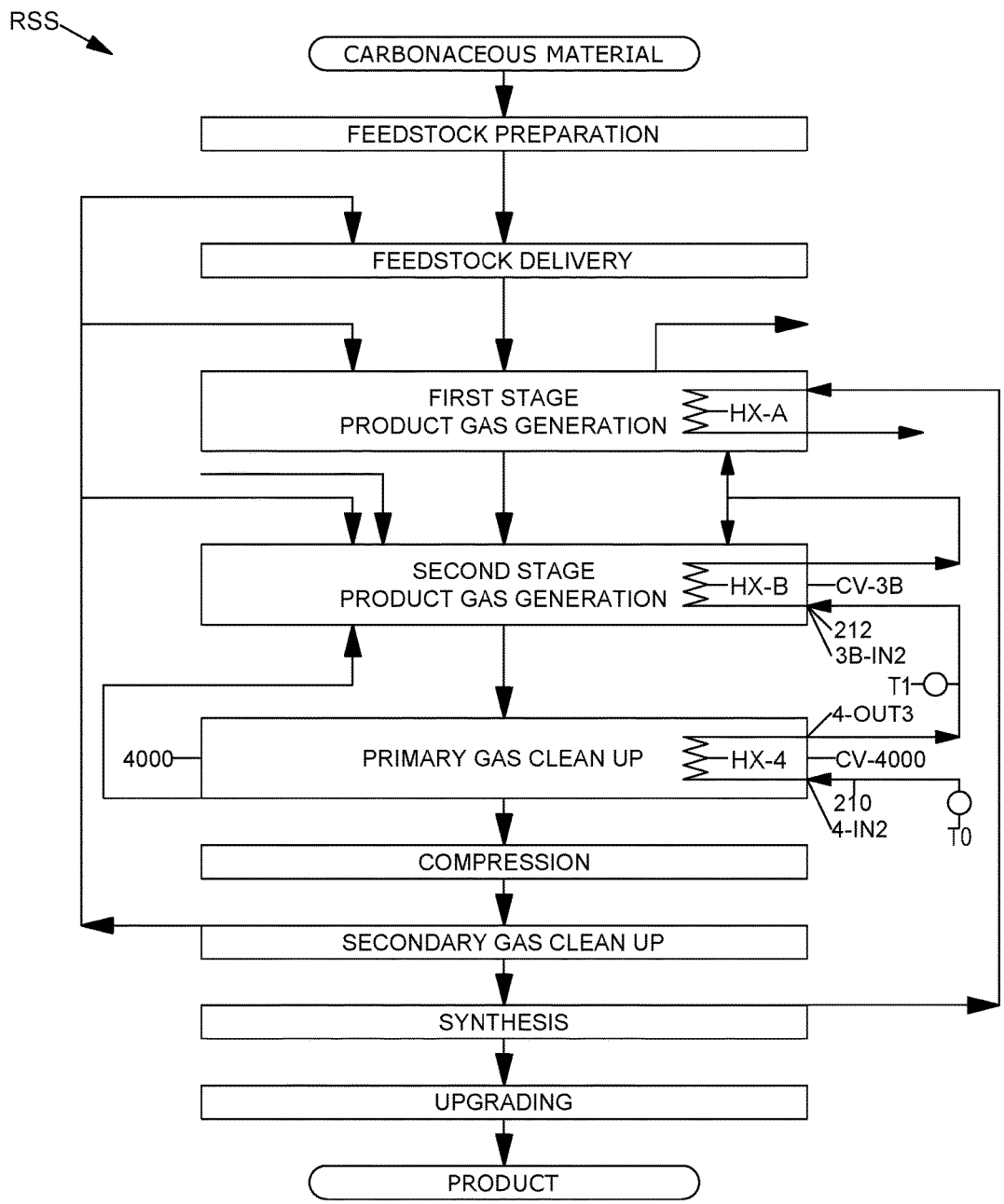

US 10,222,060 B2

TWO-STAGE ENERGY-INTEGRATED PRODUCT GAS GENERATION SYSTEM AND METHOD

RELATED APPLICATIONS

This is a Bypass Continuation of PCT/US2016/018117, filed 16 Feb. 2016 and published as WO 2017/142515A1 on 24 Aug. 2017. The contents of the aforementioned application, as amended in the Article 19 submission of 9 Jun. 2016 and further amended in the Article 34 submission of 15 Dec. 2017, are incorporated by reference in their entirety.

TECHNICAL FIELD

The present disclosure relates to the field of thermochemical conversion of carbonaceous materials.

BACKGROUND

The world reliance on petroleum and natural gas has reached an era where the supply and demand have become critical. These circumstances make the need for innovative energy and environmental technologies essential to mediate climate change, reduce greenhouse gas emissions, reduce air and water pollution, promote economic development, expand energy supply options, increase energy security, decrease U.S. dependence on imported oil, and strengthen rural economies. It is now essential that energy conversion systems and processes be introduced and commercialized that can employ alternative sources of energy in an environmentally benign manner at economic costs, and can transform abundant carbonaceous material resources into clean, affordable, and domestically-produced renewable fuels and high-value products.

New technology is needed in order to exploit alternative sources of energy and feedstock for sustainable economic development in an energy efficient manner while maintaining a clean and unpolluted environment. The needed technologies must be sufficiently flexible, thermally efficient, energy integrated, environmentally clean and cost effective to enable the use of abundant carbonaceous materials for the production of clean and cost effective energy. Further, decreasing world reserves and diminishing availability of crude oil have created considerable incentive for the development and use of alternative fuels. In recent years, the ever increasing value of fossil hydrocarbon liquids and gases has directed research, development, deployment, and commercialization to the possibilities of employing carbonaceous materials for fuel purposes. In particular, attention has been focused on thermochemical conversion of carbonaceous materials.

Reaction vessels containing a fluidized bed of bed material are well suited to effectuate thermochemical processes to convert carbonaceous materials into product gases. A fluidized bed is formed when a quantity of a particulate bed material is placed under appropriate conditions in a reactor vessel to cause a bed material to behave as a fluid. This is usually achieved by the introduction of pressurized steam, carbon dioxide, oxygen-containing gas, and/or any other gases, or vapors, to flow through the particulate bed material. This results in the bed material then having many properties and characteristics of normal fluids.

Converting a carbonaceous material, such as municipal solid waste (MSW), into a product gas by the use of a fluidized bed reactor poses an exceptionally difficult challenge. This is inherently due to the inert contaminants that are present within the MSW. MSW, commonly known as trash or garbage in the United States is a waste type comprised of everyday items that are discarded by the public. Inert contaminants cannot be converted into product gas, however other portions of a MSW carbonaceous material can be converted into product gas. Instead, the MSW inert contaminants build-up and accumulate within the quantity of bed material contained within the reactor thus inhibiting and undermining the ability of the reactor to effectuate appropriate fluidization of bed material for any thermochemical process to take place at all.

In applying the classification of gas/solid systems according to Geldart (D. Geldart, Powder Techn. 7, 285-293, 1973), if a fluidized bed contains mostly easily fluidized Geldart Group B bed material, fluidization will diminish if Geldart Group D solids (inert contaminants) accumulate within the fluidized bed.

Geldart Group D solids may be the inert feedstock contaminants that are introduced with the MSW. Or the Geldart Group D solids may be generated through agglomeration of Geldart Group A or Geldart Group B solids. Nonetheless, a fluidized bed of a mean bed particle characteristic of Geldart Group B solids may become defluidized by buildup or accumulation of comparatively larger, coarser and/or heavier Geldart Group D solids that are introduced to the fluidized bed from an external source, such as with MSW. Further, defluidization may be caused by predictable, and at times desirable, agglomeration or growth of one or more types of Geldart solids groups fusing or binding or growing together to form larger Geldart solids groups.

Defluidization may be caused by unpredictable and unavoidable buildup of larger Geldart particles, in comparison to the mean bed particle characteristic, introduced to the fluidized bed. The accumulation of Geldart Group D solids in a fluidized bed having a mean bed particle characteristic of Geldart Group B solids often results in defluidized or stagnant zones in the fluidized bed and in turn demanding an increase in fluidization velocity to maintain fluidization quality.

Fluidized beds typically usually have a mean bed particle characteristic of Geldart Group B solids, generally with no overlap of Geldart Group A or Geldart Group D solids. It is therefore desirable to be able to remove Geldart Group D solids which may accumulate within the fluidized bed of Geldart Group B solids to maintain continuous operation of the fluidized bed. Further, some fluidized bed systems have a mean bed particle characteristic of Geldart Group A solids, generally with no overlap of Geldart Group B or Geldart Group D solids. It is also therefore desirable to be able to remove any Geldart Group B or Geldart Group D solids which may accumulate within the fluidized bed of mostly Geldart Group A solids to maintain continuous operation of the fluidized bed. Therefore, a need exists for a new fluidized bed process that is better suited to operate on a continuous and uninterrupted basis by accommodating size and density classification of smaller type Geldart solids for recycle back to the fluidized bed while removing solids of comparatively larger Geldart type from the system.

SUMMARY

Herein disclosed are innovative and advanced systems and methods related to the thermochemical conversion of carbonaceous materials into product gas, renewable fuels, energy products such as electricity and chemicals, the systems comprising: a two-stage energy integrated product gas generation system and at least one system selected from feedstock preparation system, feedstock delivery system, particulate classification system, primary gas clean-up system, compression system, secondary gas clean-up system, synthesis system, upgrading system and power generation system.

More specifically, the present disclosure provides for thermally integrated thermochemical reaction systems and processes for the conversion of carbonaceous materials into product gas. More specifically, the present disclosure relates to thermally integrated successive endothermic and downstream exothermic thermochemical reactions and processes for the thermochemical conversion of carbonaceous material feedstock into product gas. Still more specifically, the present disclosure relates to a first reactor being in fluid communication with a heat exchanger in thermal contact with a downstream reactor operating in an exothermic mode to provide reactant for the endothermic reaction taking place within the first reactor. Still more specifically, the disclosed systems and methods are suitable for the production of product gas for use in a refinery superstructure for converting carbonaceous materials into renewable fuels and other useful chemical compounds, including gasoline, diesel, jet fuel, ethanol, alcohols, and power.

This disclosure further relates to methods for employing an energy integrated two-stage thermochemical product gas generation system designed to efficiently convert carbonaceous materials into a wide spectrum of resources and added-value products including clean energy and chemical products. Some embodiments place emphasis on advancements in the art of thermochemical reaction systems that employ endothermic and downstream exothermic reaction environments to share energy and generate a product gas. It is, therefore, an object of the present disclosure to utilize systems and methods for a first reactor being in fluid communication with a heat exchanger in thermal contact with a second reactor operating in an exothermic mode to provide reactant for an endothermic reaction taking place within the first reactor. It is, therefore, an object of the present disclosure to utilize systems and methods for a first reactor being in fluid communication with a heat exchanger in thermal contact with a downstream primary gas clean-up system. A primary gas clean-up heat exchanger is configured to remove heat from at least a portion of the product gas generated in the first reactor or second reactor and to provide a heat transfer medium for use in the second reactor heat exchanger in thermal contact with a second reactor operating in an exothermic mode to in turn provide reactant for an endothermic reaction taking place within the first reactor.

It is further an embodiment of the present disclosure to provide a two-stage product gas generation system configured to produce a product gas from a carbonaceous material, the system comprising a first reactor, a downstream reactor, and a heat exchanger in thermal contact with the downstream reactor. The first reactor has a first interior, a first reactor carbonaceous material input, a first reactor reactant input, and a first reactor product gas output. The downstream reactor has an interior, and a char input in fluid communication with the first reactor product gas output. The downstream reactor also has an oxygen-containing gas input, a product gas output, and a heat exchanger in thermal contact with its interior. The heat exchanger in thermal contact with the downstream reactor has an inlet configured to receive a heat transfer medium at an inlet temperature and a heat transfer medium outlet configured to output the heat transfer medium, at a higher, outlet temperature. A first reactor reactant input is in fluid communication with the heat transfer medium outlet and is configured to introduce at least a portion of said heat transfer medium into the first interior as a reactant of the first reactor. At least a portion of said heat transfer medium may also be used as a reactant of the downstream reactor.

It an object of the present disclosure to utilize systems and methods to convert carbonaceous materials into product gas using a two-stage energy integrated product gas generation system including a first reactor, a first solids separation device, a downstream reactor, and a downstream reactor heat exchanger configured to transfer heat from the downstream reactor to a heat transfer medium for use as a reactant in the first reactor. More specifically, in embodiments, a downstream reactor heat exchanger is configured to transfer heat from the downstream reactor to a heat transfer medium for use as a reactant in the downstream reactor. In embodiments, a first reactor is configured to receive particulate heat transfer material present in the interior of the downstream reactor.

In embodiments, the first reactor is configured to receive steam as a reactant so as to operate in an endothermic mode. In embodiments, the first reactor is configured to receive carbon dioxide as a reactant so as to operate in an endothermic mode. In embodiments, the first reactor is configured to receive an oxygen-containing gas so as to operate in an exothermic mode. In embodiments, the first reactor is configured to receive steam and an oxygen-containing gas so as to operate in an endothermic and exothermic mode. In embodiments, the first reactor is configured to receive steam, oxygen-containing gas, and carbon dioxide so as to operate in an endothermic and exothermic mode.

In embodiments, the first reactor is equipped with a heat exchanger in thermal contact with the first interior of the first reactor to effectuate an endothermic reaction. In embodiments, an auxiliary heat exchanger is configured to transfer heat from a combustion stream to an auxiliary heat exchanger heat transfer medium for use as a reactant to the first reactor. In embodiments, an auxiliary heat exchanger heat transfer medium outlet conduit is in fluid communication with the second reactor heat transfer medium inlet, to thereby supply the auxiliary heat exchanger heat transfer medium to the second reactor heat exchanger.

In embodiments, at least a portion of the heat transfer medium of the second reactor heat exchanger may be introduced into any combination of bed material zones found in either the first reactor or in the second rector. In this regard, the first and second reactors can each be considered to have a dense bend zone formed in the lower portion of the bed region, a feed zone formed in a middle portion of the bed region, and a splash zone formed in the upper portion of the bed region, immediately below the freeboard region of the reactor. It is understood that within the bed material, the dense bed zone is located below both the feed and splash zones, the splash zone is located above both the dense bed zone and the feed zone, and the feed zone is located between the dense bed zone and the splash zone. It is further understood that for present purposes, the boundary between the dense bed zone and the feed zone is the lowest point at which carbonaceous material such as MSW, char, or any other feedstock, is introduced into a reactor.

In embodiments, a first reactor is equipped with a dense bed zone, feed zone, and splash zone, along with the first reactor carbonaceous material input valves, sensors, and controllers. In embodiments, multiple carbonaceous material inputs and multiple feed zone steam/oxygen inputs are positioned in the first reactor feed zone along with multiple splash zone steam/oxygen inputs positioned in the splash zone. In embodiments, various geometric first reactor feed zone cross-sectional views are elaborated upon such as circular or cross sectional views. In embodiments, only two of the six first reactor carbonaceous material inputs are configured to inject carbonaceous material into vertically extending quadrants. In embodiments, at least two carbonaceous material inputs are introduced to the interior of the first reactor at different planes at different vertical heights about the first reactor.

In embodiments, a second reactor is equipped with a dense bed zone, feed zone, and splash zone, along with a first solids separation device, second solids separation device, solids flow regulator, riser, dipleg, and valves, sensors, and controllers. In embodiments, a second reactor feed zone cross-section includes: one first solids separation device; four second reactor first char inputs; and four feed zone steam/oxygen inputs; wherein the combined reactor product gas conduit is configured to blend the first reactor product gas with the second reactor product gas. In embodiments, the first reactor product gas is not combined with the second reactor product gas. In embodiments, a second reactor feed zone cross-section includes: two first solids separation devices; two solids flow regulators; four second reactor first char inputs; four feed zone steam/oxygen inputs; and, where the combined reactor product gas conduit is configured to blend the first reactor product gas with the second reactor product gas.

In embodiments, a front tubesheet heat exchanger is in thermal contact with the first reactor. In embodiments, both a front tubesheet heat exchanger and a rear tubesheet heat exchanger are in thermal contact with the first reactor. In embodiments, a front tubesheet heat transfer medium outlet and rear tubesheet heat transfer medium outlet are both in fluid communication with the second reactor heat transfer medium inlet, such that at least a portion of fluid exiting the front tubesheet heat transfer medium outlet and the rear tubesheet heat transfer medium outlet is provided as at least a portion of said heat transfer medium at the second reactor heat transfer medium inlet. In embodiments, a network of first reactor heat exchangers including integral front tubesheet heat exchangers are fluidly in communication with a steam drum. In embodiments, a network of first reactor heat exchangers including integral front tubesheet heat exchangers and integral rear tubesheet heat exchangers are fluidly in communication with a steam drum. In embodiments, two particulate classification vessels, also known as classifiers, are configured to accept a bed material and inert feedstock contaminant mixture and a classifier gas, and classify or clean and recycle the bed material portion back to the first interior of the first reactor while removing the inert feedstock contaminant portion and agglomerates, if any, from the system as a solids output.

It is further an object of the present disclosure to describe a method for producing a first reactor product gas and a second reactor product gas from a carbonaceous material using a first reactor having a first interior and a second reactor having a second interior, the method comprising: (a) pyrolyzing carbonaceous material in the presence of heat and the absence of steam to produce a first reactor product gas containing char; (b) separating char from the first reactor product gas; (c) reacting the separated char with an oxygen-containing gas in a second reactor to produce a second reactor product gas; (d) transferring heat from the second reactor through a heat exchanger to a heat transfer medium; and, (e) introducing at least a portion of the heat transfer medium into the first interior of first reactor to supply said heat for pyrolysis.

It is further an object of the present disclosure to describe a method for producing a first reactor product gas and a second reactor product gas from a carbonaceous material using a first reactor having a first interior and a second reactor having a second interior, the method comprising: (a) reacting carbonaceous material with steam in the first reactor to produce a first reactor product gas containing char; (b) separating char from the first reactor product gas; (c) reacting the separated char with an oxygen-containing gas in a second reactor to produce a second reactor product gas; (d) transferring heat from the second reactor through a heat exchanger to a heat transfer medium, the heat transfer medium comprising steam; (e) introducing at least a first portion of the steam that has been heated by the second reactor, into the first reactor, to react with the carbonaceous material; (f) introducing a second portion of the steam that is heated by the second reactor, back into the second interior of the second reactor, to react with the separated char; (g) combusting a fuel source in a first reactor heat exchanger to form a combustion stream; and indirectly heating a particulate heat transfer material present in the first reactor with said combustion stream, to provide at least a portion of the heat required to react the carbonaceous material; (h) operating the first reactor at a first pressure and operating the second reactor at a second pressure which is higher than the first pressure; and, (i) transferring particulate heat transfer material from the interior of the second reactor to the interior of the first reactor to promote the reaction between the carbonaceous feedstock and steam.

It is further an object of the present disclosure to describe a method of converting a carbonaceous material into at least one liquid fuel, the method comprising: (a) combining a carbonaceous material and carbon dioxide in a feedstock delivery system; (b) producing a first reactor product gas and a second reactor product gas, by (i) reacting carbonaceous material with steam in the first reactor to produce a first reactor product gas containing char; (ii) separating char from the first reactor product gas; (iii) reacting the separated char with an oxygen-containing gas in a second reactor to produce a second reactor product gas; (iv) transferring heat from the second reactor through a heat exchanger to a heat transfer medium, the heat transfer medium comprising steam; and (v) introducing at least a first portion of the steam that has been heated by the second reactor, into the first reactor, to react with the carbonaceous material; (c) compressing the first and/or second reactor product gas to thereby form a compressed product gas; (d) removing carbon dioxide from the compressed product gas, and supplying at least a first portion of the removed carbon dioxide to the feedstock delivery system for combining with carbonaceous material in step (a); (e) reacting the compressed product gas with a catalyst after removing carbon dioxide; and (f) synthesizing at least one liquid fuel from the compressed product gas, after reacting the compressed product gas with a catalyst.

It is further an object of the present disclosure to describe a method of converting a carbonaceous material into at least one liquid fuel, the method comprising: (a) combining a carbonaceous material and carbon dioxide in a feedstock delivery system; (b) introducing the combined carbonaceous material and carbon dioxide into a first reactor containing a first particulate heat transfer material; (c) introducing steam into the first reactor; (d) reacting the carbonaceous material with steam and carbon dioxide in an endothermic thermochemical reaction to generate a first reactor product gas containing char; (e) introducing a portion of the char into a second reactor containing a second particulate heat transfer material; (f) introducing an oxygen-containing gas into the second reactor; (g) reacting the char with the oxygen-containing gas in the second reactor, in an exothermic thermochemical reaction to generate a second reactor product gas; (h) transferring heat, via a second reactor heat exchanger, from the exothermic thermochemical reaction to a first heat transfer medium in thermal contact with the second reactor, the heat transfer medium comprising steam; (i) introducing at least a portion of the heated first heat transfer medium into the first reactor for use as the source of steam in (c); (j) compressing the first and/or second reactor product gas to thereby form a compressed product gas; (k) removing carbon dioxide from the compressed product gas, and supplying at least a first portion of the removed carbon dioxide to the feedstock delivery system for combining with carbonaceous material in step (a); (l) reacting the compressed product gas with a catalyst after removing carbon dioxide; and (m) synthesizing at least one liquid fuel from the compressed product gas, after reacting the compressed product gas with a catalyst. Further, cleaning the first particulate heat transfer material can be accomplished with a second portion of the removed carbon dioxide, to remove inert feedstock contaminant from the first reactor.

In embodiments, particulate heat transfer material may be transferred from the interior of the second reactor to the interior of the first reactor. In embodiments, the separated char may be reacted with steam in the second reactor to produce a second reactor product gas. In embodiments, at least a portion of the heat transfer medium may be used as the reactant in the second reactor. In embodiments, the carbonaceous material may also be reacted with an oxygen-containing gas to produce a first reactor product gas containing char. In embodiments, a fuel source may be combusted in a first reactor heat exchanger to form a combustion stream, said combustion stream indirectly heating the particulate heat transfer material in the first reactor. In embodiments, the second reactor operated at a pressure greater than the first reactor. In embodiments, the reaction between the carbonaceous material and steam in the first reactor is promoted by use of a particulate heat transfer material.

This disclosure further relates to the generation of product gas from carbonaceous materials using a continuous, uninterrupted, and reliable fluidized bed thermochemical reactor and particulate classification system. More specifically, the present disclosure further relates to a continuously operating product gas generation system integrated with a particulate classification vessel for cleaning bed material by separating via size and density classification smaller group Geldart solids for recycle back to the first reactor and allowing for the removal of comparatively larger Geldart solids from the system via a classifier vessel. The content of the disclosure is particularly applicable to the production of product gas from municipal solid waste (MSW) or refuse derived fuel (RDF) due to the improved cooperation between the first reactor and classifier to accommodate continuous, uninterrupted, and reliable product gas generation notwithstanding the unpredictable variations in carbonaceous material feedstock characterization. This disclosure further relates to systems and methods to mediate the unavoidable introduction of inert contaminants contained within carbonaceous material that would otherwise tend to accumulate within the fluidized bed resulting in defluidization and unplanned shut-down and maintenance. In embodiments, a fluidized bed having a mean bed particle characteristic including Geldart Group B solids may accept a solid MSW carbonaceous material having inert feedstock contaminants of Geldart Group D that are incapable of being thermochemically converted into product gas and instead unavoidably accumulate at unpredictable levels within the dense fluid bed causing defluidization and ultimately requiring process termination or shut-down.

It is further an object of the present disclosure to provide a product gas generation system configured to produce a product gas and classified inert feedstock contaminants from a carbonaceous material, the system comprising: a first reactor, and a plurality of particulate classification vessels. Specifically, the first reactor is configured to output a bed material and inert feedstock contaminant mixture to the classifier. More specifically, a classifier gas input is configured to input a classifier gas to the classifier interior to clean and separate the bed material portion to be routed to the first reactor. More specifically, a classifier inert feedstock contaminant output is configured to output classified inert feedstock contaminants.

It is further an object of the present disclosure to describe a municipal solid waste (MSW) energy recovery system for converting MSW containing inert feedstock contaminants, into a product gas, the system comprising: (a) a first reactor comprising: a first reactor interior suitable for accommodating a bed material and endothermically reacting MSW in the presence of steam to produce product gas; a first reactor carbonaceous material input for introducing MSW into the first reactor interior; a first reactor reactant input for introducing steam into the first interior; a first reactor product gas output through which product gas is removed; a classified recycled bed material input in fluid communication with an upper portion of the first reactor interior; a particulate output connected to a lower portion of the first reactor interior, and through which a mixture of bed material and unreacted inert feedstock contaminants selectively exits the first reactor interior; and (b) a plurality of particulate classification vessels in fluid communication with the first reactor interior, each vessel comprising: (i) a mixture input connected to the particulate output, for receiving said mixture from the first reactor interior; (ii) a classifier gas input connected to a source of classifier gas, for receiving classifier gas to promote separation of said bed material from said unreacted inert feedstock contaminants within said vessel; (iii) a bed material output connected to the classified recycled bed material input of the first reactor interior via a classifier riser conduit, for returning bed material separated from said mixture to the first reactor interior; and (iv) a contaminant output for removing unreacted inert feedstock contaminants which have been separated from said mixture, within the vessel.

It is further an object of the present disclosure to describe a municipal solid waste energy recovery system for converting MSW containing inert feedstock contaminants, into a product gas, the system further comprising: a mixture transfer valve positioned between the particulate output and the mixture input, to selectively control transfer of said mixture from the first reactor to the vessel; a classification gas transfer valve positioned between the source of classifier gas and the classifier gas input, to selectively provide said classifier gas to the vessel; a bed material riser recycle transfer valve positioned between the bed material output and the classified recycled bed material input, to selectively return bed material separated from said mixture, to the first reactor interior; and an inert feedstock contaminant drain valve configured to selectively remove unreacted inert feedstock contaminants which have been separated from said mixture.

It is further an object of the present disclosure to describe a municipal solid waste (MSW) energy recovery system for converting MSW containing inert feedstock contaminants, into a product gas, where the system further includes each vessel comprising a classifier depressurization gas output; and a depressurization vent valve connected to the classifier depressurization gas output to selectively vent the vessel.

It is further an object of the present disclosure to describe a municipal solid waste (MSW) energy recovery system for converting MSW containing inert feedstock contaminants, into a product gas, where the system further comprises: a master controller configured to operate the system in any one of a plurality of states, including: a first state in which all of said valves are closed; a second state in which the mixture transfer valve is open and the remainder of said valves are closed, to allow said mixture to enter the vessel; a third state in which the classification gas transfer valve and the bed material riser recycle transfer valve are open and the remainder of said valves are closed, to promote separation of said bed material from said mixture and recycling of separated bed material back into the first reactor; a fourth state in which the depressurization vent valve is open and the remainder of said valves are closed, to allow the vessel to vent; and a fifth state in which the inert feedstock contaminant drain valve is open and the remainder of said valves are closed, to remove unreacted inert feedstock contaminants from the vessel. The classifier gas may be carbon dioxide. And the product gas may comprise carbon dioxide and a first portion of the carbon dioxide in the product gas may be introduced into the vessel as the classifier gas.

It is further an object of the present disclosure to describe a method for converting municipal solid waste (MSW) containing Geldart Group D inert feedstock contaminants, into a first reactor product gas, the method comprising: (a) introducing the MSW into a first interior of a first reactor containing bed material; (b) reacting the MSW with steam at a temperature between about 320° C. and about 900° C., to produce a first reactor product gas containing char; (c) removing a mixture of bed material and unreacted Geldart Group D inert feedstock contaminants from the first reactor; (d) separating the bed material from the unreacted Geldart Group D inert feedstock contaminants by entraining the bed material with a portion of the first reactor product gas; (e) returning the entrained bed material to the interior of the first reactor, and not returning the unreacted Geldart Group D inert feedstock contaminants to said interior; wherein: the Geldart Group D inert feedstock contaminants comprise whole units and/or fragments of one or more from the group consisting of allen wrenches, ball bearings, batteries, bolts, bottle caps, broaches, bushings, buttons, cable, cement, chains, clips, coins, computer hard drive shreds, door hinges, door knobs, drill bits, drill bushings, drywall anchors, electrical components, electrical plugs, eye bolts, fabric snaps, fasteners, fish hooks, flash drives, fuses, gears, glass, gravel, grommets, hose clamps, hose fittings, jewelry, key chains, key stock, lathe blades, light bulb bases, magnets, metal audio-visual components, metal brackets, metal shards, metal surgical supplies, mirror shreds, nails, needles, nuts, pins, pipe fittings, pushpins, razor blades, reamers, retaining rings, rivets, rocks, rods, router bits, saw blades, screws, sockets, springs, sprockets, staples, studs, syringes, USB connectors, washers, wire, wire connectors, and zippers.

It is further an object of the present disclosure to describe a municipal solid waste (MSW) energy recovery system for converting MSW containing inert feedstock contaminants, into a product gas, and a method for MSW into at least one liquid fuel, the MSW containing Geldart Group D inert feedstock contaminants, the method comprising: (i) combining the MSW and carbon dioxide in a feedstock delivery system; (ii) producing a first reactor product gas; (iii) compressing at least a portion of the first reactor product gas to thereby form a compressed product gas; (iv) removing carbon dioxide from the compressed product gas, and supplying a first portion of the removed carbon dioxide to the feedstock delivery system for combining with the MSW in step (i) and supplying a second portion of the removed carbon dioxide as said portion of the first reactor product gas for entraining the bed material in step (ii); (v) reacting the compressed product gas with a catalyst after removing carbon dioxide; and (vi) synthesizing at least one liquid fuel from the compressed product gas, after reacting the compressed product gas with a catalyst.

It is further an object of the present disclosure to describe a method for converting municipal solid waste (MSW) into at least one liquid fuel, the MSW containing Geldart Group D inert feedstock contaminants, the method comprising: (a) combining the MSW and carbon dioxide in a feedstock delivery system; (b) introducing the combined MSW and carbon dioxide into a first interior of a first reactor containing bed material; (c) introducing steam into the first reactor; (d) reacting the MSW, with steam and carbon dioxide, in an endothermic thermochemical reaction to generate a first reactor product gas containing char and leaving unreacted Geldart Group D inert feedstock contaminants in the bed material; (e) cleaning the bed material with carbon dioxide to remove said unreacted Geldart Group D inert feedstock contaminants; (f) introducing a portion of the char into a second reactor containing a second particulate heat transfer material; (g) introducing an oxygen-containing gas into the second reactor; (h) reacting the char with the oxygen-containing gas in the second reactor, in an exothermic thermochemical reaction to generate a second reactor product gas; (i) compressing the first and/or second reactor product gas to thereby form a compressed product gas; (j) removing carbon dioxide from the compressed product gas, and supplying a first portion of the removed carbon dioxide to the feedstock delivery system for combining with the MSW in step (a); and supplying a second portion of the removed carbon dioxide to clean the bed material in step (e); (k) reacting the compressed product gas with a catalyst after removing carbon dioxide; and (l) synthesizing at least one liquid fuel from the compressed product gas, after reacting the compressed product gas with a catalyst; wherein: the Geldart Group D inert feedstock contaminants comprise whole units and/or fragments of one or more from the group consisting of allen wrenches, ball bearings, batteries, bolts, bottle caps, broaches, bushings, buttons, cable, cement, chains, clips, coins, computer hard drive shreds, door hinges, door knobs, drill bits, drill bushings, drywall anchors, electrical components, electrical plugs, eye bolts, fabric snaps, fasteners, fish hooks, flash drives, fuses, gears, glass, gravel, grommets, hose clamps, hose fittings, jewelry, key chains, key stock, lathe blades, light bulb bases, magnets, metal audio-visual components, metal brackets, metal shards, metal surgical supplies, mirror shreds, nails, needles, nuts, pins, pipe fittings, pushpins, razor blades, reamers, retaining rings, rivets, rocks, rods, router bits, saw blades, screws, sockets, springs, sprockets, staples, studs, syringes, USB connectors, washers, wire, wire connectors, and zippers.

BRIEF DESCRIPTION OF THE DRAWINGS

Reference will now be made in detail to various embodiments of the disclosure. Each embodiment is provided by way of explanation of the disclosure, not limitation of the disclosure. In fact, it will be apparent to those skilled in the art that modifications and variations can be made in the disclosure without departing from the teaching and scope thereof, for instance, features illustrated or described as part of one embodiment to yield a still further embodiment derived from the teaching of the disclosure. Thus, it is intended that the disclosure or content of the claims cover such derivative modifications and variations to come within the scope of the disclosure or claimed embodiments described herein and their equivalents.

Additional objects and advantages of the disclosure will be set forth in part in the description which follows, and in part will be obvious from the description, or may be learned by practice of the claims. The objects and advantages of the disclosure will be attained by means of the instrumentalities and combinations and variations particularly pointed out in the appended claims.

Figure 1:
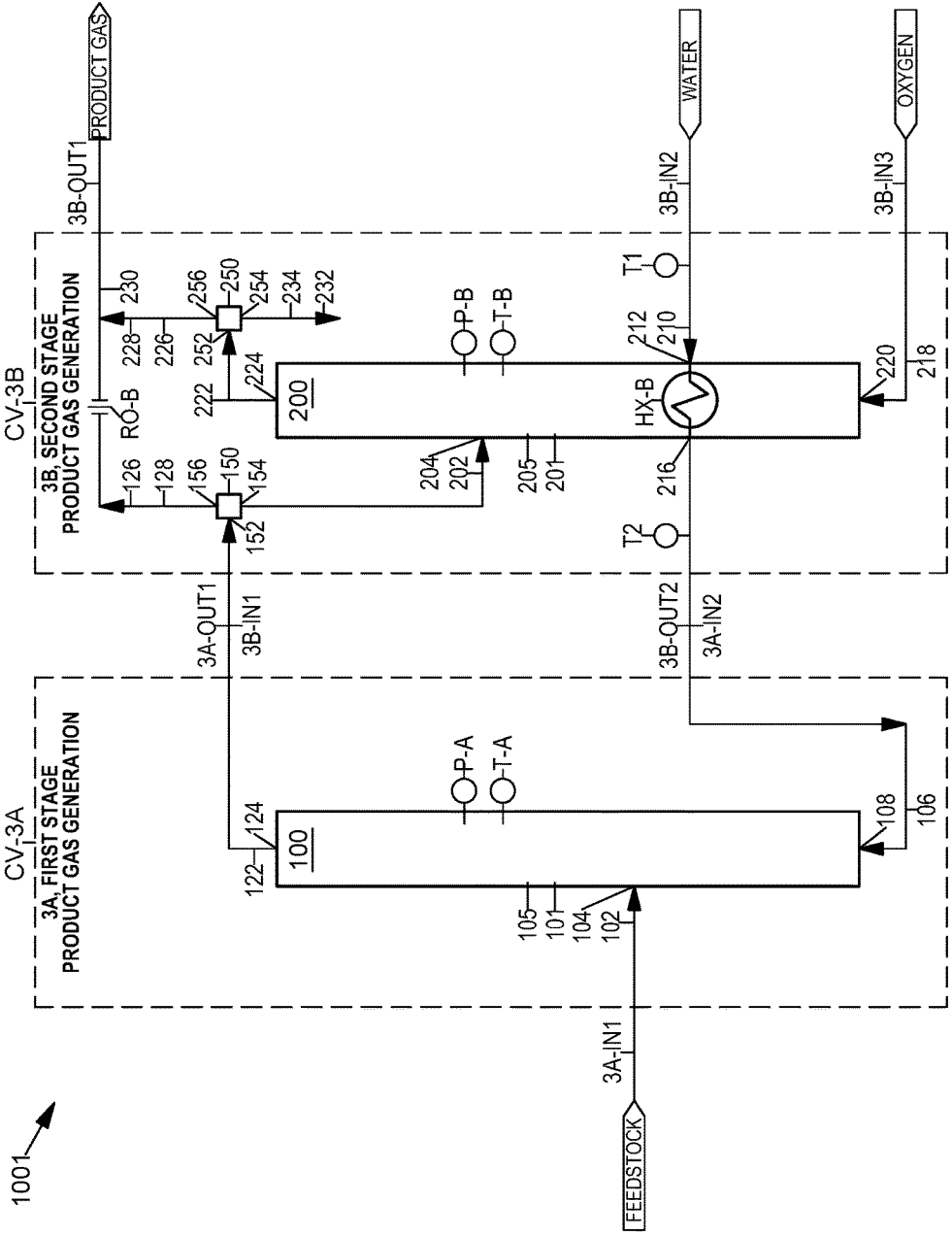
Figure 2:
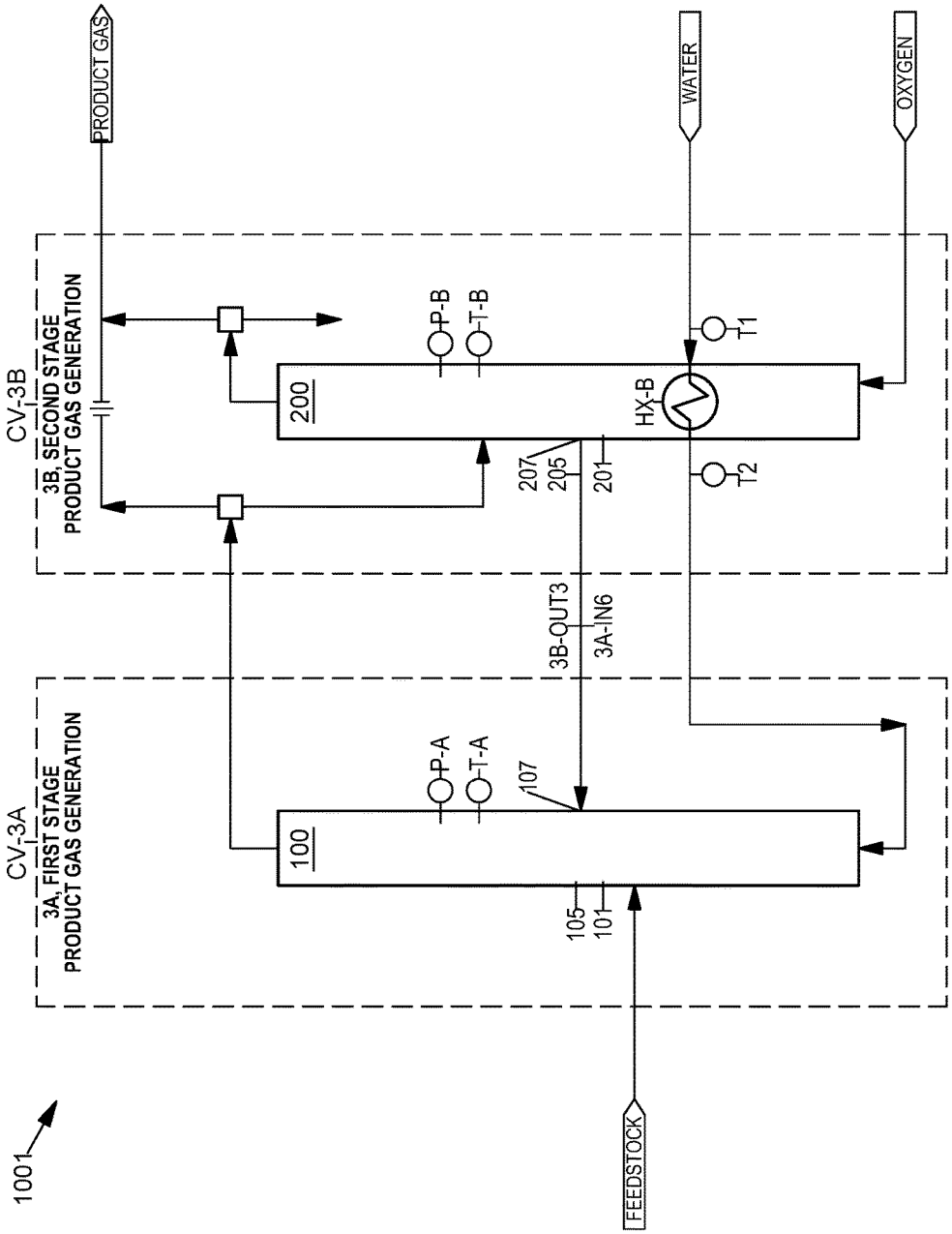
Figure 3:
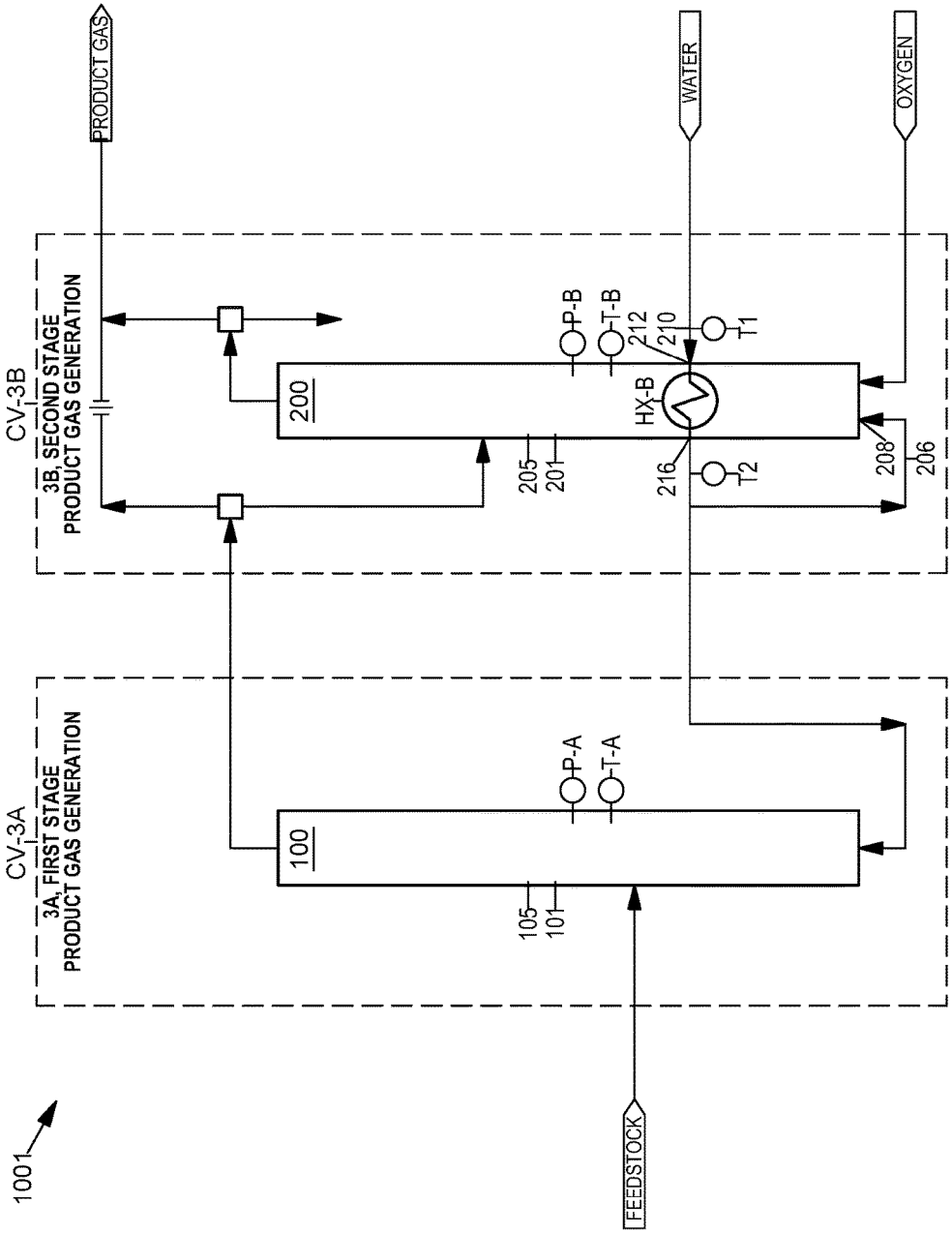
Figure 4:
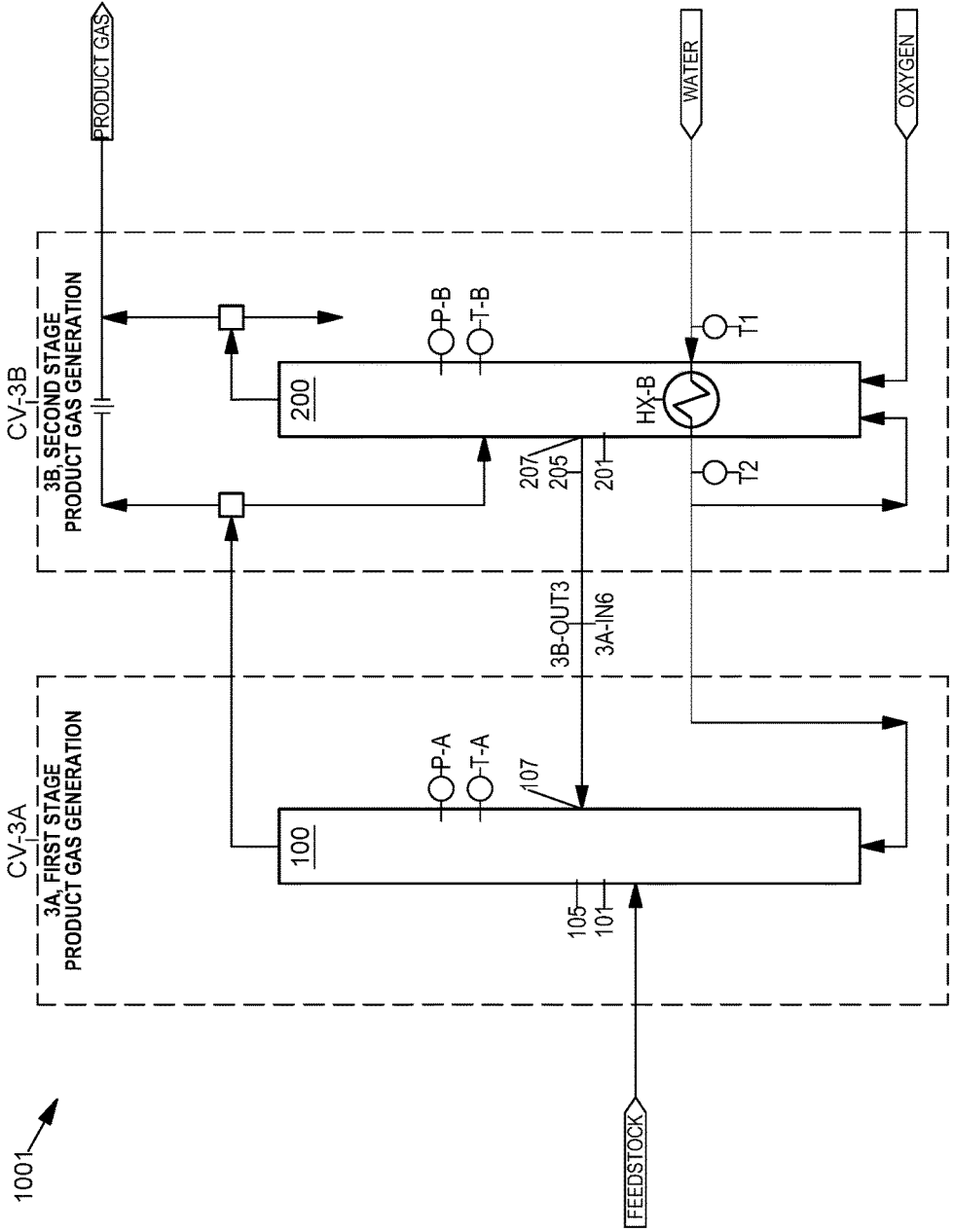
Figure 5:
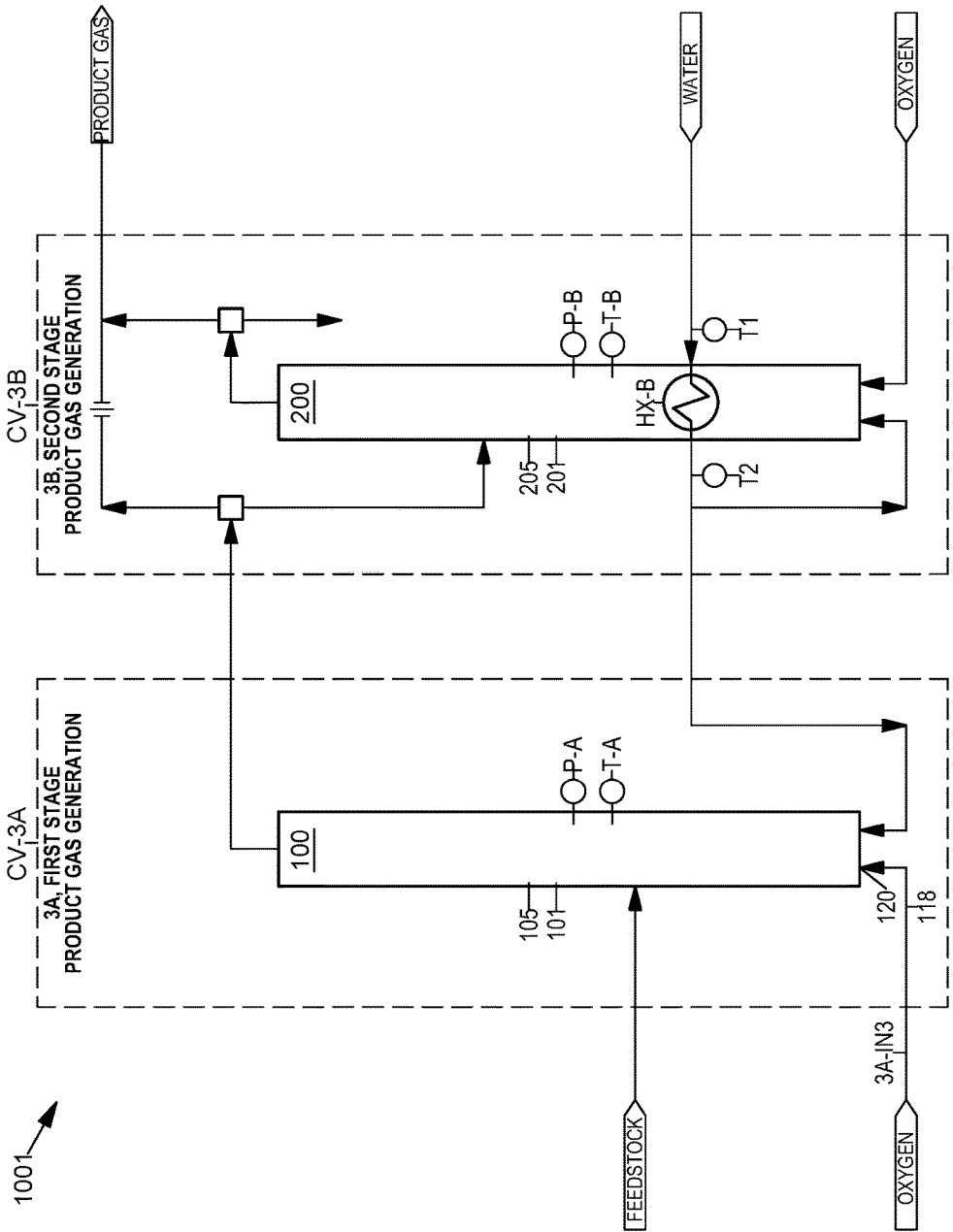
Figure 6:
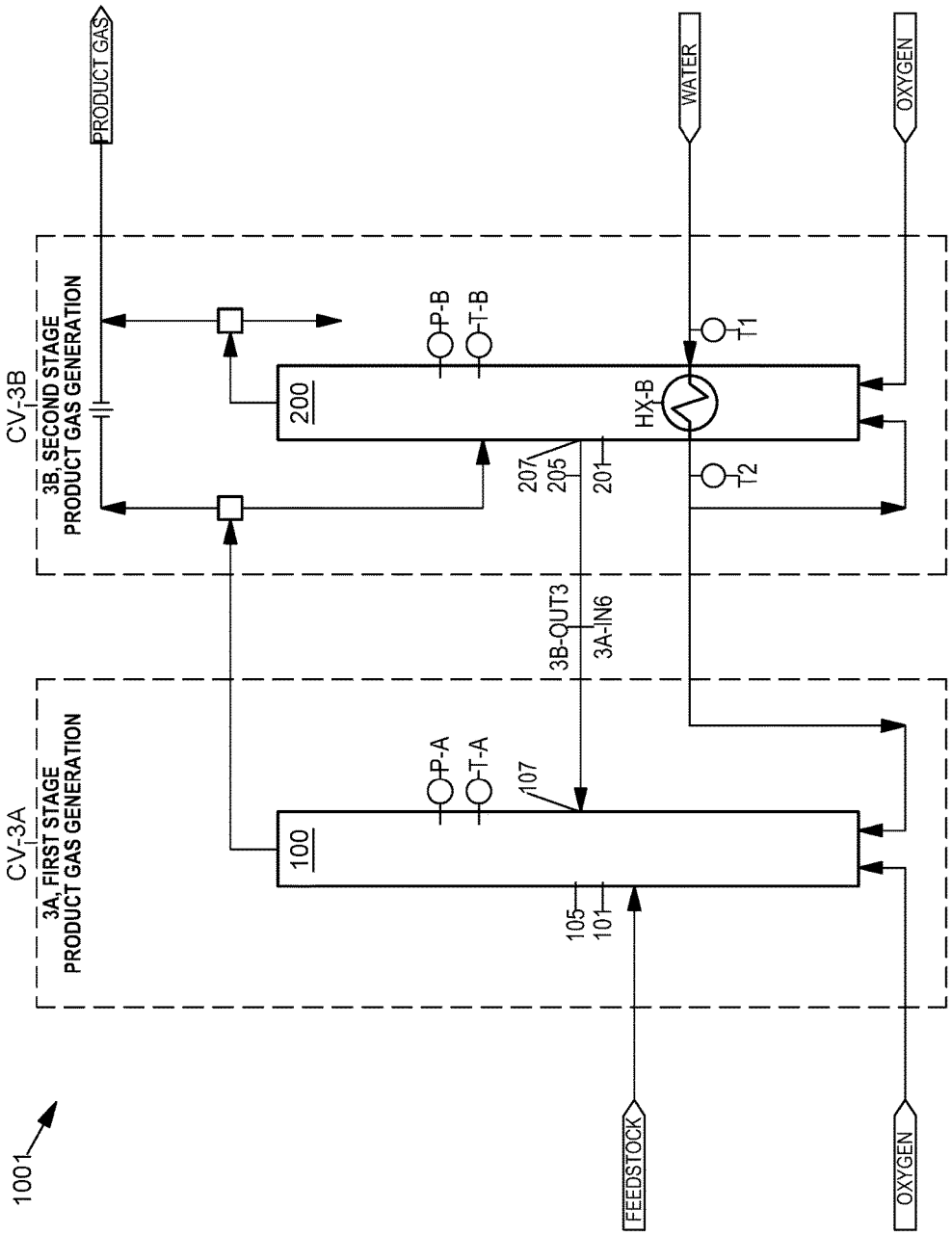
Figure 7:
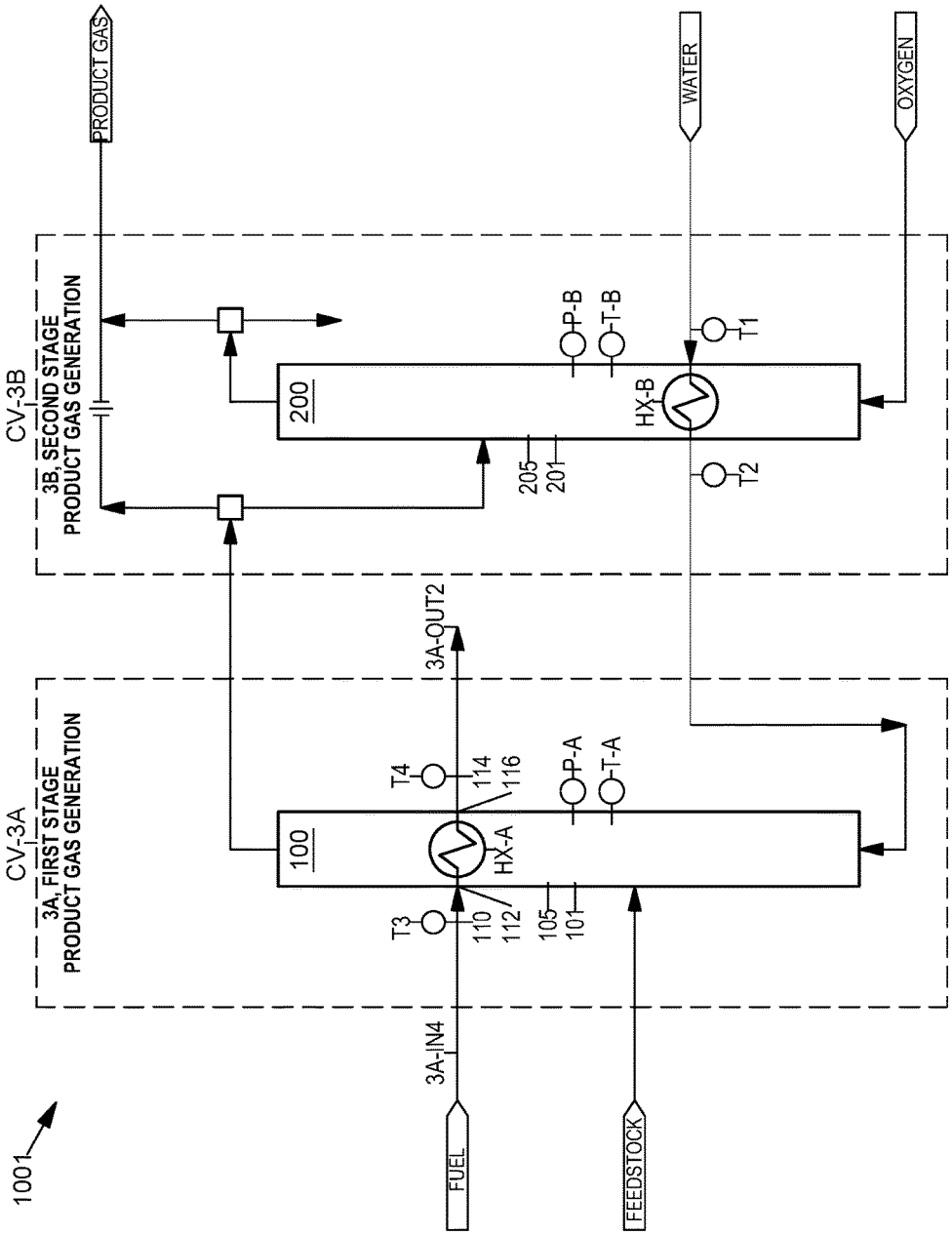
Figure 8:
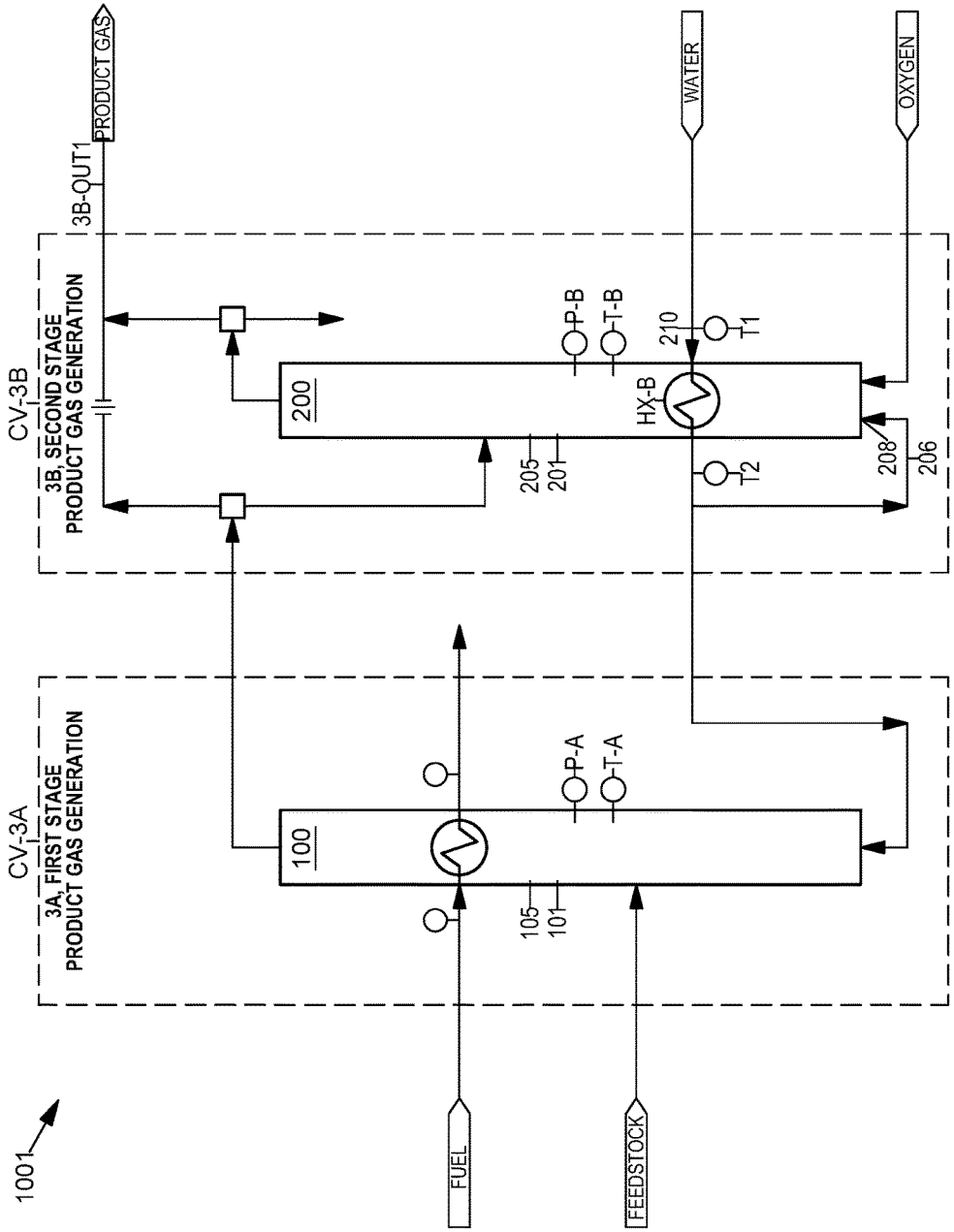
Figure 9:
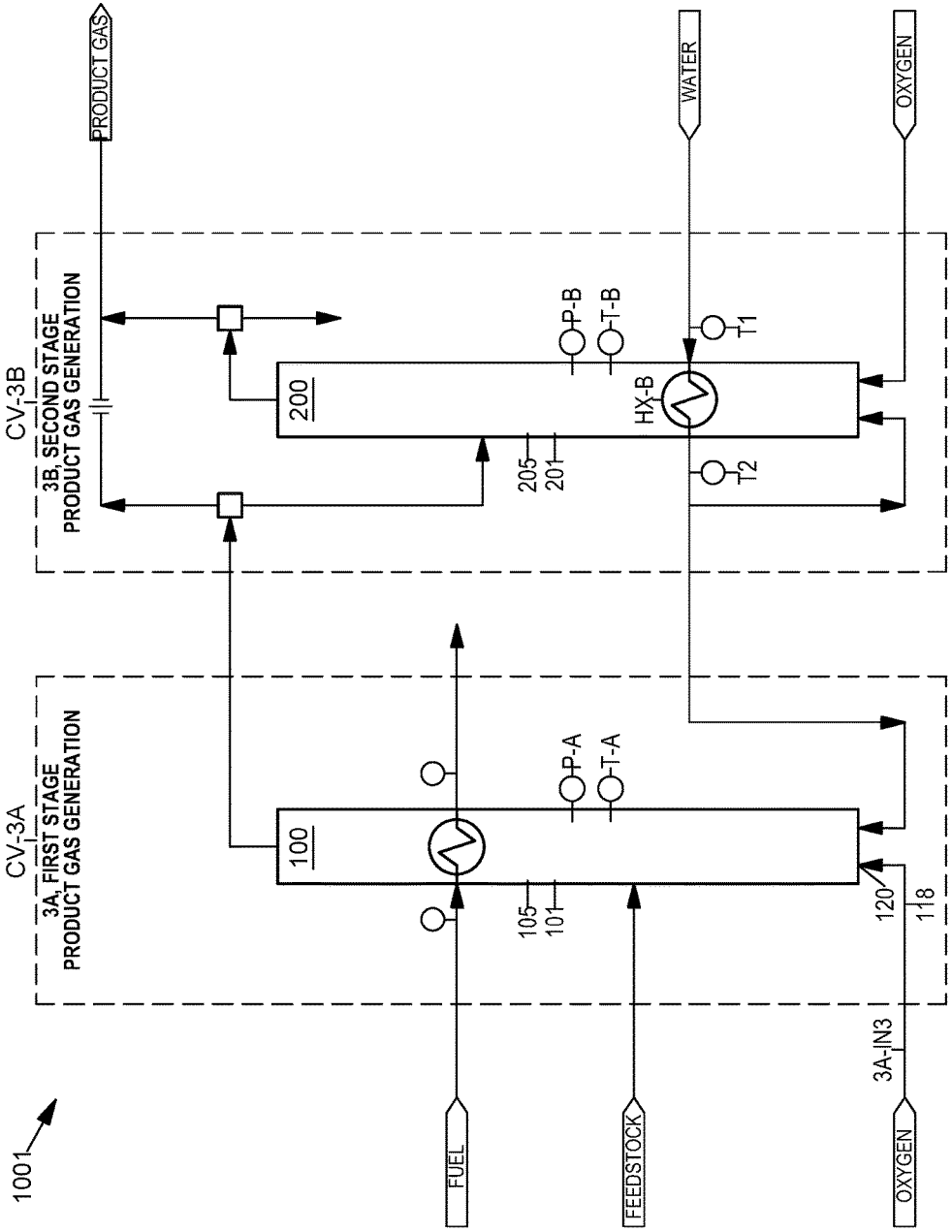
Figure 10:
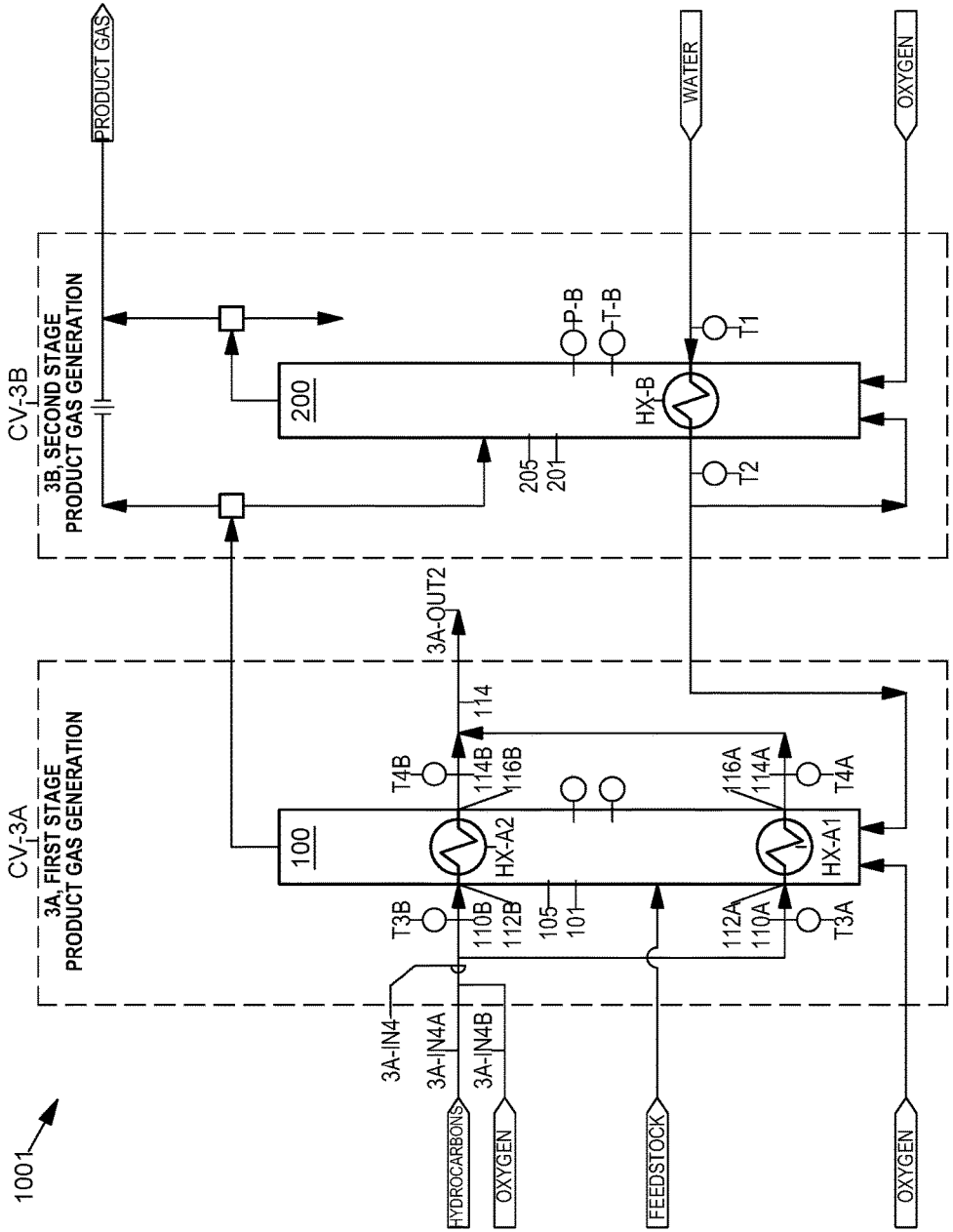
Figure 11:
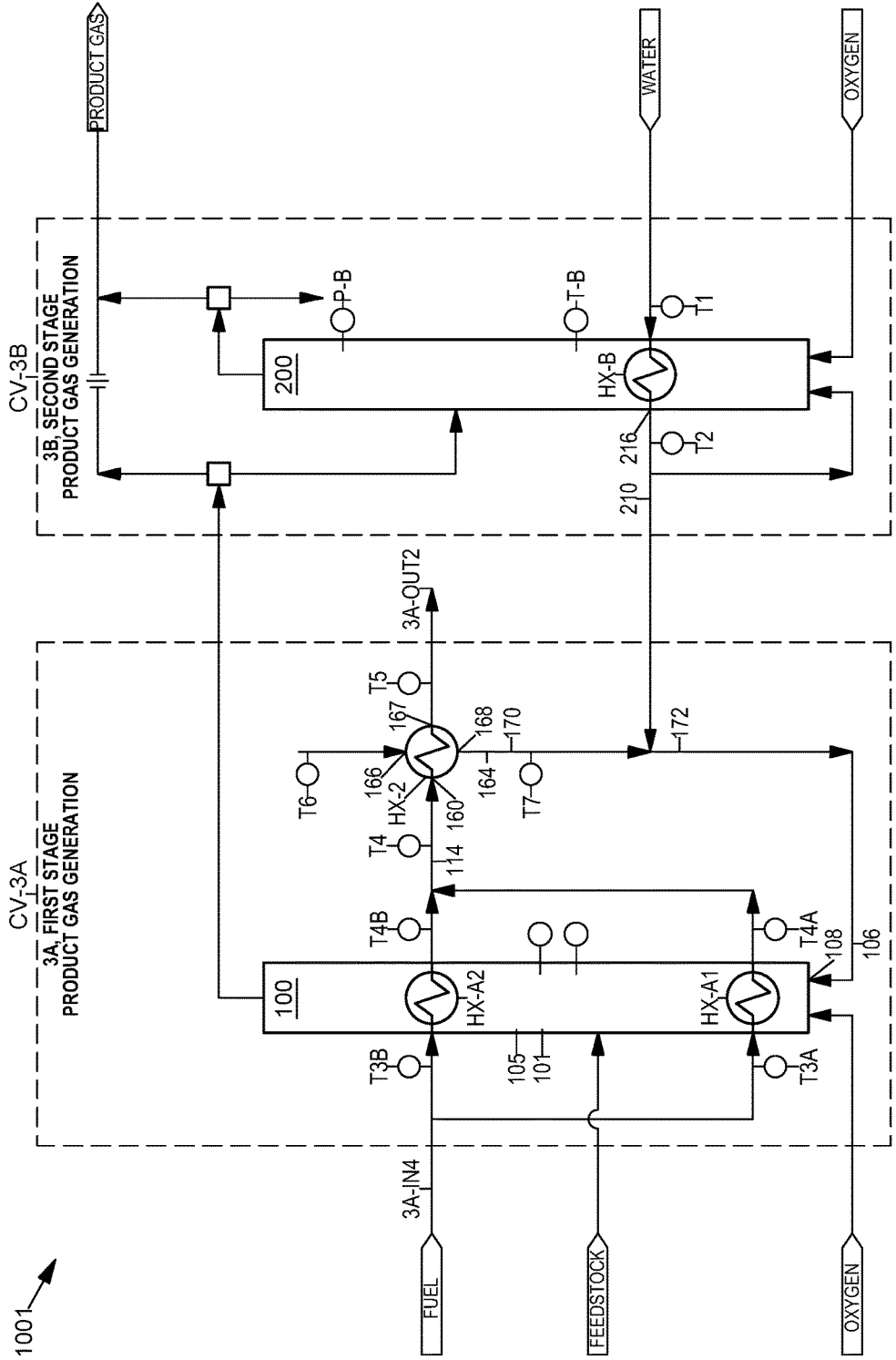
Figure 12:
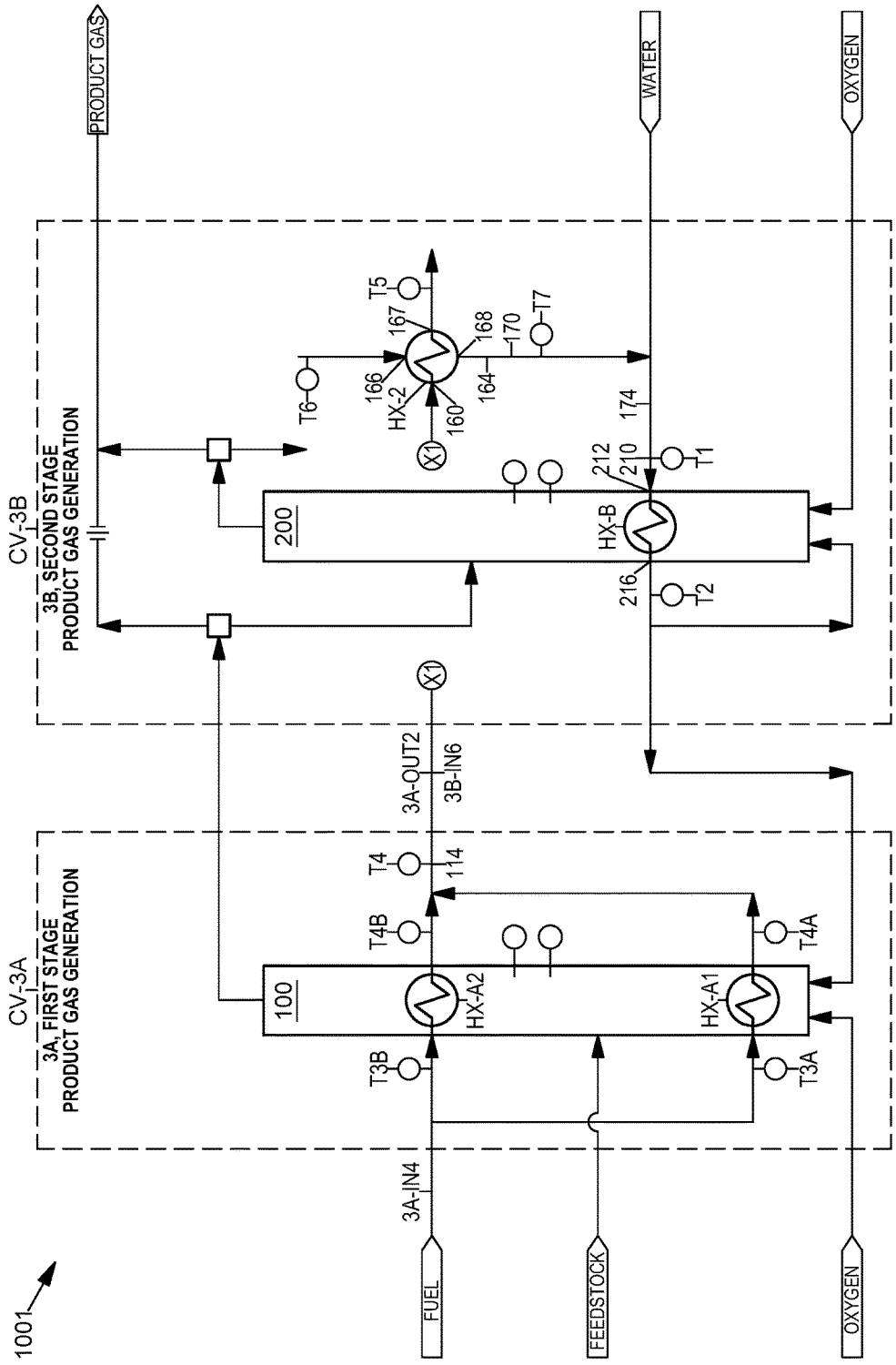
Figure 13:
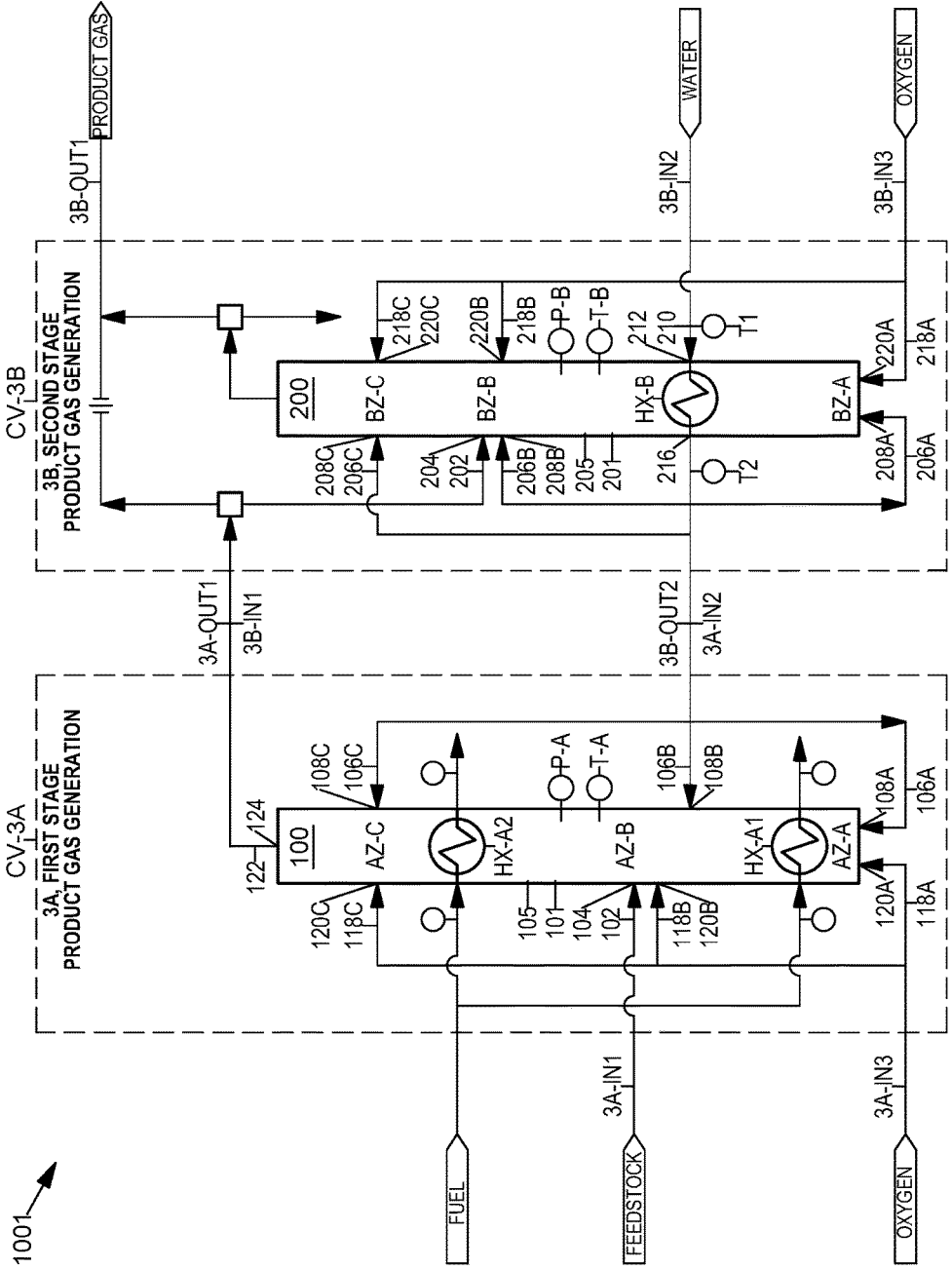
Figure 14:
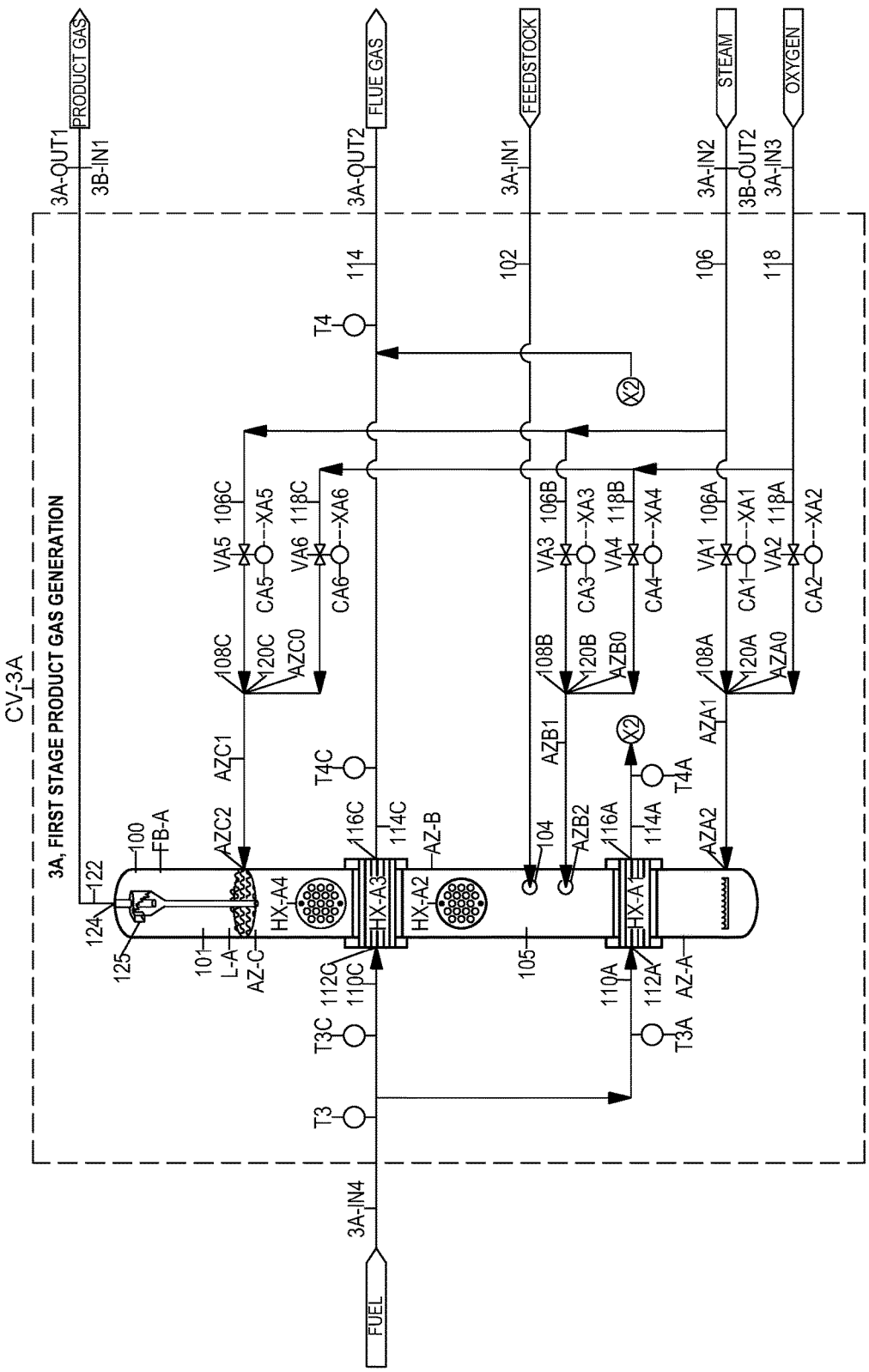
Figure 15:
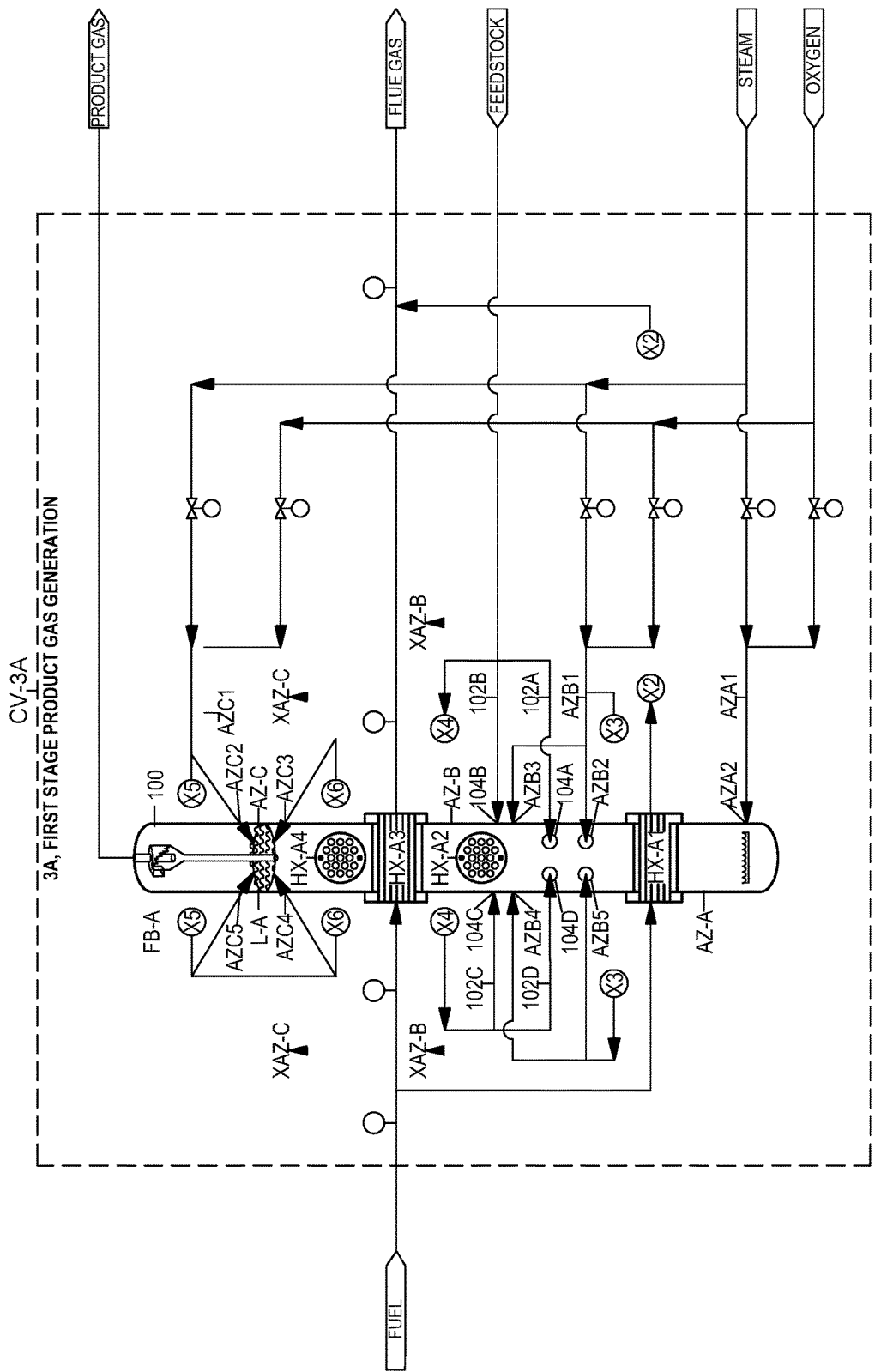
Figure 16B:
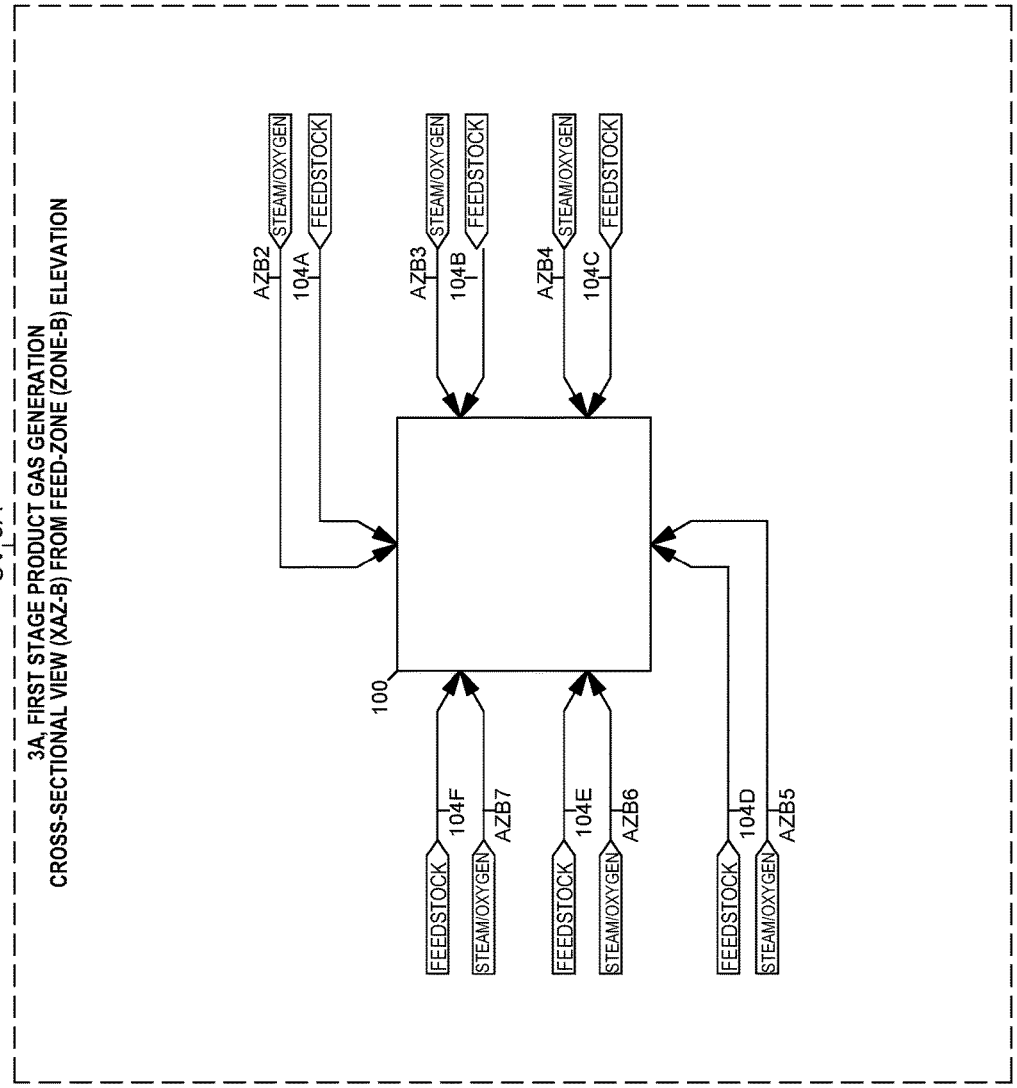
Figure 19:
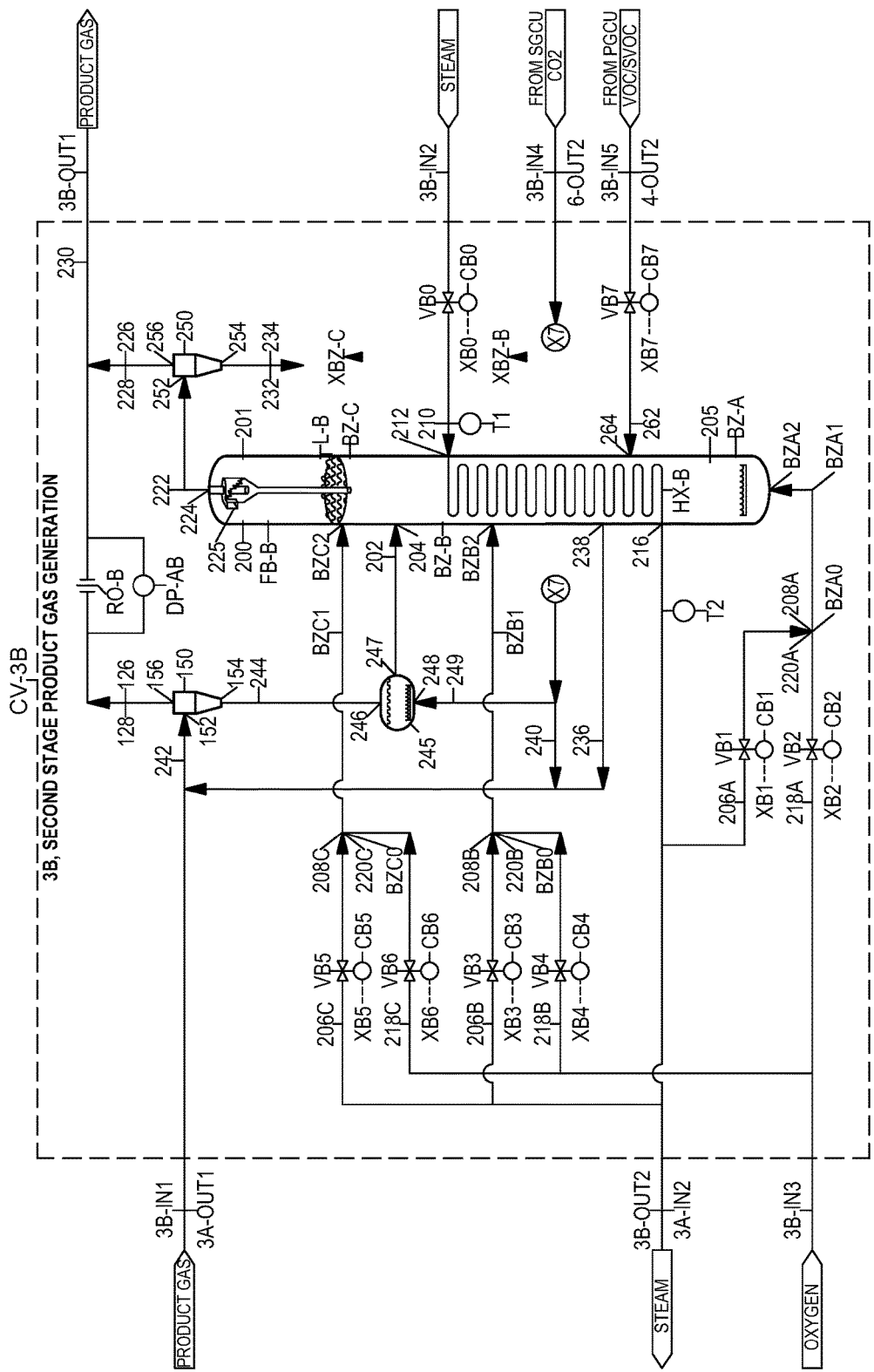
Figure 20:
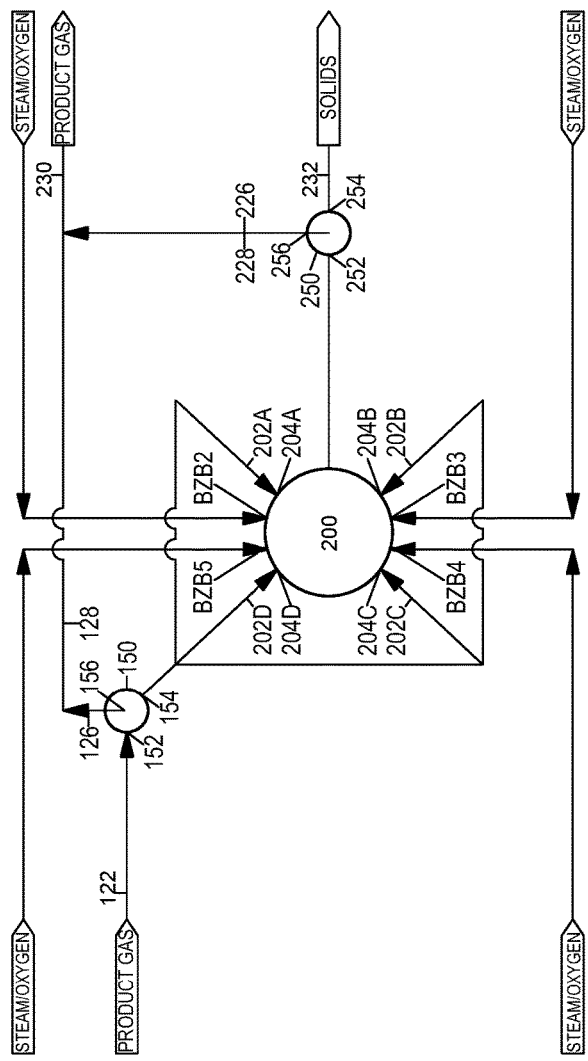
Figure 21:
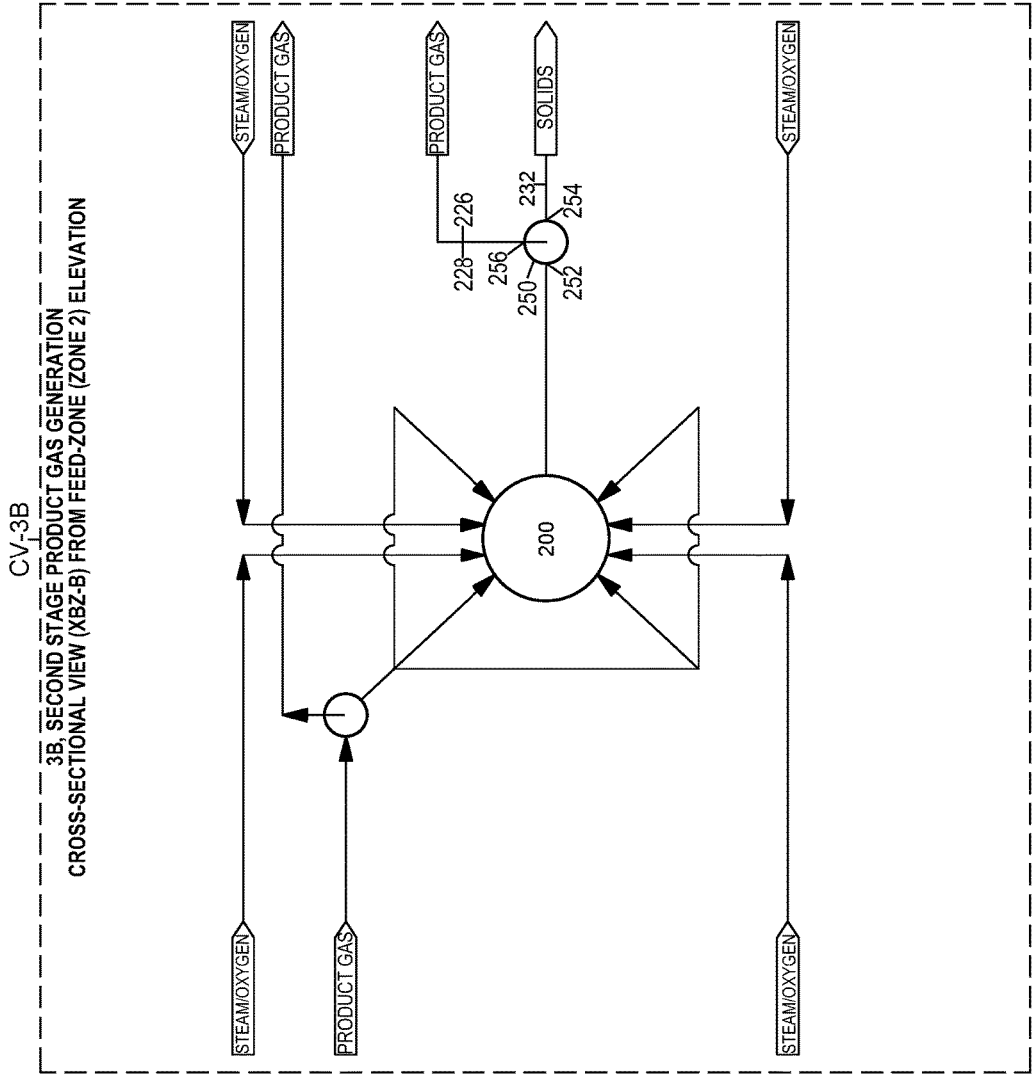
Figure 22:
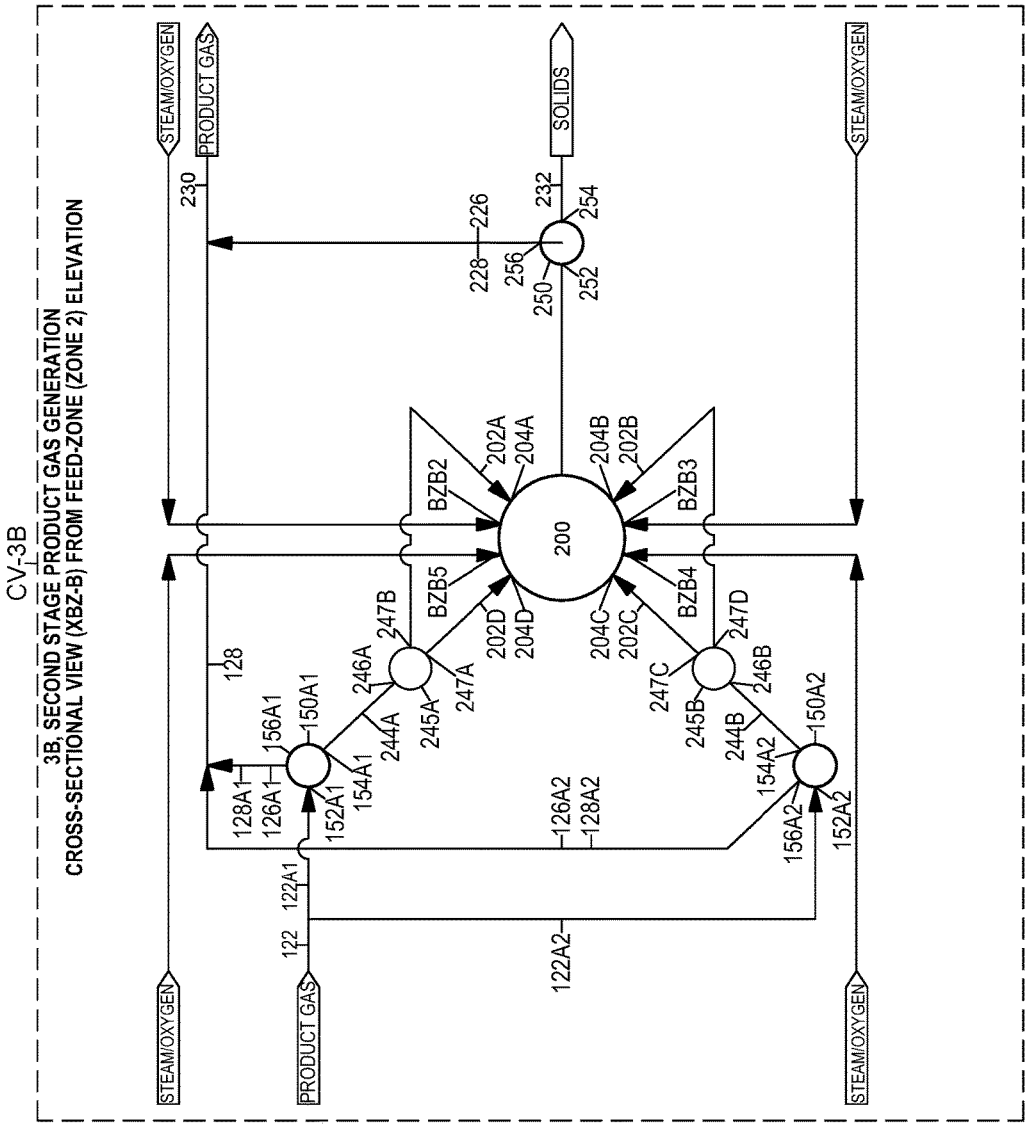
Figure 23:
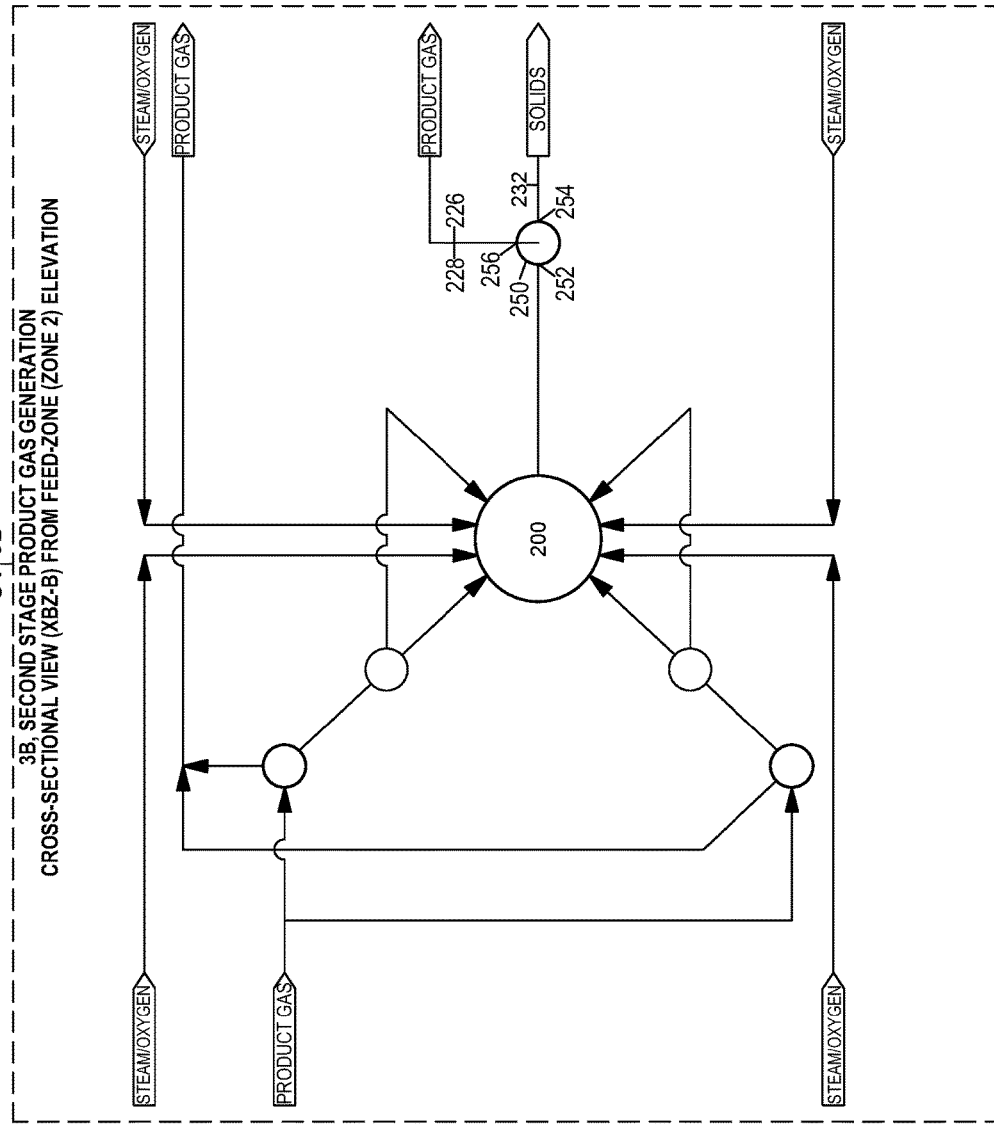
Figure 24:
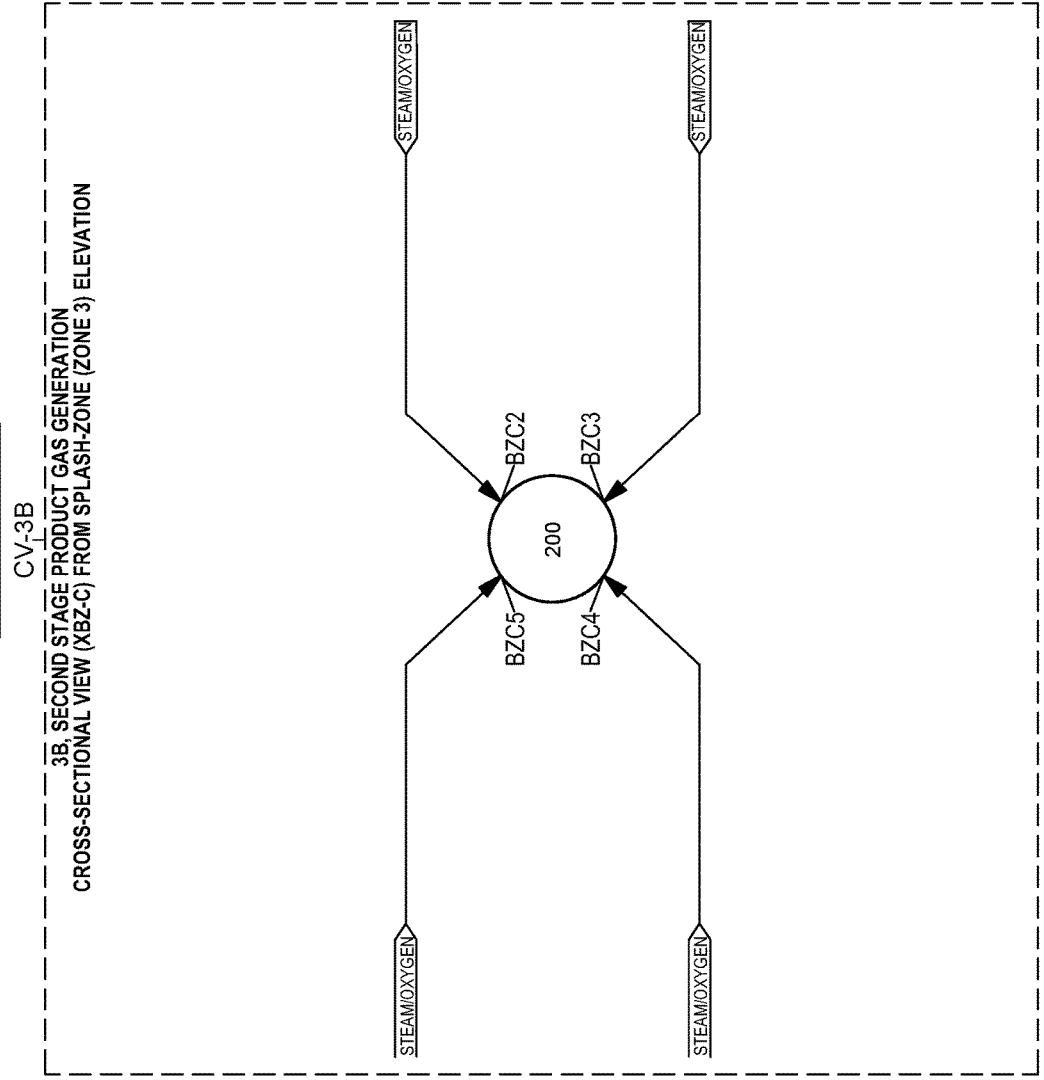
Figure 25:
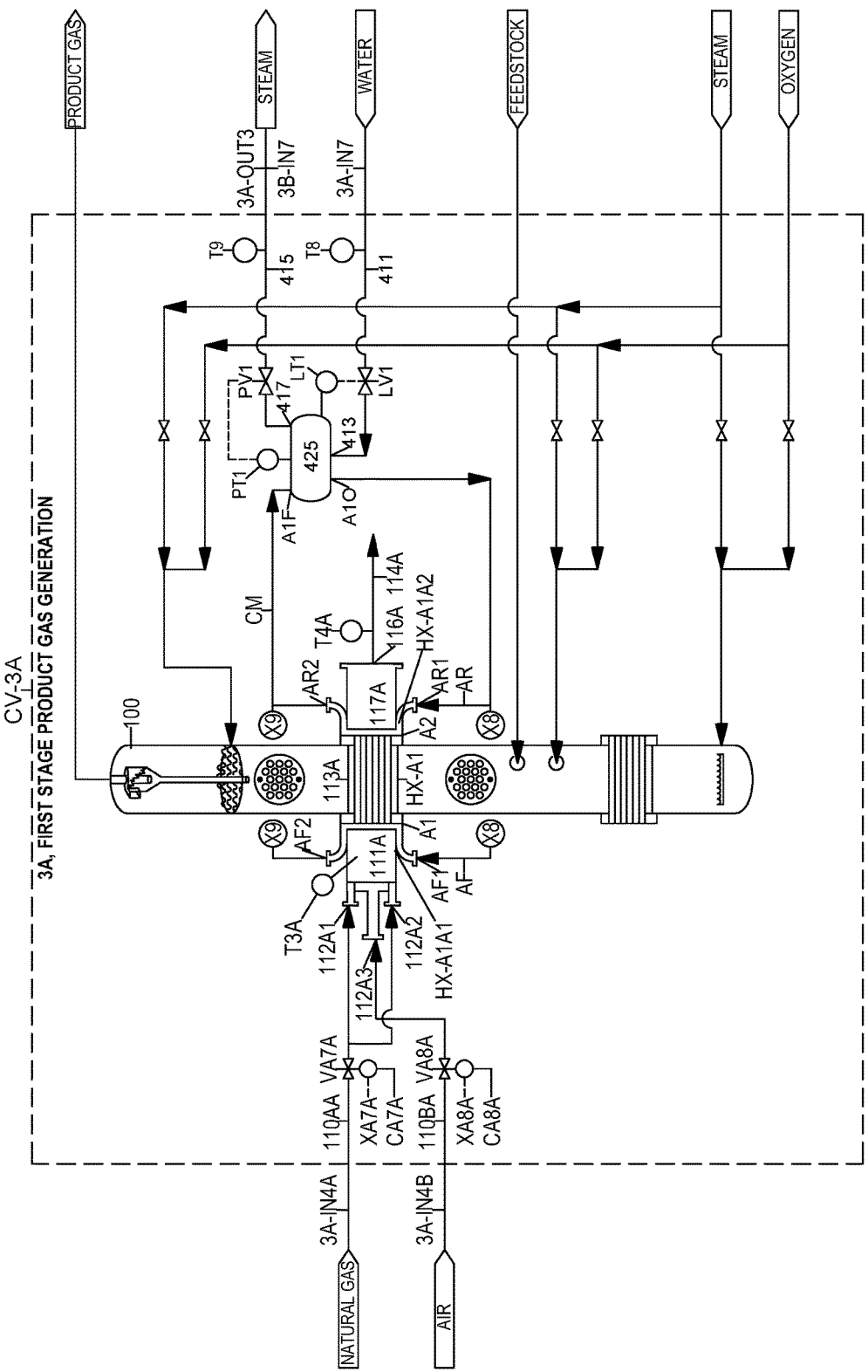
Figure 26:
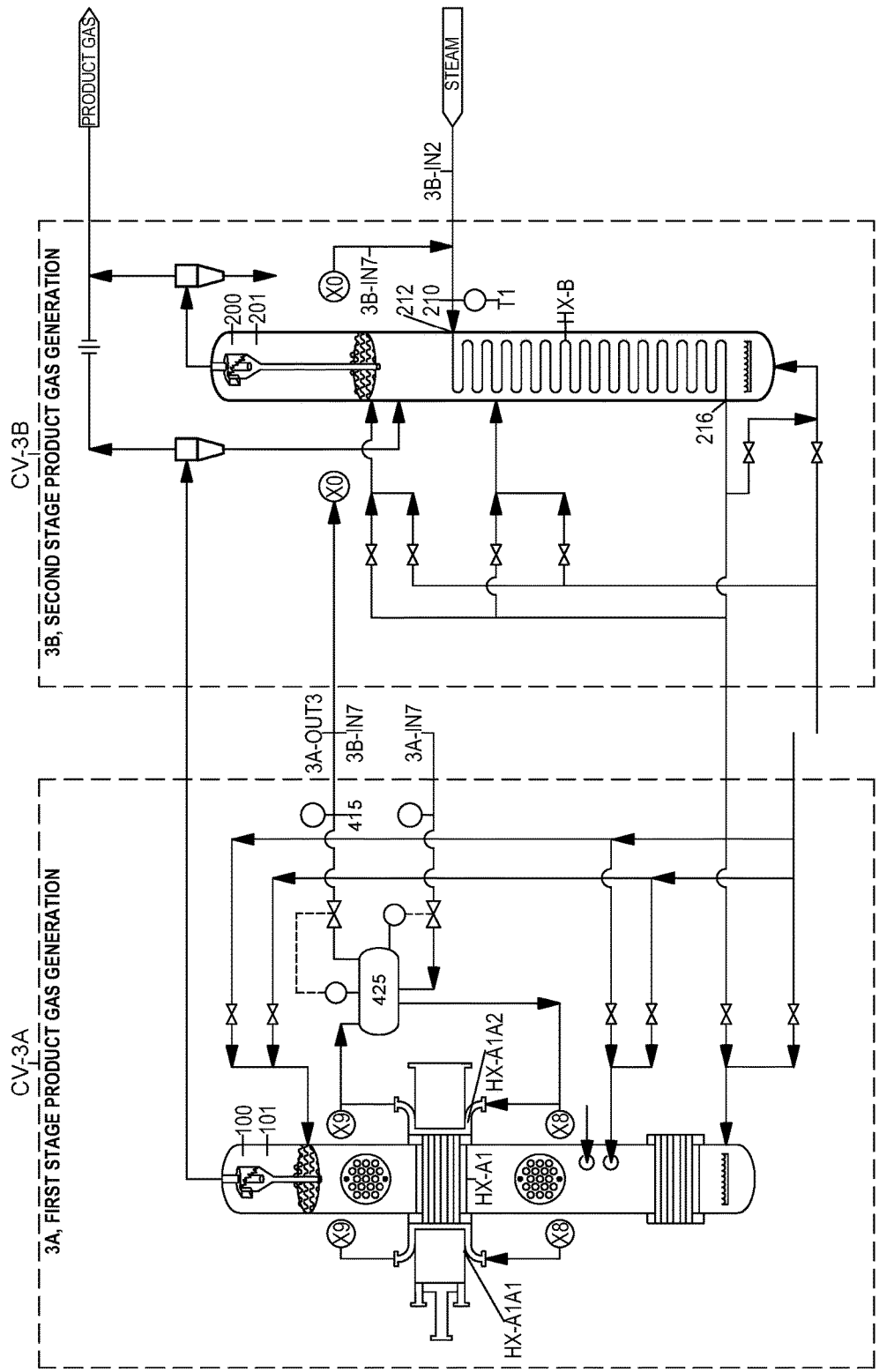
Figure 27:
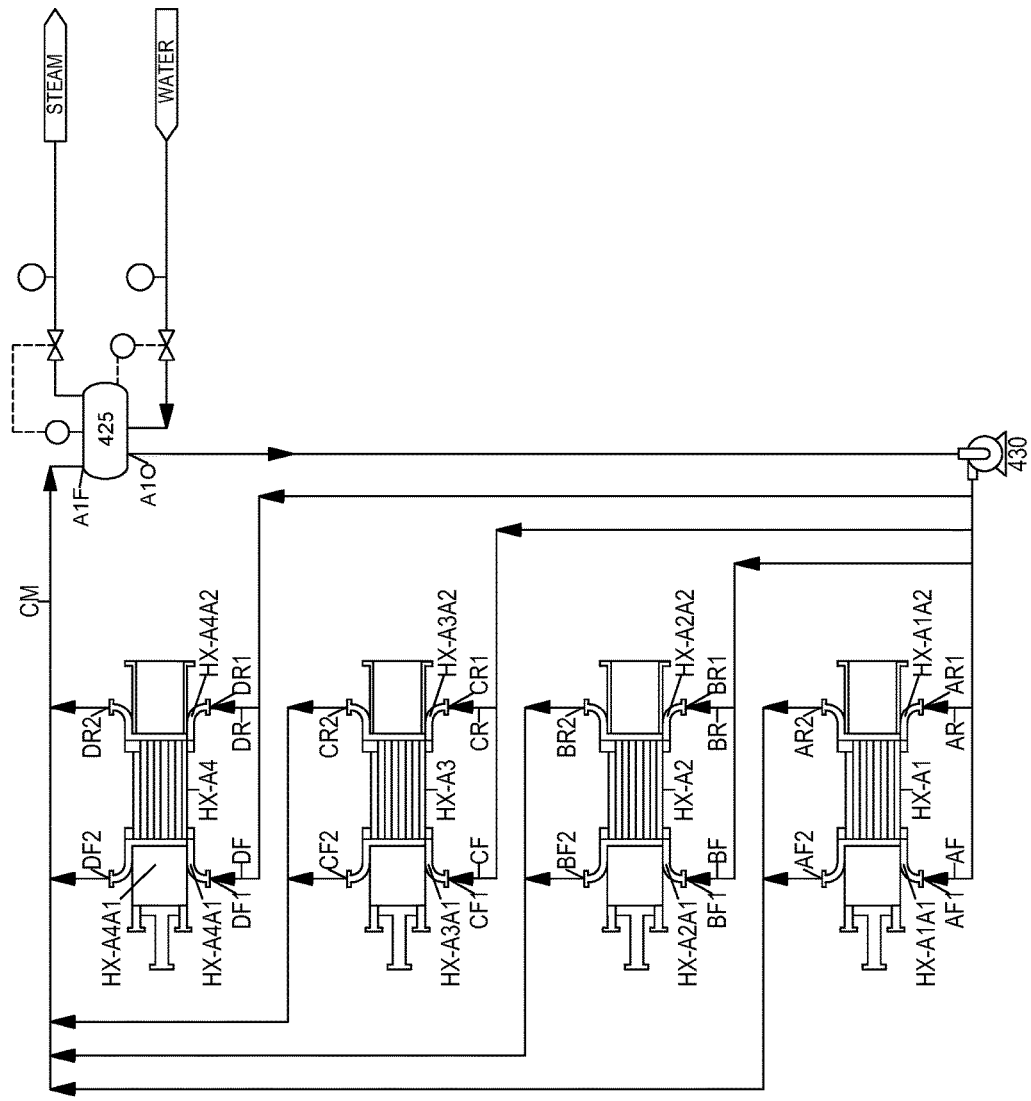
Figure 28:
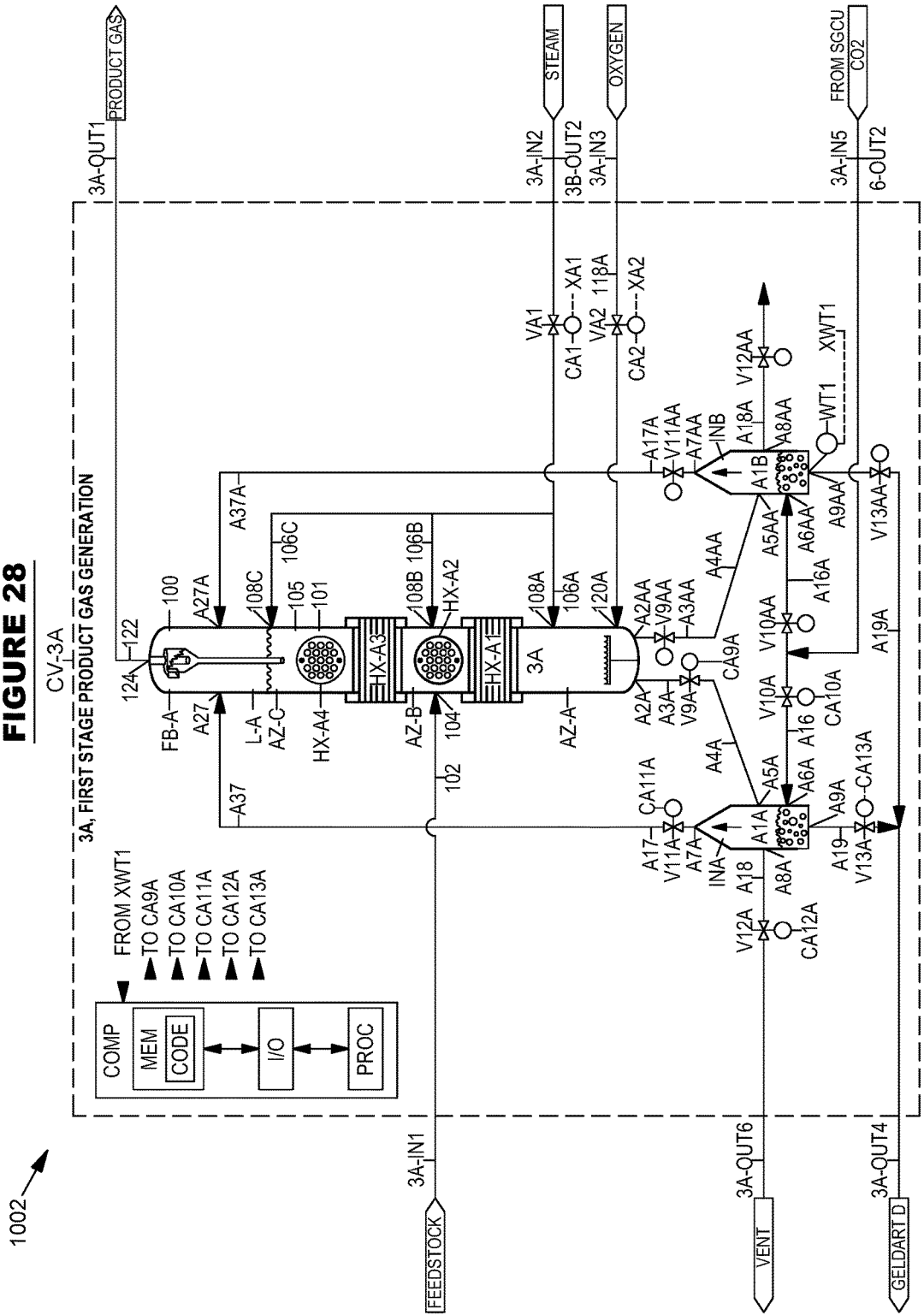

The accompanying figures show schematic process flow-charts of preferred embodiments and variations thereof. A full and enabling disclosure of the content of the accompanying claims, including the best mode thereof to one of ordinary skill in the art, is set forth more particularly in the remainder of the specification, including reference to the accompanying figures showing how the preferred embodiments and other non-limiting variations of other embodiments described herein may be carried out in practice, in which:

FIG. 1 shows a simplistic block flow control volume diagram of one non-limiting embodiment of a two-stage energy integrated product gas generation system (1001) including a first reactor (100), a first solids separation device (150), a second reactor (200), and a second reactor heat exchanger (HX-B) configured to transfer heat from the second reactor (200) to a heat transfer medium (210) for use as a reactant (106) in the first reactor (100);

FIG. 2 elaborates upon the non-limiting embodiment of FIG. 1 further including the first reactor (100) configured to receive particulate heat transfer material (205) present in the second interior (201) of the second reactor (200);

FIG. 3 elaborates upon the non-limiting embodiment of FIG. 1 further including the second reactor heat exchanger (HX-B) configured to transfer heat from the second reactor (200) to a heat transfer medium (210) for use as a reactant (206) in the second reactor (200);

FIG. 4 elaborates upon the non-limiting embodiment of FIG. 3 further including the first reactor (100) configured to receive particulate heat transfer material (205) present in the second interior (201) of the second reactor (200);

FIG. 5 elaborates upon the non-limiting embodiment of FIG. 3 further including the first reactor (100) configured to receive an oxygen-containing gas (118);

FIG. 6 elaborates upon the non-limiting embodiment of FIG. 5 further including the first reactor (100) configured to receive particulate heat transfer material (205) present in the second interior (201) of the second reactor (200);

FIG. 7 elaborates upon the non-limiting embodiment of FIG. 1 further including a first heat exchanger (HX-A) in thermal contact with the first interior (101) of the first reactor (100);

FIG. 8 elaborates upon the non-limiting embodiment of FIG. 7 further including the second reactor heat exchanger (HX-B) configured to transfer heat from the second interior (201) of the second reactor (200) to a heat transfer medium (210) for use as a reactant (206) in the second reactor (200);

FIG. 9 elaborates upon the non-limiting embodiment of FIG. 8 further including the first reactor (100) configured to receive an oxygen-containing gas (118);

FIG. 10 elaborates upon the non-limiting embodiment of FIG. 9 further including a second heat exchanger (HX-A2) in thermal contact with the first interior (101) of the first reactor (100);

FIG. 11 elaborates upon the non-limiting embodiment of FIG. 10 further including an auxiliary heat exchanger (HX-2) configured to transfer heat from a combustion stream (114) to an auxiliary heat exchanger heat transfer medium (164) for use as a reactant (106) to the first reactor (100);

FIG. 12 elaborates upon the non-limiting embodiment of FIG. 11 further including an auxiliary heat exchanger heat transfer medium outlet conduit (170) in fluid communication with the second reactor heat transfer medium inlet (212), to thereby supply the auxiliary heat exchanger heat transfer medium (164) to the second reactor heat exchanger (HX-B);

FIG. 13 elaborates upon the non-limiting embodiments of FIG. 10 further including utilizing at least a portion of the heat transfer medium (210) of the second reactor heat exchanger (HX-B) into any combination of the first reactor (100) dense bed zone (AZ-A), feed zone (AZ-B), or splash zone (AZ-C) or the second reactor (200) dense bed zone (BZ-A), feed zone (BZ-B), or splash zone (BZ-C);

FIG. 14 shows a detailed view of one non-limiting embodiment of a First Stage Product Gas Generation Control Volume (CV-3A) and First Stage Product Gas Generation System (3A) showing a first reactor (100) equipped with a dense bed zone (AZ-A), feed zone (AZ-B), and splash zone (AZ-C), along with the first reactor carbonaceous material input (104), valves, sensors, and controllers;

FIG. 15 elaborates upon the non-limiting embodiment of FIG. 14 further including multiple carbonaceous material inputs (104A,104B,104C,104D) and multiple feed zone steam/oxygen inputs (AZB2,AZB3,AZB4,AZB5) positioned in the feed zone (AZ-B) along with multiple splash zone steam/oxygen inputs (AZC2,AZC3,AZC4,AZC5) positioned in the splash zone (AZ-C);

FIG. 16A shows a non-limiting embodiment of a first reactor feed zone circular cross-sectional view (XAZ-B) from the embodiment of FIG. 15;

FIG. 16B shows a non-limiting embodiment of a first reactor feed zone rectangular cross-sectional view (XAZ-B) from the embodiment of FIG. 15;

FIG. 17 shows a non-limiting embodiment of a first reactor feed zone cross-sectional view (XAZ-B) from the embodiment of FIG. 15 where only two of the six first reactor (100) carbonaceous material inputs (104B,104E) are configured to inject carbonaceous material into vertically extending quadrants (Q1, Q2, Q3, Q4);

FIG. 18 shows a non-limiting embodiment of a first reactor splash zone cross-sectional view (XAZ-C) from the embodiment of FIG. 15;

FIG. 19 shows a detailed view of one non-limiting embodiment of a Second Stage Product Gas Generation Control Volume (CV-3B) and Second Stage Product Gas Generation System (3B) showing a second reactor (200) equipped with a dense bed zone (BZ-A), feed zone (BZ-B), and splash zone (BZ-C), along with a first solids separation device (150), second solids separation device (250), solids flow regulator (245), riser (236), dipleg (244), and valves, sensors, and controllers;

FIG. 20 shows a non-limiting embodiment of a second reactor feed zone cross-sectional view (XBZ-B) of the embodiment in FIG. 19, including: one first solids separation device (150); four second reactor first char inputs (204A, 204B,204C,204D); four feed zone steam/oxygen inputs (BZB2,BZB3,BZB4,BZB5); and, where the combined reactor product gas conduit (230) is configured to blend the first reactor product gas (126) with the second reactor product gas (226);

FIG. 21 shows a non-limiting embodiment of a second reactor feed zone cross-sectional view (XBZ-B) of the embodiment in FIG. 19 where the first reactor product gas (126) is not combined with the second reactor product gas (226);

FIG. 22 shows a non-limiting embodiment of a second reactor feed zone cross-sectional view (XBZ-B) of the embodiment in FIG. 19, including: two first solids separation devices (150A1,150A2); two solids flow regulators (245A,245B); four second reactor first char inputs (204A, 204B,204C,204D); four feed zone steam/oxygen inputs (BZB2,BZB3,BZB4,BZB5); and, where the combined reactor product gas conduit (230) is configured to blend the first reactor product gas (126) with the second reactor product gas (226);

FIG. 23 shows a non-limiting embodiment of a second reactor feed zone cross-sectional view (XBZ-B) of the embodiment in FIG. 22 where the first reactor product gas (126) is not combined with the second reactor product gas (226);

FIG. 24 shows a non-limiting embodiment of a second reactor splash zone cross-sectional view (XBZ-C) of the embodiment in FIG. 19, including four splash zone steam/oxygen inputs (BZC2,BZC3,BZC4,BZC5);

FIG. 25 shows the non-limiting embodiment of FIG. 14 further including a first reactor (100), steam drum (425), and a front tubesheet heat exchanger (HX-A1A1) in thermal contact with the first reactor (100) and a rear tubesheet heat exchanger (HX-A1A2) in thermal contact with the first reactor (100);

FIG. 26 elaborates upon the non-limiting embodiment of FIG. 25 further showing the front tubesheet heat transfer medium outlet (AF2) and the rear tubesheet heat transfer medium outlet (AR2) both in fluid communication with the second reactor heat transfer medium inlet (212), such that at least a portion of fluid exiting the front tubesheet heat transfer medium outlet (AF2) and the rear tubesheet heat transfer medium outlet (AR2) is provided as at least a portion of said heat transfer medium (210) at the second reactor heat transfer medium inlet (212);

FIG. 27 shows a non-limiting embodiment depicting a network of first reactor heat exchangers (HX-A1,HX-A2, HX-A3,HX-A4) including integral front tubesheet heat exchangers (HX-A1A1,HX-A2A1,HX-A3A1,HX-A4A1) and integral rear tubesheet heat exchangers (HX-A1A2,HX-A2A2,HX-A3A2,HX-A4A2) fluidly in communication with a steam drum (425) also showing a pump (430), sensors, and valves;

FIG. 28 elaborates upon the non-limiting embodiment of FIG. 14 further including two particulate classification vessels (A1A,A1B) that are configured to accept a bed material and inert feedstock contaminant mixture (A4A,A4AA) and a classifier gas (A16,A16A) and to clean and recycle the bed material portion back to the first interior (101) of the first reactor (100) while removing the inert feedstock contaminant portion from the system as a solids output (3A-OUT4).

Figure 30:
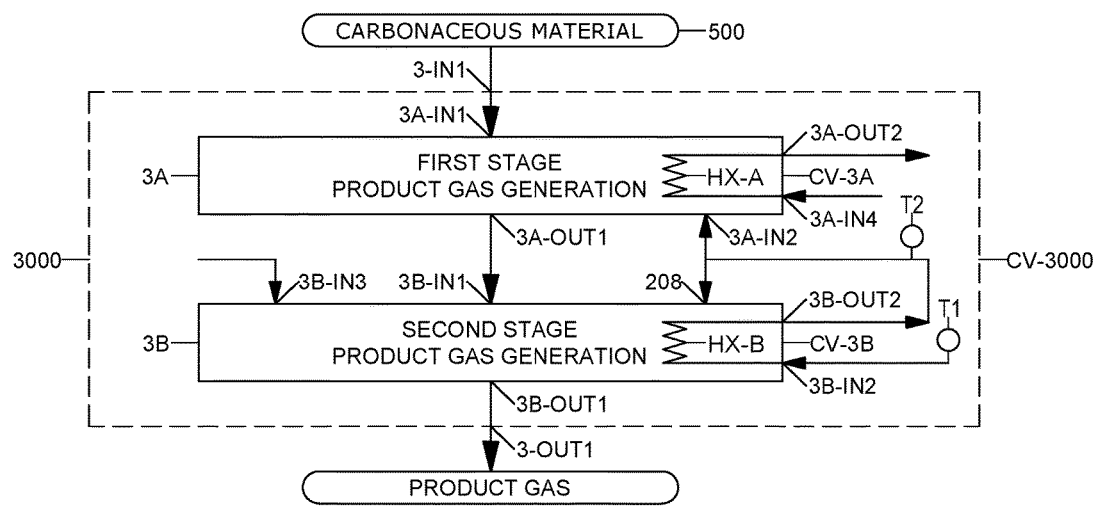

FIG. 29 depicts the Classification Valve States for Automated Controller Operation of a typical particulate classification procedure. FIG. 29 is to be used in conjunction with FIG. 28 and depicts a listing of valve states that may be used in a variety of methods to operate valves associated with the particulate classification vessels (A1A,A1B). FIG. 30 shows a simplistic block flow control volume diagram of one embodiment of an two-stage energy integrated product gas generation system (1001) used as a Product Gas Generation System (3000);

FIG. 31 shows an embodiment of a two-stage energy integrated product gas generation method;

FIG. 32 shows Product Gas Generation System (3000) of FIG. 28 utilized in an entire Refinery Superstructure (RSS) system;

FIG. 33 shows Primary Gas Clean-Up Heat Exchanger (HX-4) in fluid communication with the second reactor heat transfer medium inlet (212) and configured to remove heat from at least a portion of the product gas input (4-IN1).

NOTATION AND NOMENCLATURE

Before the disclosed systems and processes are described, it is to be understood that the aspects described herein are not limited to specific embodiments, apparatus, or configurations, and as such can, of course, vary. It is also to be understood that the terminology used herein is for the purpose of describing particular aspects only and, unless specifically defined herein, is not intended to be limiting.

The idea of a control volume is an extremely general concept used widely in the study and practice of chemical engineering. Control volumes may be used in applications that analyze physical systems by utilization of the laws of conservation of mass and energy. They may be employed during the analysis of input and output data of an arbitrary space, or region, usually being a chemical process, or a portion of a chemical process. They may be used to define process streams entering a single piece of chemical equipment that performs a certain task, or they may be used to define process streams entering a collection of equipment, and assets which work together to perform a certain task.

With respect to the surrounding text, a control volume is meaningful in terms of defining the boundaries of a particular product gas generation sequence step or a sequence step related to the overarching topography of an entire refinery superstructure. The arrangements of equipment contained within each control volume are the preferred ways of accomplishing each sequence step. Furthermore, all preferred embodiments are non-limiting in that any number of combinations of unit operations, equipment and assets, including pumping, piping, and instrumentation, may be used as an alternate. However, it has been our realization that the preferred embodiments that make up each sequence step are those which work best to generate a product gas from a carbonaceous material using two separate and successive upstream and downstream thermochemical reactors that cooperate to efficiently and substantially completely convert a carbonaceous material into product gas while sharing heat from successive endothermic and exothermic reactions. Nonetheless, any types of unit operations or processes may be used within any control volume shown as long as it accomplishes the goal of that particular sequence step.

As used herein the term "carbonaceous material" refers to a solid or liquid substance that contains carbon such as for instance, agricultural residues, agro-industrial residues, animal waste, biomass, cardboard, coal, coke, energy crops, farm slurries, fishery waste, food waste, fruit processing waste, lignite, municipal solid waste (MSW), paper, paper mill residues, paper mill sludge, paper mill spent liquors, plastics, refuse derived fuel (RDF), sewage sludge, tires, urban waste, wood products, wood wastes and a variety of others. All carbonaceous materials contain both "fixed carbon feedstock components" and "volatile feedstock components", such as for example woody biomass, MSW, or RDF.

As used herein the term "char" refers to a carbon-containing solid residue derived from a carbonaceous material and is comprised of the "fixed carbon feedstock components" of a carbonaceous material.

As used herein the term "fixed carbon feedstock components" refers to feedstock components present in a carbonaceous material other than volatile feedstock components, contaminants, ash or moisture. Fixed carbon feedstock components are usually solid combustible residue remaining after the removal of moisture and volatile feedstock components from a carbonaceous material.

As used herein the term "volatile feedstock components" refers to components within a carbonaceous material other than fixed carbon feedstock components, contaminants, ash or moisture.

As used herein the term "inert feedstock contaminants" or "inert contaminants" refers to Geldart Group D particles contained within a MSW and/or RDF carbonaceous material. Geldart Group D solids comprise whole units and/or fragments of one or more of the group consisting of allen wrenches, ball bearings, batteries, bolts, bottle caps, broaches, bushings, buttons, cable, cement, chains, clips, coins, computer hard drive shreds, door hinges, door knobs, drill bits, drill bushings, drywall anchors, electrical components, electrical plugs, eye bolts, fabric snaps, fasteners, fish hooks, flash drives, fuses, gears, glass, gravel, grommets, hose clamps, hose fittings, jewelry, key chains, key stock, lathe blades, light bulb bases, magnets, metal audio-visual components, metal brackets, metal shards, metal surgical supplies, mirror shreds, nails, needles, nuts, pins, pipe fittings, pushpins, razor blades, reamers, retaining rings, rivets, rocks, rods, router bits, saw blades, screws, sockets, springs, sprockets, staples, studs, syringes, USB connectors, washers, wire, wire connectors, and zippers.

Generally speaking, Geldart grouping is a function of bed material particle size and density and the pressure at which the fluidized bed operates. In the present context which is related to systems and/or methods for converting municipal solid waste (MSW) into a product gas using a fluidized bed, Geldart C Group solids range in size from between about 0 and 29.99 microns, Geldart A Group solids range in size from between about 30 microns to 99.99 microns, Geldart B Group solids range in size from between about 100 and 999.99 microns, and, Geldart D Group solids range in size greater than about 1,000 microns.

As used herein the term "product gas" refers to volatile reaction products, syngas, or flue gas discharged from a thermochemical reactor undergoing thermochemical processes including hydrous devolatilization, pyrolysis, steam reforming, partial oxidation, dry reforming, or combustion.

As used herein the term "syngas" refers to a mixture of carbon monoxide (CO), hydrogen (H2), and other vapors/gases, also including char, if any and usually produced when a carbonaceous material reacts with steam (H2O), carbon dioxide (CO2) and/or oxygen (O2). While steam is the reactant in steam reforming, CO2 is the reactant in dry reforming. Generally, for operation at a specified temperature, the kinetics of steam reforming is faster than that of dry reforming and so steam reforming tends to be favored and more prevalent. Syngas might also include volatile organic compounds (VOC) and/or semi-volatile organic compounds (VOC).

As used herein the term "volatile organic compounds" or acronym "(VOC)" or "VOC" refer to aromatics including benzene, toluene, phenol, styrene, xylene, and cresol. It also refers to low molecular weight hydrocarbons like methane, ethane, ethylene, propane, propylene, etc.

As used herein the term "semi-volatile organic compounds" or acronym "(SVOC)" or "SVOC" refer to polyaromatics, such as indene, indane, naphthalene, methylnaphthalene, acenaphthylene, acenaphthalene, anthracene, phenanthrene, (methyl-) anthracenes/phenanthrenes, pyrene/fluoranthene, methylpyrenes/benzofluorenes, chrysene, benz[a]anthracene, methylchrysenes, methylbenz[a]anthracenes, perylene, benzo[a]pyrene, dibenz[a,kl]anthracene, and dibenz[a,h]anthracene.

As used herein the term "volatile reaction products" refers to vapor or gaseous organic species that were once present in a solid or liquid state as volatile feedstock components of a carbonaceous material wherein their conversion or vaporization to the vapor or gaseous state was promoted by the processes of either hydrous devolatilization and/or pyrolysis. Volatile reaction products may contain both, non-condensable species, and condensable species which are desirable for collection and refinement.

As used herein the term "oxygen-containing gas" refers to air, oxygen-enriched-air i.e. greater than 21 mole % O2, and substantially pure oxygen, i.e. greater than about 95 mole % oxygen (the remainder usually comprising N2 and rare gases).

As used herein the term "flue gas" refers to a vapor or gaseous mixture containing varying amounts of nitrogen (N2), carbon dioxide (CO2), water (H2O), and oxygen (O2). Flue gas is generated from the thermochemical process of combustion.

As used herein the term "thermochemical process" refers to a broad classification including various processes that can convert a carbonaceous material into product gas. Among the numerous thermochemical processes or systems that can be considered for the conversion of a carbonaceous material, the present disclosure contemplates: hydrous devolatilization, pyrolysis, steam reforming, partial oxidation, dry reforming, and/or combustion. Thermochemical processes may be either endothermic or exothermic in nature depending upon the specific set of processing conditions employed. Stoichiometry and composition of the reactants, type of reactants, reactor temperature and pressure, heating rate of the carbonaceous material, residence time, carbonaceous material properties, and catalyst or bed additives all dictate what sub classification of thermochemical processing the system exhibits.

As used herein the term "thermochemical reactor" refers to a reactor that accepts a carbonaceous material or char and converts it into one or more product gases.

Hydrous Devolatilization Reaction:

As used herein the term "hydrous devolatilization" refers to an endothermic thermochemical process wherein volatile feedstock components of a carbonaceous material are converted primarily into volatile reaction products in a steam environment. Typically this sub classification of a thermochemical process involves the use of steam as a reactant and involves temperatures ranging from 320° C. and 569.99° C. (608° F. and 1,057.98° F.), depending upon the carbonaceous material chemistry. Hydrous devolatilization permits release and thermochemical reaction of volatile feedstock components leaving the fixed carbon feedstock components mostly unreacted as dictated by kinetics.

Carbonaceous material+steam+heat→Volatile Reaction Products+Fixed Carbon Feedstock Components+steam Pyrolysis Reaction:

As used herein the term "pyrolysis" or "devolatilization" is the endothermic thermal degradation reaction that organic material goes through in its conversion into a more reactive liquid/vapor/gas state.

Carbonaceous material+heat→VOC+SVOC+H2O+ CO+CO2+H2+CH4+Other Organic Gases (Cx-HyOz)+Fixed Carbon Feedstock Components Steam Reforming Reaction:

As used herein the term "steam reforming" refers to a thermochemical process where steam reacts with a carbonaceous material to yield syngas. The main reaction is endothermic (consumes heat) wherein the operating temperature range is between 570° C. and 900° C. (1,058° F. and 1,652° F.), depending upon the feedstock chemistry.

H2O+C+Heat→H2+CO

Water Gas Shift Reaction:

As used herein the term "water-gas shift" refers to a thermochemical process comprising a specific chemical reaction that occurs simultaneously with the steam reforming reaction to yield hydrogen and carbon dioxide. The main reaction is exothermic (releases heat) wherein the operating temperature range is between 570° C. and 900° C. (1,058° F. and 1,652° F.), depending upon the feedstock chemistry.

H2O+CO→H2+CO2+Heat

Dry Reforming Reaction:

As used herein the term "dry reforming" refers to a thermochemical process comprising a specific chemical reaction where carbon dioxide is used to convert a carbonaceous material into carbon monoxide. The reaction is endothermic (consumes heat) wherein the operating temperature range is between 600° C. and 1,000° C. (1,112° F. and 1,832° F.), depending upon the feedstock chemistry.

CO2+C+Heat→2CO

Partial Oxidation Reactions:

As used herein the term "partial oxidation" refers to a thermochemical process wherein substoichiometric oxidation of a carbonaceous material takes place to exothermically produce carbon monoxide, carbon dioxide and/or water vapor. The reactions are exothermic (release heat) wherein the operating temperature range is between 500° C. and 1,400° C. (932° F. and 2,552° F.), depending upon the feedstock chemistry. Oxygen reacts exothermically (releases heat): 1) with the carbonaceous material to produce carbon monoxide and carbon dioxide; 2) with hydrogen to produce water vapor; and 3) with carbon monoxide to produce carbon dioxide.

4C+3O2→CO+CO2+Heat

C+½O2→CO+Heat

H2+½O2→H2O+Heat

CO+½O2→CO2+Heat

Combustion Reaction:

As used herein the term "combustion" refers to an exothermic (releases heat) thermochemical process wherein at least the stoichiometric oxidation of a carbonaceous material takes place to generate flue gas.

C+O2→CO2+Heat

Some of these reactions are fast and tend to approach chemical equilibrium while others are slow and remain far from reaching equilibrium. The composition of the product gas will depend upon both quantitative and qualitative factors. Some are unit specific i.e. fluidized bed size/scale specific and others are feedstock specific. The quantitative parameters are: feedstock properties, feedstock injection flux, reactor operating temperature, pressure, gas and solids residence times, feedstock heating rate, fluidization medium and fluidization flux; the qualitative factors are: degree of bed mixing and gas/solid contact, and uniformity of fluidization and feedstock injection.

FIG. 1:

FIG. 1 shows a simplistic block flow control volume diagram of one non-limiting embodiment of a two-stage energy integrated product gas generation system (1001) including a first reactor (100), a first solids separation device (150), a second reactor (200), and a second reactor heat exchanger (HX-B) configured to transfer heat from the second reactor (200) to a heat transfer medium (210) for use as a reactant (106) in the first reactor (100). In embodiments, water in the liquid or vapor form are used as the second reactor heat transfer medium (210). In embodiments, carbon dioxide or product gas is used as the second reactor heat transfer medium (210).

The system (1001) includes a First Stage Product Gas Generation Control Volume (CV-3A) having a First Stage Product Gas Generation System (3A) that cooperates with a downstream Second Stage Product Gas Generation Control Volume (CV-3B) having a Second Stage Product Gas Generation System (3B) to efficiently convert a carbonaceous material into product gas while sharing heat from upstream endothermic and downstream exothermic reactions.

The First Stage Product Gas Generation Control Volume (CV-3A) has a carbonaceous material input (3A-IN1), a product gas output (3A-OUT1), and a first reactor reactant input (3A-IN2). The Second Stage Product Gas Generation Control Volume (CV-3B) has a first reactor product gas input (3B-IN1), a second reactor heat transfer medium input (3B-IN2), and an oxygen-containing gas input (3B-IN3).

In the embodiment of FIG. 1, the second reactor heat transfer medium input (3B-IN2) is water in the liquid state or vapor state or a combination of both. In other embodiments, the second reactor heat transfer medium input (3B-IN2) can be carbon dioxide, product gas, Fischer-Tropsch tail gas, naphtha, hydrocarbons, nitrogen, or air or a combination thereof as appropriate.

The Second Stage Product Gas Generation Control Volume (CV-3B) also has a product gas output (3B-OUT1) and a second reactor heat transfer medium output (3B-OUT2). The first reactor product gas input (3B-IN1) to the Second Stage Product Gas Generation Control Volume (CV-3B) is the product gas output (3A-OUT1) from the First Stage Product Gas Generation Control Volume (CV-3A). The first reactor reactant input (3A-IN2) to the First Stage Product Gas Generation Control Volume (CV-3A) is the second reactor heat transfer medium output (3B-OUT2) from the Second Stage Product Gas Generation Control Volume (CV-3B).

The First Stage Product Gas Generation Control Volume (CV-3A) having a First Stage Product Gas Generation System (3A) also has a first reactor (100) with a first interior (101) containing a first reactor particulate heat transfer material (105), otherwise referred to as bed material.

In embodiments, the first reactor particulate heat transfer material (105) is comprised of Geldart Group A or Group B solids in the form of inert material, catalyst, sorbent, or engineered particles. The engineered particles may be made of alumina, zirconia, sand, olivine sand, limestone, dolomite, or catalytic materials, any of which may be hollow in form, such as microballoons or microspheres. The preferred first reactor particulate heat transfer material (105) is Geldart Group B alumina microspheres. The first reactor particulate heat transfer material (105) enhances mixing, heat and mass transfer, and reaction between the carbonaceous material (102) and the reactant or oxygen-containing gas introduced to the first reactor (100).

The first interior (101) of the first reactor (100) is configured to accept a carbonaceous material (102) through a first reactor carbonaceous material input (104). The first interior (101) of the first reactor (100) is configured to accept a first reactor reactant (106) through a first reactor reactant input (108). The first reactor (100) is configured to generate a first reactor product gas (122) that is discharged from the first interior (101) through a first reactor product gas output (124).

The first reactor product gas (122) exits the First Stage Product Gas Generation System (3A) through a first reactor product gas output (3A-OUT1). The carbonaceous material (102) enters the First Stage Product Gas Generation System (3A) through a carbonaceous material input (3A-IN1). The first reactor reactant (106) enters the First Stage Product Gas Generation System (3A) through a first reactor reactant input (3A-IN2).

A first reactor product gas output (3A-OUT1) is discharged from the First Stage Product Gas Generation System (3A) and enters the Second Stage Product Gas Generation System (3B) as a first reactor product gas input (3B-IN1). The Second Stage Product Gas Generation Control Volume (CV-3B) having a Second Stage Product Gas Generation System (3B) also has a second reactor (200) with a second interior (201) containing a second reactor particulate heat transfer material (205).

In embodiments, the second reactor particulate heat transfer material (205) is comprised of Geldart Group A or Group B solids in the form of inert material or catalyst or sorbent or engineered particles. The engineered particles may be made of alumina, zirconia, sand, olivine sand, limestone, dolomite, or catalytic materials, any of which may be hollow in form, such as microballoons or microspheres. The preferred first reactor particulate heat transfer material (105) is Geldart Group B alumina microspheres. The second reactor particulate heat transfer material (205) enhances mixing, heat and mass transfer, and reaction between the char (202) and the reactant or oxygen-containing gas introduced to the second reactor (200).

The Second Stage Product Gas Generation Control Volume (CV-3B) having a Second Stage Product Gas Generation System (3B) also has a first solids separation device (150). The first solids separation device (150) has: a first separation input (152) in fluid communication with the first reactor product gas output (124); a first separation char output (154) in fluid communication with the second reactor char input (204); and a first separation gas output (156).

The second reactor (200) is configured to accept a char (202) through a second reactor char input (204) to the second interior (201). The second reactor (200) has a second reactor pressure (P-B) and a second reactor temperature (T-B).

The first separation char output (154) of the first solids separation device (150) is configured to output char (202) and is in fluid communication with the second reactor (200) via a second reactor char input (204). The first separation gas output (156) of the first solids separation device (150) is configured to output a char depleted first reactor product gas (126) via a char depleted first reactor product gas conduit (128). The second reactor (200) is also configured to accept a second reactor oxygen-containing gas (218) through a second reactor oxygen-containing gas input (220) to the second interior (201).

The second reactor oxygen-containing gas (218) enters the Second Stage Product Gas Generation System (3B) through an oxygen-containing gas input (3B-IN3). The second reactor (200) is configured to generate a second reactor product gas (222) that is discharged from the second interior (201) through a second reactor product gas output (224).

The Second Stage Product Gas Generation Control Volume (CV-3B) having a Second Stage Product Gas Generation System (3B) also has a second solids separation device (250). The second solids separation device (250) has: a second separation input (252) in fluid communication with the second reactor product gas output (224); a second separation solids output (254) in fluid communication with a solids transfer conduit (234); and a second separation gas output (256). The second separation gas output (256) of the second solids separation device (250) is configured to output a solids depleted second reactor product gas (226) via a solids depleted second reactor product gas conduit (228). The second separation solids output (254) of the second solids separation device (250) is configured to output a second reactor separated solids (232) via a solids transfer conduit (234).

A combined reactor product gas conduit (230) is in fluid communication with both the first separation gas output (156) and the second separation gas output (256) and configured to combine product gas created by both the first reactor (100) and the second reactor (200). Thus, the product gas created by both the first reactor (100) and the second reactor (200) are directed to the product gas output (3B-OUT1). More specifically, combined reactor product gas conduit (230) is in fluid communication with both the char depleted first reactor product gas conduit (128) and the solids depleted second reactor product gas conduit (228) and configured to combine the char depleted first reactor product gas (126) created by the first reactor (100) and the solids depleted second reactor product gas (226) created by the second reactor (200). In embodiments, the product gas generated in the first reactor (100) and the second reactor (200) are not combined.

The char depleted first reactor product gas (126) may pass through a restriction orifice (RO-B) prior to being combined with the solids depleted second reactor product gas (226) created by the second reactor (200). In embodiments, the first reactor pressure (P-A) may be greater than the second reactor pressure (P-B). In embodiments, the first reactor pressure (P-A) may be less than the second reactor pressure (P-B). The first reactor (100) has a first reactor pressure (P-A) and a first reactor temperature (T-A). In embodiments, the first reactor temperature (T-A) may be greater than the second reactor temperature (T-B). In embodiments, the first reactor temperature (T-A) may be less than the second reactor temperature (T-B).

A second reactor heat exchanger (HX-B) is in thermal contact with the second interior (201) of the second reactor (200). The second reactor heat exchanger (HX-B) comprises: a second reactor heat transfer medium inlet (212) configured to receive a heat transfer medium (210) at a second reactor inlet temperature (T1); and a second reactor heat transfer medium outlet (216) configured to output the heat transfer medium (210), at a higher, second reactor outlet temperature (T2).

The heat transfer medium (210) enters the Second Stage Product Gas Generation System (3B) through a second reactor heat transfer medium input (3B-IN2). A second reactor heat transfer medium output (3B-OUT2) is discharged from the Second Stage Product Gas Generation System (3B) and enters the First Stage Product Gas Generation System (3A) as a first reactor product gas input (3A-IN2). The first reactor reactant input (108) is in fluid communication with the second reactor heat transfer medium outlet (216) and is configured to introduce at least a portion of said heat transfer medium (210) into the first interior (101) as a first reactor reactant (106) of the first reactor (100).

FIG. 1 describes a two-stage product gas generation system (1001) configured to produce a product gas from a carbonaceous material (102), the system comprising: (a) a first reactor (100) having a first interior (101) and comprising: a first reactor carbonaceous material input (104) to the first interior (101); a first reactor reactant input (108) to the first interior (101), and a first reactor product gas output (124); and (b) a second reactor (200) having a second interior (201) and comprising: a second reactor char input (204) to the second interior (201), said second reactor char input (204) being in fluid communication with the first reactor product gas output (124); a second reactor oxygen-containing gas input (220) to the second interior (201); a second reactor product gas output (224); and a second reactor heat exchanger (HX-B) in thermal contact with the second interior (201); wherein: the second reactor heat exchanger (HX-B) comprises: a second reactor heat transfer medium inlet (212) configured to receive a heat transfer medium (210) at a second reactor inlet temperature (T1); and a second reactor heat transfer medium outlet (216) configured to output the heat transfer medium (210), at a higher, second reactor outlet temperature (T2), and the first reactor reactant input (108) is in fluid communication with the second reactor heat transfer medium outlet (216) and is configured to introduce at least a portion of said heat transfer medium (210) into the first interior (101) as a reactant (106) of the first reactor (100).

FIG. 1 provides a method for producing a first reactor product gas and a second reactor product gas from a carbonaceous material using a first reactor (100) having a first interior (101) and a second reactor (200) having a second interior (201), the method comprising: (a) pyrolyzing carbonaceous material in the presence of heat and the absence of steam to produce a first reactor product gas containing char; (b) separating char from the first reactor product gas; (c) reacting the separated char with an oxygen-containing gas in a second reactor to produce a second reactor product gas; (d) transferring heat from the second reactor through a heat exchanger to a heat transfer medium; and, (e) introducing at least a portion of the heat transfer medium into the first interior of first reactor to supply said heat for pyrolysis.

FIG. 1 further provides a method for producing a first reactor product gas and a second reactor product gas from a carbonaceous material using a first reactor (100) having a first interior (101) and a second reactor (200) having a second interior (201), the method comprising: (a) reacting carbonaceous material with steam in the first reactor to produce a first reactor product gas containing char; (b) separating char from the first reactor product gas; (c) reacting the separated char with an oxygen-containing gas in a second reactor to produce a second reactor product gas; (d) transferring heat from the second reactor through a heat exchanger to a heat transfer medium, the heat transfer medium comprising steam; and, (e) introducing at least a first portion of the steam that has been heated by the second reactor, into the first reactor, to react with the carbonaceous material.

FIG. 2:

FIG. 2 elaborates upon the non-limiting embodiment of FIG. 1, further including the first reactor (100) configured to receive particulate heat transfer material (205) present in the second interior (201) of the second reactor (200). FIG. 2 depicts the system (1001) according to FIG. 1, further comprising: a second reactor solids output (207); and a first reactor solids input (107) in fluid communication with the second reactor solids output (207), wherein: the first reactor solids input (107) is configured to receive, into the first interior (101), second reactor particulate heat transfer material (205) present in the second interior (201).

FIG. 2 also depicts the Second Stage Product Gas Generation Control Volume (CV-3B) having a Second Stage Product Gas Generation System (3B) configured to discharge a solids output (3B-OUT3) for input to the First Stage Product Gas Generation Control Volume (CV-3A) as a solids input (3A-IN6).

FIG. 3:

FIG. 3 elaborates upon the non-limiting embodiment of FIG. 1 further including the second reactor heat exchanger (HX-B) configured to transfer heat from the second reactor (200) to a heat transfer medium (210) for use as a reactant (206) in the second reactor (200).

FIG. 3 depicts the system (1001) according to FIG. 1, further comprising a second reactor reactant input (208) to the second interior (201). In embodiments, the second reactor reactant input (208) is in fluid communication with the second reactor heat transfer medium outlet (216) and is configured to introduce at least a portion of the second reactor heat transfer medium (210) into the second interior (201) as a reactant (206) in the second reactor (200).

FIG. 4:

FIG. 4 elaborates upon the non-limiting embodiment of FIG. 3 further including the first reactor (100) configured to receive particulate heat transfer material (205) present in the second interior (201) of the second reactor (200).

FIG. 4 depicts the system (1001) according to FIG. 3, further comprising: a second reactor solids output (207); and a first reactor solids input (107) in fluid communication with the second reactor solids output (207), wherein: the first reactor solids input (107) is configured to receive, into the first interior (101), second reactor particulate heat transfer material (205) present in the second interior (201).

FIG. 4 also depicts the Second Stage Product Gas Generation Control Volume (CV-3B) having a Second Stage Product Gas Generation System (3B) configured to discharge a solids output (3B-OUT3) for input to the First Stage Product Gas Generation Control Volume (CV-3A) as a solids input (3A-IN6).

FIG. 5:

FIG. 5 elaborates upon the non-limiting embodiment of FIG. 3 further including the first reactor (100) configured to receive an oxygen-containing gas (118).

FIG. 5 depicts the system (1001) according to FIG. 1, further comprising a first reactor oxygen-containing gas input (120) to the first interior (101) configured to receive a first reactor oxygen-containing gas (118). An oxygen-containing gas (118) enters the First Stage Product Gas Generation System (3A) through an oxygen-containing gas input (3A-IN3).

FIG. 6:

FIG. 6 elaborates upon the non-limiting embodiment of FIG. 5 further including the first reactor (100) configured to receive particulate heat transfer material (205) present in the second interior (201) of the second reactor (200).

FIG. 6 depicts the system (1001) according to FIG. 5, further comprising: a second reactor solids output (207); and a first reactor solids input (107) in fluid communication with the second reactor solids output (207), wherein: the first reactor solids input (107) is configured to receive, into the first interior (101), second reactor particulate heat transfer material (205) present in the second interior (201).

FIG. 6 also depicts the Second Stage Product Gas Generation Control Volume (CV-3B) having a Second Stage Product Gas Generation System (3B) configured to discharge a solids output (3B-OUT3) for input to the First Stage Product Gas Generation Control Volume (CV-3A) as a solids input (3A-IN6).

FIG. 7:

FIG. 7 elaborates upon the non-limiting embodiment of FIG. 1 further including a first heat exchanger (HX-A) in thermal contact with the first interior (101) of the first reactor (100).

FIG. 7 depicts the system (1001) according to FIG. 1, further comprising: a first reactor first heat exchanger (HX-A) in thermal contact with the first interior (101), the first reactor first heat exchanger (HX-A) comprising: a first reactor first heat exchanger fuel inlet (112) configured to receive a first reactor first heat exchanger fuel (110) at a first inlet temperature (T3); and a heat exchanger combustion stream outlet (116) configured to output a first reactor first heat exchanger combustion stream (114), at a first outlet temperature (T4).

FIG. 7 also depicts the First Stage Product Gas Generation Control Volume (CV-3A) having a First Stage Product Gas Generation System (3A) configured to accept a fuel input (3A-IN4) as a heat exchanger fuel (110) and configured to discharge a combustion products output (3A-OUT2) as a combustion stream (114).

FIG. 8:

FIG. 8 elaborates upon the non-limiting embodiment of FIG. 7 further including the second reactor heat exchanger (HX-B) configured to transfer heat from the second interior (201) of the second reactor (200) to a heat transfer medium (210) for use as a reactant (206) in the second reactor (200).

In embodiments, the second reactor reactant input (208) is in fluid communication with the second reactor heat transfer medium outlet (216) and is configured to introduce at least a portion of the second reactor heat transfer medium (210) into the second interior (201) as a reactant (206) in the second reactor (200).

FIG. 9:

FIG. 9 elaborates upon the non-limiting embodiment of FIG. 8 further including the first reactor (100) configured to receive an oxygen-containing gas (118).

The first reactor oxygen-containing gas (118) enters the First Stage Product Gas Generation System (3A) through an oxygen-containing gas input (3A-IN3).

FIG. 10:

FIG. 10 elaborates upon the non-limiting embodiment of FIG. 9 further including a second heat exchanger (HX-A2) in thermal contact with the first interior (101) of the first reactor (100).

FIG. 10 depicts the system (1001) according to FIG. 9, further comprising: first reactor first heat exchanger (HX-A1) and a first reactor second heat exchanger (HX-A2) in thermal contact with the first interior (101) of the first reactor (100).

The first reactor first heat exchanger (HX-A1) is comprised of: a first reactor first heat exchanger fuel inlet (112A) configured to receive a first reactor first heat exchanger fuel (110A) at a first inlet temperature (T3A); a first reactor first heat exchanger combustion stream outlet (116A) configured to output a first reactor first heat exchanger combustion stream (114A) at a first outlet temperature (T4A).

The first reactor second heat exchanger (HX-A2) is comprised of: a first reactor second heat exchanger fuel inlet (112B) configured to receive a first reactor second heat exchanger fuel (110B) at a first inlet temperature (T3B); a first reactor second heat exchanger combustion stream outlet (116B) a configured to output a first reactor second heat exchanger combustion stream (114B) at a first outlet temperature (T4B).

The first reactor first heat exchanger combustion stream (114A) may be combined with the first reactor second heat exchanger combustion stream (114B) to form a combined combustion stream (114) as a combustion products output (3A-OUT2). FIG. 10 also depicts the First Stage Product Gas Generation Control Volume (CV-3A) having a First Stage Product Gas Generation System (3A) configured to accept a fuel input (3A-IN4) as a heat exchanger fuel (110) and configured to discharge a combustion products output (3A-OUT2) as a combustion stream (114).

The fuel input (3A-IN4) to the First Stage Product Gas Generation Control Volume (CV-3A) may be comprised of a mixture of a hydrocarbon input (3A-IN4A) and an oxygen-containing gas input (3A-IN4B). In embodiments, the hydrocarbon input (3A-IN4A) used in the first reactor heat exchanger fuel (110) may be provided by way of a first synthesis hydrocarbon output (7-OUT2) from a downstream Synthesis System (7000) such as tail gas from a Fischer-Tropsch synthesis system, or from a methanol synthesis system, or the like, as seen in FIG. 29. In embodiments, the hydrocarbon input (3A-IN4A) used in the first reactor heat exchanger fuel (110) may be provided by way of a first hydrocarbon output (8-OUT2) from a downstream Upgrading System (8000) such as naphtha, off-gas, or the like, as seen in FIG. 29. In embodiments, the hydrocarbon input (3A-IN4A) used in the first reactor heat exchanger fuel (110) may be a methane containing gas such as natural gas.

FIG. 11:

FIG. 11 elaborates upon the non-limiting embodiment of FIG. 10 further including an auxiliary heat exchanger (HX-2) configured to transfer heat from a combustion stream (114) to an auxiliary heat exchanger heat transfer medium (164) for use as a reactant (106) to the first reactor (100).

FIG. 11 depicts the system (1001) according to FIG. 10, further comprising: an auxiliary heat exchanger (HX-2) external to the first reactor (100) and in thermal contact with at least the first reactor first heat exchanger combustion stream (114A) exiting the first reactor first heat exchanger combustion stream outlet (116A); wherein the auxiliary heat exchanger (HX-2) is configured to transfer heat from the combustion stream (114 and/or 114A and/or 114B) to an auxiliary heat exchanger heat transfer medium (164) which exits the auxiliary heat exchanger (HX-2) via auxiliary heat exchanger heat transfer medium outlet conduit (170).

In embodiments, the auxiliary heat exchanger heat transfer medium outlet (168) is in fluid communication with the first reactor reactant input (108) of the first reactor (100) via an auxiliary heat exchanger heat transfer medium outlet conduit (170), to thereby supply the auxiliary heat exchanger heat transfer medium (164) as a reactant (106) to the first reactor (100).

The auxiliary heat exchanger heat transfer medium outlet conduit (170) routes the heat transfer medium (164) at the second outlet temperature (T7) to a first reactor combined reactant conduit (172) to be used as the reactant (106) in the first reactor (100).

An auxiliary heat exchanger (HX-2) has an auxiliary heat exchanger heat transfer medium (164) in thermal contact with the combustion stream (114) exiting the first reactor first heat exchanger (HX-A). The auxiliary heat exchanger (HX-2) is comprised of: an auxiliary heat exchanger heat transfer medium inlet (166) configured to receive an auxiliary heat exchanger heat transfer medium (164) at a first inlet temperature (T6); and an auxiliary heat exchanger heat transfer medium outlet (168) configured to output an auxiliary heat exchanger heat transfer medium (164), at a higher, second outlet temperature (T7). The auxiliary heat exchanger (HX-2) is also comprised of: a combustion stream inlet (160) configured to receive a combustion stream (114) at a third inlet temperature (T4); and a combustion stream outlet (167) configured to output a combustion stream (114), at a lower, fourth outlet temperature (T5).

FIG. 12:

FIG. 12 elaborates upon the non-limiting embodiment of FIG. 11 further including an auxiliary heat exchanger heat transfer medium outlet conduit (170) in fluid communication with the second reactor heat transfer medium inlet (212), to thereby supply the auxiliary heat exchanger heat transfer medium (164) to the second reactor heat exchanger (HX-B).

FIG. 12 depicts the first reactor auxiliary heat exchanger heat transfer medium outlet (168) in fluid communication with the second reactor heat transfer medium inlet (212) of the second reactor heat exchanger (HX-B) via an auxiliary heat exchanger heat transfer medium outlet conduit (170), to thereby supply the auxiliary heat exchanger heat transfer medium (164) as a heat transfer medium (210) for the second reactor heat exchanger (HX-B), and ultimately as the reactant (106) in the first reactor (100) and also as a reactant (206) in the second reactor (200).

FIG. 12 shows a combined combustion stream (114) exiting the First Stage Product Gas Generation System (3A) through a combustion products output (3A-OUT2) and entering the Second Stage Product Gas Generation System (3B) through a combustion products input (3B-IN6).

Connection X1 indicates the combined combustion stream (114) entering the auxiliary heat exchanger (HX-2) en route to the second reactor heat exchanger (HX-B). In embodiments, the auxiliary heat exchanger heat transfer medium outlet conduit (170) routes the heat transfer medium (164) at the second outlet temperature (T7) to a second reactor combined heat transfer medium conduit (174) to be used as the heat transfer medium (210) for the second reactor heat exchanger (HX-B).

FIG. 13:

FIG. 13 elaborates upon the non-limiting embodiments of FIG. 10 further including utilizing at least a portion of the heat transfer medium (210) of the second reactor heat exchanger (HX-B) into any combination of the first reactor (100) dense bed zone (AZ-A), feed zone (AZ-B), or splash zone (AZ-C) or the second reactor (200) dense bed zone (BZ-A), feed zone (BZ-B), or splash zone (BZ-C).

FIG. 13 illustrates two-stage energy integrated product gas generation system (1001) configured to produce a product gas from a carbonaceous material (102), the system comprising: a first reactor (100) having a first interior (101) provided with a first dense bed zone (AZ-A), a first feed zone (AZ-B) above the first dense bed zone (AZ-A), and a first splash zone (AZ-C) above the first feed zone (AZ-B).

The first reactor (100) further comprises: a first reactor dense bed zone reactant input (108A) configured to introduce a first reactor dense bed zone reactant (106A) to the first dense bed zone (AZ-A); a first reactor feed zone reactant input (108B) configured to introduce a first reactor feed zone reactant (106B) to the first feed zone (AZ-B); a first reactor splash zone reactant input (108C) configured to introduce a first reactor splash zone reactant (106C) to the first splash zone (AZ-C); and, a first reactor carbonaceous material input (104) to the first feed zone (AZ-B); a first reactor product gas output (124).

The first reactor (100) further comprises: a first reactor dense bed zone oxygen-containing gas input (120A) configured to introduce a first reactor dense bed zone oxygen-containing gas (118A) to the first dense bed zone (AZ-A); a first reactor feed zone oxygen-containing gas input (120B) configured to introduce a first reactor feed zone oxygen-containing gas (118B) to the first feed zone (AZ-B); and, a first reactor splash zone oxygen-containing gas input (120C) configured to introduce a first reactor splash zone oxygen-containing gas (118C) to the first splash zone (AZ-C).

FIG. 13 further illustrates a two-stage energy integrated product gas generation system (1001) including: a second reactor (200) having a second interior (201) provided with a second dense bed zone (BZ-A), second feed zone (BZ-B) above the second dense bed zone (BZ-A), and a second splash zone (BZ-C) above the second feed zone (BZ-B).

In the embodiment of FIG. 13, at least a portion of the heat transfer medium of the second reactor heat exchanger may be introduced into any combination of bed material zones found in either the first reactor or in the second rector. In this regard, the first and second reactors can each be considered to have a dense bend zone formed in the lower portion of the bed region, a feed zone formed in a middle portion of the bed region, and a splash zone formed in the upper portion of the bed region, immediately below the freeboard region of the reactor. It is understood that within the bed material, the dense bed zone is located below both the feed and splash zones, the splash zone is located above both the dense bed zone and the feed zone, and the feed zone is located between the dense bed zone and the splash zone. It is further understood that for present purposes, the boundary between the dense bed zone and the feed zone is the lowest point at which carbonaceous material such as MSW, char, or any other feedstock is introduced into a reactor.

The second reactor (200) further comprises: a second reactor char input (204) to the second feed zone (BZ-B), said second reactor char input (204) being in fluid communication with the first reactor product gas output (124); a second reactor dense bed zone reactant input (208A) configured to introduce a second reactor dense bed zone reactant (206A) to the second dense bed zone (BZ-A); a second reactor feed zone reactant input (208B) configured to introduce a second reactor feed zone reactant (206B) to the second feed zone (BZ-B); a second reactor splash zone reactant input (208C) configured to introduce a second reactor splash zone reactant (206C) to the second splash zone (BZ-C); a second reactor dense bed zone oxygen-containing gas input (220A) configured to introduce a second reactor dense bed zone oxygen-containing gas (218A) to the second dense bed zone (BZ-A); a second reactor feed zone oxygen-containing gas input (220B) configured to introduce a second reactor feed zone oxygen-containing gas (218B) to the second feed zone (BZ-B); a second reactor splash zone oxygen-containing gas input (220C) configured to introduce a second reactor splash zone oxygen-containing gas (218C) to the second splash zone (BZ-C); a second reactor product gas output (224); and, a second reactor heat exchanger (HX-B) in thermal contact with the second interior (201); wherein:

the second reactor heat exchanger (HX-B) is configured to receive a heat transfer medium (210) at a second reactor inlet temperature (T1) and output the heat transfer medium (210), at a higher, second reactor outlet temperature (T2), via a second reactor heat transfer medium outlet (216);

the second reactor heat transfer medium outlet (216) is configured to be selectively in fluid communication with any combination of the first reactor dense bed zone reactant input (108A), the first reactor feed zone reactant input (108B) and the first reactor splash zone reactant input (108C); and, the second reactor heat transfer medium outlet (216) is configured to be selectively in fluid communication with any combination of the second reactor dense bed zone reactant input (208A), second reactor feed zone reactant input (208B) and the second reactor splash zone reactant input (208C); whereby:

at least a portion of the heat transfer medium (210) is capable of being introduced into any combination of: (i) the corresponding first reactor dense bed zone (AZ-A), (ii) the first reactor feed zone (AZ-B), (iii) the first reactor splash zone (AZ-C), (iv) the corresponding second reactor dense bed zone (BZ-A), (v) the second reactor feed zone (BZ-B), and, (vi) the second reactor splash zone (BZ-C).

FIG. 14:

FIG. 14 shows a detailed view of one non-limiting embodiment of a First Stage Product Gas Generation Control Volume (CV-3A) and First Stage Product Gas Generation System (3A) showing a first reactor (100) equipped with a dense bed zone (AZ-A), feed zone (AZ-B), and splash zone (AZ-C), along with the first reactor carbonaceous material input (104), valves, sensors, and controllers.

FIG. 14 shows a first reactor (100) having a first interior (101) provided with a first dense bed zone (AZ-A), a first feed zone (AZ-B) above the first dense bed zone (AZ-A), and a first splash zone (AZ-C) above the first feed zone (AZ-B). The first splash zone (AZ-C) is proximate to the first fluid bed level (L-A) and below the first freeboard zone (FB-A).

In embodiments, the dense bed zone (AZ-A) corresponds to the lower portion of the dense bed within the first interior (101). In embodiments, the feed zone (AZ-B) is located above the dense bed zone (AZ-A). In embodiments, the splash zone (AZ-C) may be located above the feed zone (AZ-B) and below the first fluid bed level (L-A).

The system (1001) according to FIG. 14, comprises four first reactor exchangers (HX-A1,HX-A2,HX-A3,HX-A4) in thermal contact with the first interior (101) of the first reactor (100). The four first reactor heat exchangers (HX-A1, HX-A2, HX-A3, HX-A4) are positioned in the first interior (101) and vertically spaced apart from one another along the height dimension of the first interior (101).

The first reactor first heat exchanger (HX-A1) is comprised of: a first reactor first heat exchanger fuel inlet (112A) configured to introduce a first reactor first heat exchanger fuel (110A) at a first inlet temperature (T-3A); and a first reactor first heat exchanger combustion stream outlet (116A) configured to discharge a first reactor first heat exchanger combustion stream (114A) at a higher, second outlet temperature (T-4A).

The first reactor third heat exchanger (HX-A3) is comprised of: a first reactor third heat exchanger fuel inlet (112C) configured to introduce a first reactor third heat exchanger fuel (110C) at a first inlet temperature (T-3C); and a first reactor third heat exchanger combustion stream outlet (116C) configured to discharge a first reactor third heat exchanger combustion stream (114C) at a higher, second outlet temperature (T-4C).

Connection X2 shows the first reactor first heat exchanger combustion stream (114A) being routed to be combined with the discharge of the first reactor third heat exchanger combustion stream (114C) from the first reactor third heat exchanger combustion stream outlet (116C) of the first reactor first heat exchanger (HX-A1) to form a combined combustion stream (114).

FIG. 14 further depicts the First Stage Product Gas Generation Control Volume (CV-3A) having a First Stage Product Gas Generation System (3A) configured to accept a fuel input (3A-IN4) as a heat exchanger fuel (110,110A, 110B,110C,110D) for the four first reactor exchangers (HX-A1,HX-A2,HX-A3,HX-A4) in thermal contact with the first reactor particulate heat transfer material (105) contained within the first interior (101) of the first reactor (100) and configured to discharge a combustion products output (3A-OUT2) as a combustion stream (114).

In embodiments, the first reactor particulate heat transfer material (105) is comprised of Geldart Group A or Group B solids in the form of inert material or catalyst or sorbent or engineered particles. The engineered particles may be made of alumina, zirconia, sand, olivine sand, limestone, dolomite, or catalytic materials, any of which may be hollow in form, such as microballoons or microspheres. The preferred first reactor particulate heat transfer material (105) is Geldart Group B alumina microspheres. The first reactor particulate heat transfer material (105) enhances mixing, heat and mass transfer, and reaction between the carbonaceous material (102) and the reactant or oxygen-containing gas introduced to the first reactor (100).

A carbonaceous material input (3A-IN1) is introduced to the First Stage Product Gas Generation Control Volume (CV-3A) as a first reactor carbonaceous material input (104) and is configured to provide a carbonaceous material (102) to the feed zone (AZ-B) of the first reactor (100).

A carbonaceous material (102) is introduced to the interior (101) of the first reactor (100) for intimate contact with the heated particulate heat transfer material (105) and reactants and oxygen-containing gas contained within the interior (101) to produce a first reactor product gas (122) that is discharged from the interior (101) of the first reactor (100) via a first reactor product gas output (124).

The first reactor product gas output (124) exits the First Stage Product Gas Generation Control Volume (CV-3A) through a first reactor product gas output (3A-OUT1) and enters the Second Stage Product Gas Generation Control Volume (CV-3B) shown in FIG. 19 as a first reactor product gas input (3B-IN1).

FIG. 14 depicts steam being introduced to the First Stage Product Gas Generation Control Volume (CV-3A) as a reactant (106) via a first reactor reactant input (3A-IN2) or a second reactor heat transfer medium output (3B-OUT2) to be made available to any combination of: (i) the corresponding first reactor dense bed zone (AZ-A), (ii) the first reactor feed zone (AZ-B), and (iii) the first reactor splash zone (AZ-C).

Further, FIG. 14 depicts an oxygen-containing gas (118) being introduced to the First Stage Product Gas Generation Control Volume (CV-3A) through an oxygen-containing gas input (3A-IN3) to be made available to any combination of: (i) the corresponding first reactor dense bed zone (AZ-A), (ii) the first reactor feed zone (AZ-B), and (iii) the first reactor splash zone (AZ-C).

FIG. 14 depicts the system (1001) further including: a first reactor dense bed zone reactant input (108A) and first reactor dense bed zone oxygen-containing gas input (120A) in fluid communication with a dense bed zone steam/oxygen connection (AZA0). The dense bed zone steam/oxygen connection (AZA0) is in fluid communication with the dense bed zone steam/oxygen input (AZA2) and is configured to transport the dense bed zone steam/oxygen (AZA1) to the first reactor (100) dense bed zone (AZ-B). The first reactor (100) dense bed zone steam/oxygen (AZA1) is a mixture of the first reactor dense bed zone reactant (106A) and first reactor dense bed zone oxygen-containing gas (118A).

A first reactor dense bed zone reactant valve (VA1), configured to accept a signal (XA1) from a controller (CA1) is installed upstream of the input (108A) to control the amount of reactant (106A) supplied to the first reactor (100) dense bed zone (AZ-A). A first reactor dense bed zone oxygen-containing gas valve (VA2), configured to accept a signal (XA2) from a controller (CA2) is installed upstream of the input (120A) to control the amount of oxygen-containing gas (118A) supplied to the first reactor (100) dense bed zone (AZ-A).

FIG. 14 depicts the system (1001) further including: a first reactor feed zone reactant input (108B) and first reactor feed zone oxygen-containing gas input (120B) in fluid communication with a feed zone steam/oxygen connection (AZB0). The feed zone steam/oxygen connection (AZB0) is in fluid communication with the feed zone steam/oxygen input (AZB2) and configured to transport the feed zone steam/oxygen (AZB1) to the first reactor (100) feed zone (AZ-B). The first reactor (100) feed zone steam/oxygen (AZB1) is a mixture of the first reactor feed zone reactant (106B) and first reactor feed zone oxygen-containing gas (118B).

A first reactor feed zone reactant valve (VA3), configured to accept a signal (XA3) from a controller (CA3) is installed upstream of the input (108B) to control the amount of reactant (106B) supplied to the first reactor (100) feed zone (AZ-B). A first reactor feed zone oxygen-containing gas valve (VA4), configured to accept a signal (XA4) from a controller (CA4) is installed upstream of the input (120B) to control the amount of oxygen-containing gas (118B) supplied to the first reactor (100) feed zone (AZ-B).

FIG. 14 depicts the system (1001) further including: a first reactor splash zone reactant input (108C) and first reactor splash zone oxygen-containing gas input (120C) in fluid communication with a splash zone steam/oxygen connection (AZC0).

The splash zone steam/oxygen connection (AZC0) is in fluid communication with the splash zone steam/oxygen input (AZC2) and configured to transport the splash zone steam/oxygen (AZC1) to the first reactor (100) splash zone (AZ-C). The first reactor (100) splash zone steam/oxygen (AZC1) is a mixture of the first reactor splash zone reactant (106C) and first reactor splash zone oxygen-containing gas (118C).

A first reactor splash zone reactant valve (VA5), configured to accept a signal (XA5) from a controller (CA5) is installed upstream of the input (108C) to control the amount of reactant (106C) supplied to the first reactor (100) splash zone (AZ-C). A first reactor splash zone oxygen-containing gas valve (VA6), configured to accept a signal (XA6) from a controller (CA6) is installed upstream of the input (120C) to control the amount of oxygen-containing gas (118C) supplied to the first reactor (100) splash zone (AZ-C). An internal cyclone (125) is shown in the freeboard zone (FB-A) of the first reactor (100).

FIG. 15:

FIG. 15 elaborates upon the non-limiting embodiment of FIG. 14 further including multiple carbonaceous material inputs (104A,104B,104C,104D) and multiple feed zone steam/oxygen inputs (AZB2,AZB3,AZB4,AZB5) positioned in the feed zone (AZ-B) along with multiple splash zone steam/oxygen inputs (AZC2,AZC3,AZC4,AZC5) positioned in the splash zone (AZ-C).

FIG. 15 depicts four carbonaceous material inputs (104A, 104B,104C,104D) to the feed zone (AZ-B) of the first interior (101) of the first reactor (100). Each carbonaceous material input (104A,104B,104C,104D) has a corresponding steam/oxygen input (AZB2,AZB3,AZB4,AZB5).

Specifically, the first reactor first carbonaceous material input (104A) has its own source of feed zone steam/oxygen (AZB1) introduced from the first feed zone steam/oxygen input (AZB2). The second carbonaceous material input (104B) has its own source of feed zone steam/oxygen (AZB1) introduced from the second feed zone steam/oxygen input (AZB3). The third carbonaceous material input (104C) has its own source of feed zone steam/oxygen (AZB1) introduced from the third feed zone steam/oxygen input (AZB4). The fourth carbonaceous material input (104D) has its own source of feed zone steam/oxygen (AZB1) introduced from the fourth feed zone steam/oxygen input (AZB5). Connection X3 indicates the feed zone steam/oxygen (AZB1) being introduced to the third feed zone steam/oxygen input (AZB4) and the fourth feed zone steam/oxygen input (AZB5). Connection X4 indicates carbonaceous material (102C and 102D) being introduced to a third carbonaceous material input (104C) and a fourth carbonaceous material input (104D), respectively.

FIG. 15 depicts four splash zone steam/oxygen inputs (AZC2,AZC3,AZC4,AZC5) to the splash zone (AZ-C) of the first interior (101) of the first reactor (100). Each of the four splash zone steam/oxygen inputs (AZC2,AZC3,AZC4, AZC5) is fed from a common source of splash zone steam/oxygen (AZC1) for delivery to the splash zone (AZ-C) of the first interior (101) of the first reactor (100). Connection X5 indicates the splash zone steam/oxygen (AZC1) being introduced to the second splash zone steam/oxygen input (AZC3), third splash zone steam/oxygen input (AZC4), and the fourth splash zone steam/oxygen input (AZC5). Connection X6 indicates the splash zone steam/oxygen (AZC1) being introduced to the second splash zone steam/oxygen input (AZC3) and the third splash zone steam/oxygen input (AZC4). Note that although only four carbonaceous material inputs (104A,104B,104C,104D) it is preferred to have six inputs as later indicated in FIG. 16A and FIG. 16B.

FIG. 15 also shows the perspective of a first reactor feed zone cross-sectional view (XAZ-B) that will be elaborated upon in FIG. 16 and FIG. 17. FIG. 15 also shows the perspective of a first reactor splash zone cross-sectional view (XAZ-C) that will be elaborated upon in FIG. 18.

FIG. 15 also shows the first reactor first carbonaceous material input (104A) and the first reactor second carbonaceous material input (104B) introduced to the interior (101) of the first reactor at different planes at different vertical heights about the first reactor (100).

FIG. 15 also shows the first reactor third carbonaceous material input (104C) and the first reactor fourth carbonaceous material input (104D) introduced to the interior (101) of the first reactor at different planes at different vertical heights about the first reactor (100).

FIG. 16A:

FIG. 16 shows a non-limiting embodiment of a first reactor feed zone cross-sectional view (XAZ-B) from the embodiment of FIG. 15. In embodiments, six carbonaceous material inputs (104A,104B,104C,104D,104E,104F) are positioned about the circumference of the first reactor (100). Four of the six carbonaceous material inputs (104A,104C, 104D,104F) are positioned 90 degrees from one another. Two of the six carbonaceous material inputs (104B,104E) are positioned 180 degrees from one another at angles of 45 degrees and 225 degrees leaving the angled positions of 135 and 315 vacant where the angle 0 and 360 are at the twelve-o-clock position on the circular diagram depicting the first reactor (100).

FIG. 16B:

FIG. 16 shows a non-limiting embodiment of a first reactor feed zone cross-sectional view (XAZ-B) from the embodiment of FIG. 16A, however, FIG. 16B shows a rectangular first reactor (100) cross-sectional view. In embodiments, six carbonaceous material inputs (104A, 104B,104C,104D,104E,104F) are positioned about the perimeter of the first reactor (100).

FIG. 17:

FIG. 17 elaborates upon this preference to have only two of the six first reactor carbonaceous material inputs (104B, 104E) configured to inject carbonaceous material into the vertically extending quadrants (Q1, Q3). Further, each of the six carbonaceous material inputs (104A,104B,104C,104D, 104E,104F) has its own dedicated steam/oxygen input (AZB2,AZB3,AZB4,AZB5,AZB6,AZB7), respectfully. Further, FIG. 17 depicts four first reactor heat exchangers (HX-A1, HX-A2, HX-A3, HX-A4) positioned in the first interior (101) and vertically spaced apart from one another along the height dimension of the first interior; wherein: alternate first reactor heat exchangers along said first height dimension are arranged orthogonal to one another such that, in a top view of the first interior, the four first reactor heat exchangers define four open vertically extending quadrants (Q1, Q2,Q3, Q4).

FIG. 18:

FIG. 18 shows a non-limiting embodiment of a first reactor splash zone cross-sectional view (XAZ-C) from the embodiment of FIG. 15. In embodiments, eight separate splash zone steam/oxygen inputs (AZC2,AZC3,AZC4, AZC5,AZC6,AZC7,AZC8,AZC9) are shown equidistantly spaced apart at 45 degree angles to one another about the circumference of the first reactor (100). Each of the eight separate splash zone steam/oxygen inputs (AZC2,AZC3, AZC4,AZC5,AZC6,AZC7,AZC8,AZC9) accepts a source of splash zone steam/oxygen (AZC1).

FIG. 19:

FIG. 19 shows a detailed view of one non-limiting embodiment of a Second Stage Product Gas Generation Control Volume (CV-3B) and Second Stage Product Gas Generation System (3B) showing a second reactor (200) equipped with a dense bed zone (BZ-A), feed zone (BZ-B), and splash zone (BZ-C), along with a first solids separation device (150), second solids separation device (250), solids flow regulator (245), riser (236), dipleg (244), and valves, sensors, and controllers.

FIG. 19 shows a second reactor (200) having a second interior (201) provided with a second dense bed zone (BZ-A), a second feed zone (BZ-B) above the second dense bed zone (BZ-A), and a second splash zone (BZ-C) above the second feed zone (BZ-B). The second splash zone (BZ-C) is proximate to the second fluid bed level (L-B) and below the second freeboard zone (FB-B).

In embodiments, the dense bed zone (BZ-A) corresponds to the lower portion of the dense bed within the second interior (201). In embodiments, the feed zone (BZ-B) is located above the dense bed zone (BZ-A). In embodiments, the splash zone (BZ-C) may be located above the feed zone (BZ-B) and below the second fluid bed level (L-B).

The embodiment shown in FIG. 1 depicts the second reactor heat exchanger (HX-B) immersed below the fluid bed level (L-B) of the second reactor (200).

The second reactor heat exchanger (HX-B) comprises: a second reactor heat transfer medium inlet (212) configured to receive a heat transfer medium (210) at a second reactor inlet temperature (T1); and a second reactor heat transfer medium outlet (216) configured to output the heat transfer medium (210), at a higher, second reactor outlet temperature (T2).

A second reactor heat transfer medium supply valve (VB0), configured to accept a signal (XB0) from a controller (CB0) is installed upstream of the second reactor heat transfer medium inlet (212) to control the amount of heat transfer medium (210) supplied to the second reactor heat exchanger (HX-B). The heat transfer medium (210) is supplied via the second reactor heat transfer medium input (3B-IN2).

The upstream first reactor (100) is in fluid communication with the second reactor heat transfer medium outlet (216) of the second reactor heat exchanger (HX-B) and is configured to introduce at least a portion of said heat transfer medium (210) into the first reactor (100) (not shown) via a first reactor reactant input (3A-IN2) or a second reactor heat transfer medium output (3B-OUT2).

FIG. 19 further illustrates a Second Stage Product Gas Generation Control Volume (CV-3B) and Second Stage Product Gas Generation System (3B) showing a first reactor product gas input (3B-IN1) entering as a first solids separation device (150) as a first reactor product gas output (3A-OUT1).

The first solids separation device (150) is comprised of: a first separation input (152) in fluid communication with the first reactor product gas output (124) (shown on FIG. 14); a first separation char output (154) in fluid communication with the second reactor char input (204); and a first separation gas output (156). The second reactor (200) is configured to accept a char (202) through a second reactor char input (204) routed to the second interior (201) via a dipleg (244).

A riser (236) connects the interior (201) of the second reactor (200) with the terminal portion (242) of the conduit that connects the first reactor product gas output (124) (shown on FIG. 14) with the first separation input (152). The riser (236) is configured to transport particulate heat transfer material (205) from the interior (201) of the second reactor (200) to the first separation input (152).

In embodiments, the second reactor particulate heat transfer material (205) is comprised of Geldart Group A or Group B solids in the form of inert material or catalyst or sorbent or engineered particles. The engineered particles may be made of alumina, zirconia, sand, olivine sand, limestone, dolomite, or catalytic materials, any of which may be hollow in form, such as microballoons or microspheres. The preferred second reactor particulate heat transfer material (205) is Geldart Group B alumina microspheres. The second reactor particulate heat transfer material (205) enhances mixing, heat and mass transfer, and reaction between the char (202) and the reactant or oxygen-containing gas introduced to the second reactor (200).

A riser conveying fluid (240) is preferably introduced to the riser (236) to assist in uniform flow of particulate heat transfer material (205) from the interior (201) of the second reactor (200) to the first separation input (152).

Connection X7 in FIG. 19 shows a gas input (3B-IN4) being used as the riser conveying fluid (240) originating from a downstream Secondary Gas Clean-Up System (6000) as a carbon dioxide output (6-OUT2) also as depicted in FIG. 32.

A solids flow regulator (245) is interposed in between the first separation char output (154) and the second reactor char input (204) and configured as a sealing apparatus to prevent backflow of particulate heat transfer material (205) from the interior (201) of the second reactor (200).

The solids flow regulator (245) is comprised of: a solids flow regulator solids input (246) configured to receive char (202) and solids (205) separated from the first separation char output (154) of the first solids separation device (150); a solids flow regulator solids output (247) configured to output char (202) and solids (205) to the second reactor char input (204) via a dipleg (244); a solids flow regulator gas input (248) to accept a solids flow regulator gas (249).

In embodiments, the solids flow regulator gas (249) originates from a downstream Secondary Gas Clean-Up System (6000) as a carbon dioxide output (6-OUT2).

The first separation char output (154) of the first solids separation device (150) is configured to output char (202) and is in fluid communication with the second reactor (200) via a second reactor char input (204).

The first separation gas output (156) of the first solids separation device (150) is configured to output a char depleted first reactor product gas (126) via a char depleted first reactor product gas conduit (128).

The second reactor (200) comprises: a second reactor char input (204) to the second feed zone (BZ-B), said second reactor char input (204) being in fluid communication with the first reactor product gas output (124) (not shown); a second reactor dense bed zone reactant input (208A) configured to introduce a second reactor dense bed zone reactant (206A) to the second dense bed zone (BZ-A); a second reactor feed zone reactant input (208B) configured to introduce a second reactor feed zone reactant (206B) to the second feed zone (BZ-B); a second reactor splash zone reactant input (208C) configured to introduce a second reactor splash zone reactant (206C) to the second splash zone (BZ-C); a second reactor dense bed zone oxygen-containing gas input (220A) configured to introduce a second reactor dense bed zone oxygen-containing gas (218A) to the second dense bed zone (BZ-A); a second reactor feed zone oxygen-containing gas input (220B) configured to introduce a second reactor feed zone oxygen-containing gas (218B) to the second feed zone (BZ-B); a second reactor splash zone oxygen-containing gas input (220C) configured to introduce a second reactor splash zone oxygen-containing gas (218C) to the second splash zone (BZ-C); a second reactor product gas output (224); and, a second reactor heat exchanger (HX-B) in thermal contact with the second interior (201); wherein:

the second reactor heat exchanger (HX-B) is configured to receive a heat transfer medium (210) at a second reactor inlet temperature (T1) and output the heat transfer medium (210), at a higher, second reactor outlet temperature (T2), via a second reactor heat transfer medium outlet (216); and, the second reactor heat transfer medium outlet (216) is configured to be selectively in fluid communication with any combination of the first reactor dense bed zone reactant input (108A), the first reactor feed zone reactant input (108B) and the first reactor splash zone reactant input (108C); and, the second reactor heat transfer medium outlet (216) is configured to be selectively in fluid communication with any combination of the second reactor dense bed zone reactant input (208A), second reactor feed zone reactant input (208B) and the second reactor splash zone reactant input (208C); whereby: at least a portion of the heat transfer medium (210) is capable of being introduced into any combination of: (i) the corresponding second reactor (200) dense bed zone (BZ-A), (ii) the second reactor (200) feed zone (BZ-B), and (iii) the second reactor (200) splash zone (BZ-C).

Further, FIG. 19 depicts an oxygen-containing gas being introduced to the Second Stage Product Gas Generation Control Volume (CV-3B) as an oxygen-containing gas input (3B-IN3) to be made available to any combination of: (i) the corresponding second reactor (200) dense bed zone (BZ-A), (ii) the second reactor (200) feed zone (BZ-B), (iii) the second reactor (200) splash zone (BZ-C).

FIG. 19 depicts the system (1001) further including: a second reactor dense bed zone reactant input (208A) and second reactor dense bed zone oxygen-containing gas input (220A) in fluid communication with a dense bed zone steam/oxygen connection (BZA0).

The dense bed zone steam/oxygen connection (BZA0) is in fluid communication with the dense bed zone steam/oxygen (BZA2) and configured to transport the dense bed zone steam/oxygen (BZA1) to the second reactor (200) dense bed zone (BZ-B). The second reactor (200) dense bed zone steam/oxygen (BZA1) is a mixture of the second reactor dense bed zone reactant (206A) and second reactor dense bed zone oxygen-containing gas (218A).

A second reactor dense bed zone reactant valve (VB1), configured to accept a signal (XB1) from a controller (CB1) is installed upstream of the input (208A) to control the amount of reactant (206A) supplied to the second reactor (200) dense bed zone (BZ-B). A second reactor dense bed zone oxygen-containing gas valve (VB2), configured to accept a signal (XB2) from a controller (CB2) is installed upstream of the input (220A) to control the amount of oxygen-containing gas (218A) supplied to the second reactor (200) dense bed zone (BZ-B).

FIG. 19 depicts the system (1001) further including: a second reactor feed zone reactant input (208B) and second reactor feed zone oxygen-containing gas input (220B) in fluid communication with a feed zone steam/oxygen connection (BZB0). The feed zone steam/oxygen connection (BZB0) is in fluid communication with the feed zone steam/oxygen input (BZB2) and configured to transport the feed zone steam/oxygen (BZB1) to the second reactor (200) feed zone (BZ-B). The second reactor (200) feed zone steam/oxygen (BZB1) is a mixture of the second reactor feed zone reactant (206B) and second reactor feed zone oxygen-containing gas (218B).

A second reactor feed zone reactant valve (VB3), configured to accept a signal (XB3) from a controller (CB3) is installed upstream of the input (208B) to control the amount of reactant (206B) supplied to the second reactor (200) feed zone (BZ-B). A second reactor feed zone oxygen-containing gas valve (VB4), configured to accept a signal (XB4) from a controller (CB4) is installed upstream of the input (220B) to control the amount of oxygen-containing gas (218B) supplied to the second reactor (200) feed zone (BZ-B).

FIG. 19 depicts the system (1001) further including: a second reactor splash zone reactant input (208C) and second reactor splash zone oxygen-containing gas input (220C) in fluid communication with a splash zone steam/oxygen connection (BZC0).

The splash zone steam/oxygen connection (BZC0) is in fluid communication with the splash zone steam/oxygen input (BZC2) and configured to transport the splash zone steam/oxygen (BZC1) to the second reactor (200) splash zone (BZ-C). The second reactor (200) splash zone steam/oxygen (BZC1) is a mixture of the second reactor splash zone reactant (206C) and second reactor splash zone oxygen-containing gas (218C).

A second reactor splash zone reactant valve (VB5), configured to accept a signal (XB5) from a controller (CB5) is installed upstream of the input (208C) to control the amount of reactant (206C) supplied to the second reactor (200) splash zone (BZ-C).

A second reactor splash zone oxygen-containing gas valve (VB6), configured to accept a signal (XB6) from a controller (CB6) is installed upstream of the input (220C) to control the amount of oxygen-containing gas (218C) supplied to the second reactor (100) splash zone (BZ-C).

An internal cyclone (225) is shown in the freeboard zone (FB-B) of the second reactor (200). A restriction orifice differential pressure (DP-AB) is shown to measure the pressure drop across the restriction orifice (RO-B). A fuel input (264) is shown on the second reactor (200) and is configured to introduce a source of fuel (262) to the interior (201) of the second reactor (200).

In embodiments, the fuel (262) may be fuel (4-OUT2), also as depicted in FIG. 32, including: (VOC) or aromatics including benzene, toluene, phenol, styrene, xylene, or cresol; or, or, (SVOC) or polyaromatics, such as indene, indan, naphthalene, methylnaphthalene, acenaphthylene, acenaphthalene, anthracene, phenanthrene, (methyl-)anthracenes/phenanthrenes, pyrene/fluoranthene, methylpyrenes/benzofluorenes, chrysene, benz[a]anthracene, methylchrysenes, methylbenz[a]anthracenes, perylene, benzo[a]pyrene, dibenz[a,kl]anthracene, or dibenz[a,h]anthracene; or, hydrocarbons such as solvents; or Fischer Tropsch Products such as naphtha; or carbonaceous materials in the liquid, solid, or slurry form including coal or char.

A second reactor hydrocarbon valve (VB7) is positioned upstream of the fuel input (264) on the second reactor (200), and is configured to accept a signal (XB7) from a controller (CB7) to control the amount of fuel (262) supplied to the second reactor (200).

FIG. 19 refers to a second reactor feed zone cross-sectional view (XBZ-B) that will be elaborated upon in FIGS. 21 through 24. FIG. 19 also refers to a second reactor splash zone cross-sectional view (XBZ-C) that will be elaborated upon in FIG. 25.

Char (202) is introduced to the interior (201) of the second reactor (200) for intimate contact with the particulate heat transfer material (205) and reactants and oxygen-containing gas contained within the interior (201) to produce a second reactor product gas (222) that is discharged from the interior (201) of the second reactor (200) via a second reactor product gas output (224).

FIG. 20:
FIG. 20 shows a non-limiting embodiment of a second reactor feed zone cross-sectional view (XBZ-B) of the embodiment in FIG. 19, including: one first solids separation device (150); four second reactor char inputs (204A,204B, 204C,204D); four feed zone steam/oxygen inputs (BZB2, BZB3,BZB4,BZB5); and, where the combined reactor product gas conduit (230) is configured to blend the first reactor product gas (126) with the second reactor product gas (226).

FIG. 21:
FIG. 21 shows a non-limiting embodiment of a second reactor feed zone cross-sectional view (XBZ-B) of the embodiment in FIG. 19 where the first reactor product gas (126) is not combined with the second reactor product gas (226).

FIG. 22:
FIG. 22 shows a non-limiting embodiment of a second reactor feed zone cross-sectional view (XBZ-B) of the embodiment in FIG. 19, including: two first solids separation devices (150A1,150A2); two solids flow regulators (245A,245B); four second reactor char inputs (204A,204B, 204C,204D); four feed zone steam/oxygen inputs (BZB2, BZB3,BZB4,BZB5); and the combined reactor product gas conduit (230), configured to blend the first reactor product gas (126) with the second reactor product gas (226).

FIG. 23:
FIG. 23 shows a non-limiting embodiment of a second reactor feed zone cross-sectional view (XBZ-B) of the embodiment in FIG. 22 where the first reactor product gas (126) is not combined with the second reactor product gas (226).

FIG. 24:
FIG. 24 shows a non-limiting embodiment of a second reactor splash zone cross-sectional view (XBZ-C) of the embodiment in FIG. 19, including four splash zone steam/oxygen inputs (BZC2,BZC3,BZC4,BZC5).

FIG. 25:
FIG. 25 shows the non-limiting embodiment of FIG. 14 further including a first reactor (100), steam drum (425), and a front tubesheet heat exchanger (HX-A1A1) in thermal contact with the first reactor (100) and a rear tubesheet heat exchanger (HX-A1A2) in thermal contact with the first reactor (100).

The first reactor (100) disclosed in FIG. 7, 14, or 15, or 25 may use indirect heating to provide the energy required for the carbonaceous material-reactant reaction that may occur within the first interior (101). The heat is added by means of first reactor heat exchangers (HX-A1,HX-A2,HX-A3,HX-A4), which, as shown in one non-limiting embodiment of FIG. 14, may be submerged below the fluid bed level (L-A) of the first interior (101) of the first reactor (100).

In some embodiments, the first reactor heat exchangers (HX-A1,HX-A2,HX-A3,HX-A4) are that of the conventional fire tubes, heat pipes, electrical heaters, or the like. In some embodiments, and as depicted in FIG. 25, the first reactor heat exchangers (HX-A1,HX-A2,HX-A3,HX-A4) are pulse combustion devices operating in an oscillating flow environment to realize a high heat flux with a minimal surface area. The combustion stream flowing through the resonance tubes (113A,113B,113C,113D) indirectly heats the particulate heat transfer material (105) contained within the first interior (101) of the first reactor (100). In embodiments, particulate heat transfer material (105) may be heated within the first interior (101) of the first reactor (100) and then transferred to the second interior (201) of the second reactor (200) by any way of the first reactor product gas output (124), first solids separation device (150), dipleg (244), and char input (204) to the second reactor (200) for any such reason, such as for example purposes of regeneration of catalyst or sorbent activity.

In some embodiments, the first reactor heat exchanger (HX-A1,HX-A2,HX-A3,HX-A4) equipment design is the Helmholtz configuration consisting of hydrocarbon valve (VA7A,VA7B,VA7C,VA7D), an oxygen-containing gas valve (VA8A,VA8B,VA8C,VA8D), a combustion chamber (111A,111B,111C,111D), and resonance tubes (113A,113B, 113C,113D).

FIG. 25 shows the first reactor first heat exchanger (HX-A1) equipped with a combustion chamber (111A), resonance tubes (113A), and decoupler (117A).

The combustion chamber (111A) has a first hydrocarbon inlet (112A1), second hydrocarbon inlet (112A2), and an oxygen-containing gas inlet (112A3). Each hydrocarbon inlet (112A1,112A2) is configured to accept hydrocarbons (110AA) through a hydrocarbon input (3A-IN4A) and provided by way of a first hydrocarbon valve (VA7A) configured to accept a signal (XA7A,CA7B) from a controller (CA7A,CA7B).

The oxygen-containing gas inlet (112A3) is configured to accept an oxygen-containing gas (110BA) through an oxygen-containing gas input (3A-IN4B) and provided by way of a first oxygen-containing gas valve (VA8A) configured to accept a signal (XA8A) from a controller (CA8A).

In the Helmholtz pulse combustor, hydrocarbons and an oxygen-containing gas are mixed and then combusted within the combustion chamber (111A), and enter the resonance tubes (113A) where the amplitude of the oscillatory velocity increases and causes vigorous relative oscillatory motion between the inside heat transfer surface and the combustion stream (114A). In embodiments, the temperature (T3A) of the combustion chamber (111A) is higher than the temperature (T4A) within the decoupler (117A). In embodiments, the inlet temperature (T3A) is lesser than the outlet temperature (T4A).

To maintain structural integrity and extend the lifespan of the metal adjoining the front tubesheet (A1) with the resonance tubes (113A) a front tubesheet heat exchanger (HX-A1A1) is installed proximate to the combustion chamber (111A) and front tubesheet (A1).

The front tubesheet heat exchanger (HX-A1A1) is configured to remove heat released from the combustion of the hydrocarbons (110AA) and the oxygen-containing gas (110BA) within the combustion chamber (111A). The front tubesheet heat exchanger (HX-A1A1) has a heat transfer medium inlet (AF1) and a heat transfer medium outlet (AF2). The front tubesheet heat transfer medium inlet (AF1) is in fluid communication with the heat exchanger circuit water outlet (A1O) of the steam drum (425) and is configured to accept a front tubesheet heat transfer medium (AF). And in turn, the front tubesheet heat transfer medium (AF) entering the front tubesheet heat transfer medium inlet (AF1) in liquid phase exits the front tubesheet heat transfer medium outlet (AF2) as a first vapor phase.

The front tubesheet heat transfer medium outlet (AF2) is in fluid communication with the steam drum (425) via a heat exchanger circuit combined mixture inlet (A1F) and is configured to output a front tubesheet heat transfer medium outlet (AF2) as a first vapor phase.

The temperature of the combustion stream monotonically decreases along the length of the resonance tubes (113A, 113B,113C,113D), as heat is transferred from the combustion stream (114A) to the interior (101) of the first reactor (100) to heat the particulate heat transfer material (105) contained therein. In pulse combustion, however, not all the fuel burns in the combustion chamber (111A,111B,111C, 111D), and combustion persists for a significant length down the resonance tubes (113A,113B,113C,113D) in an oscillating flow field environment.

To maintain structural integrity and extend the lifespan of the metal adjoining the rear tubesheet (A2) with the resonance tubes (113A) a rear tubesheet heat exchanger (HX-A1A2) is installed proximate to the decoupler (117A) and rear tubesheet (A2). The rear tubesheet heat exchanger (HX-A1A2) is configured to remove heat released from the combustion of the hydrocarbons (110AA) and the oxygen-containing gas (110BA) within the combustion chamber (111A). The rear tubesheet heat exchanger (HX-A1A2) has a heat transfer medium inlet (AR1) and a heat transfer medium outlet (AR2).

The rear tubesheet heat transfer medium inlet (AR1) is in fluid communication with the heat exchanger circuit water outlet (A1O) of the steam drum (425) and is configured to accept a rear tubesheet heat transfer medium (AR). And in turn, the rear tubesheet heat transfer medium (AR) entering the rear tubesheet heat transfer medium inlet (AR1) in liquid phase exits the rear tubesheet heat transfer medium outlet (AR2) as a second vapor phase. Connection X8 indicates the front tubesheet heat transfer medium (AF) being introduced to the front tubesheet heat transfer medium inlet (AF1). Connection X9 indicates the output from the front tubesheet heat transfer medium outlet (AF2) being routed for blending with the discharge of the rear tubesheet heat transfer medium outlet (AR2) to form a heat exchanger circuit combined mixture (CM).

The rear tubesheet heat transfer medium outlet (AR2) is in fluid communication with the steam drum (425) via a heat exchanger circuit combined mixture inlet (A1F) and is configured to output a rear tubesheet heat transfer medium outlet (AR2) as a second vapor phase.

The steam drum (425) is preferably a horizontal or vertical cylindrical pressure vessel with a water inlet (413), a steam outlet (417), a heat exchanger circuit combined mixture inlet (A1F), and a heat exchanger circuit water outlet (A1O). The water inlet (413) is configured to accept a source of water (411) through a water input (3A-IN7). The steam drum (425) is equipped with a level sensor (LT1) to control the amount of water (411) that passes through the steam drum level valve (LV1). The steam drum (425) is equipped with a pressure sensor (PT1) to control the amount of steam (415) that passes through the steam drum pressure valve (PV1).

The temperature (T8) of the water (411) entering the steam drum (425) via the water inlet (413) is less than the temperature (T9) of the steam (415) exiting the steam drum (425) via the steam outlet (417). Steam (415) is discharged from the First Stage Product Gas Generation Control Volume (CV-3A) as a steam output (3A-OUT3) which in turn then enters the Second Stage Product Gas Generation Control Volume (CV-3B) as a steam input (3B-IN7).

FIG. 26:

FIG. 26 elaborates upon the non-limiting embodiment of FIG. 25 further showing the front tubesheet heat transfer medium outlet (AF2) and the rear tubesheet heat transfer medium outlet (AR2) both in fluid communication with the second reactor heat transfer medium inlet (212), such that at least a portion of fluid exiting the front tubesheet heat transfer medium outlet (AF2) and the rear tubesheet heat transfer medium outlet (AR2) is provided as at least a portion of said heat transfer medium (210) at the second reactor heat transfer medium inlet (212).

Steam (415) is discharged from the First Stage Product Gas Generation Control Volume (CV-3A) as a steam output (3A-OUT3) which in turn then enters the Second Stage Product Gas Generation Control Volume (CV-3B) as a steam input (3B-IN7). Connection X0 indicates the steam (415) en route to the inlet (212) of the second reactor heat exchanger (HX-B).

FIG. 27:

FIG. 27 shows a non-limiting embodiment of FIG. 26 further depicting a network of first reactor heat exchangers (HX-A1,HX-A2,HX-A3,HX-A4) including integral front tubesheet heat exchangers (HX-A1A1,HX-A2A1,HX-A3A1,HX-A4A1) and integral rear tubesheet heat exchangers (HX-A1A2,HX-A2A2,HX-A3A2,HX-A4A2) fluidly in communication with a steam drum (425) also showing a pump (430), sensors, and valves.

FIG. 27 indicates each first reactor heat exchanger (HX-A1,HX-A2,HX-A3,HX-A4) is equipped with a front tubesheet heat exchanger (HX-A1A1,HX-A2A1,HX-A3A1, HX-A4A1) in thermal contact with the first reactor (100) and comprising: a front tubesheet heat transfer medium inlet (AF1,BF1,CF1,DF1), and a front tubesheet heat transfer medium outlet (AF2,BF2,CF2,DF2) in fluid communication with the front tubesheet heat transfer medium inlet (AF1, BF1,CF1,DF1). And in turn, each front tubesheet heat transfer medium (AF,BF,CF,DF) entering the front tubesheet heat transfer medium inlet (AF1,BF1,CF1,DF1) in liquid phase exits the front tubesheet heat transfer medium outlet (AF2,BF2,CF2,DF2) as a first vapor phase.

In some embodiments, the hydrocarbons (110AA,110AB, 110AC,110AD) supplied to each first reactor heat exchanger (HX-A1,HX-A2,HX-A3,HX-A4) via hydrocarbon valve (VA7A,VA7B,VA7C,VA7D) is product gas, natural gas, any other such methane containing gas, a biogas, anaerobic digester off-gas, tail gas from a downstream Fischer-Tropsch Synthesis System (7000), or as shown in FIG. 32, a hydrocarbon output (8-OUT2), such as naphtha, from a downstream Upgrading System (8000).

The resonance tubes (113A,113B,113C,113D) of each first reactor heat exchanger (HX-A1,HX-A2,HX-A3,HX-A4) bundle can have as many as 1, 2, 8, 12, 61, 72, or 253 tubes per bundle. The resonance tubes (113A,113B,113C, 113D) may range from ⅜ inch to 1⅝ inch inside diameter, or greater and can be arranged in any variety of standard tubesheet layouts. A particularly common arrangement currently used is the so called triangular layout, in which the tubes are arranged in straight parallel rows and form equilateral. A second common arrangement is the square pitch layout, in which the tubes are arranged in squares. In addition, in some heat exchangers a variable tube count is used, in which the tubes are arranged in concentric rings, with the number of tubes per ring varied to produce a constant flow area between any two adjacent tubes in each ring.

The anticipated pulsation frequency is generally on the order of 58 Hz. The sound pressure level may vary from 165 dB (~1.5 psi peak-to-peak pressure fluctuation) and firing rate to about 173 dB (~4 psi peak-to-peak pressure fluctuation). The thermal response of the bed to pulsed heating is rapid with bed heat-up rates in the range of 50 to 200° F./h.

A steam drum pump (430) is configured to pump water from the steam drum (425) via a heat exchanger circuit water outlet (A1O) as a heat transfer medium to each front tubesheet heat exchanger (HX-A1A1,HX-A2A1,HX-A3A1, HX-A4A1) and rear tubesheet heat exchangers (HX-A1A2, HX-A2A2,HX-A3A2,HX-A4A2.

FIG. 28:

FIG. 28 elaborates upon the non-limiting embodiment of FIG. 14 further including two particulate classification vessels (A1A,A1B) that are configured to accept a bed material and inert feedstock contaminant mixture (A4A,A4AA) and a classifier gas (A16,A16A) and to clean and recycle the bed material portion back to the first interior (101) of the first reactor (100) while removing the inert feedstock contaminant portion from the system as a solids output (3A-OUT4).

The product gas generation and particulate classification system (1002) shown in FIG. 28 depicts a Product Gas Generation System (3A) configured to produce both a product gas (122) and classified inert feedstock contaminants (A19,A19A) from a carbonaceous material (102).

The system (1002) comprises a first reactor (100) having a first interior (101) and comprising: a first reactor carbonaceous material input (104) to the first interior (101); a first reactor reactant input (108) to the first interior (101); a first reactor product gas output (124) from the first interior (101); a classified recycled bed material input (A27) to the first interior; and, a bed material and inert feedstock contaminant mixture output (A2A,A2AA) from the first interior (101).

The system (1002) further comprises two particulate classification vessels (A1A,A1B) each having a classifier interior (INA,INB) and comprising: a bed material and inert feedstock contaminant mixture input (A5A,A5AA), a classifier gas input (A6A,A6AA), a classified recycled bed material output (A7A,A7AA), a classified recycled bed material input (A27,A27A), a classifier depressurization gas output (A8A,A8AA), and a classifier inert feedstock contaminant output (A9A,A9AA).

The system (1002) shown in FIG. 28 depicts one first reactor (100) equipped with two particulate classification vessels (A1A,A1B). Each particulate classification vessel (A1A,A1B) is equipped with a bed material and inert feedstock contaminant mixture input (A5A,A5AA) in fluid communication with the interior of the first reactor (101) through a bed material and inert feedstock contaminant mixture output (A2A,A2AA) and a bed material and inert feedstock contaminant mixture transfer conduit (A3A, A3AA). Each bed material and inert feedstock contaminant mixture input (A5A,A5AA) is configured to introduce a bed material and inert feedstock contaminant mixture (A4A, A4AA) to the interior (INA,INB) via a bed material and inert feedstock contaminant mixture transfer conduit (A3A, A3AA).

The bed material and inert feedstock contaminant mixture (A4A,A4AA) is comprised of a bed material portion and an inert feedstock contaminant portion. The bed material portion is synonymous with the first reactor particulate heat transfer material (105) and is comprised of Geldart Group A or Group B solids in the form of inert material or catalyst or sorbent or engineered particles.

MSW and/or RDF are carbonaceous materials that contains inert feedstock contaminants in the form of Geldart Group D particles comprising whole units and/or fragments of one or more from the group consisting of allen wrenches, ball bearings, batteries, bolts, bottle caps, broaches, bushings, buttons, cable, cement, chains, clips, coins, computer hard drive shreds, door hinges, door knobs, drill bits, drill bushings, drywall anchors, electrical components, electrical plugs, eye bolts, fabric snaps, fasteners, fish hooks, flash drives, fuses, gears, glass, gravel, grommets, hose clamps, hose fittings, jewelry, key chains, key stock, lathe blades, light bulb bases, magnets, metal audio-visual components, metal brackets, metal shards, metal surgical supplies, mirror shreds, nails, needles, nuts, pins, pipe fittings, pushpins, razor blades, reamers, retaining rings, rivets, rocks, rods, router bits, saw blades, screws, sockets, springs, sprockets, staples, studs, syringes, USB connectors, washers, wire, wire connectors, and zippers. Thus when MSW and/or RDF are transferred to the first reactor (100), inert feedstock contaminants contained therein are also unavoidably transferred to the first reactor (100) as well.

The inert feedstock contaminant portion of the MSW carbonaceous material (102) of FIG. 28 is that which cannot be converted into a product gas (122) and as a result, accumulates within the interior (101) of the first reactor (100). It is therefore desirable to be able to remove Geldart Group D inert feedstock contaminant solids which may accumulate within the first reactor (101). The accumulation of Geldart Group D inert feedstock contaminant solids within the first reactor (100) inhibits continuous operation of the first reactor (100) and may cause defluidization within the first reactor (100). Defluidization of the first reactor (100) may be caused by unpredictable and unavoidable buildup of larger Geldart particles, in comparison to the mean bed particle characteristic, introduced to the interior (101). For example, FIG. 28 depicts an interior (101) comprised of a fluidized bed of a mean bed particle characteristic of Geldart Group B solids which may become defluidized by buildup or accumulation of comparatively larger, coarser and/or heavier Geldart Group D solids that are introduced to the fluidized bed with the carbonaceous material (102).

The accumulation of Geldart Group D solids in a fluidized bed having a mean bed particle characteristic of Geldart Group B solids often results in high pressure drop across the fluidized bed and in turn demanding an increase in fluid bed minimum fluidization velocity resulting in a decrease in fluidization quality. For example, in applying the classification of gas/solid systems according to Geldart, if a fluidized bed contains mostly easily fluidized Geldart Group B particles, fluidization will diminish if Geldart Group D solids accumulate in the fluidized bed either through agglomeration of Geldart Group A or Geldart Group B or introduction of nonreactive and/or inert Geldart Group D particles into the fluidization reaction environment.

A mixture transfer valve (V9,V9A,V9AA) is interposed in each mixture transfer conduit (A3A,A3AA) in between the first reactor (100) and each particulate classification vessel (A1A,A1B) to start and stop flow of the contents transferred therein, and to isolate the particulate classification vessel (A1A,A1B) from the first reactor (100).

Each particulate classification vessel (A1A,A1B) is equipped with a classifier gas input (A6A,A6AA) configured to introduce a classifier gas (A16,A16A) to each interior (IN1,INB). The classifier gas input (A6A,A6AA) may be in fluid communication with the carbon dioxide output (6-OUT2) of a downstream Secondary Gas Clean-Up System (6000) and as a result, the classifier gas (A16,A16A) is preferably carbon dioxide. However, the classifier gas (A16,A16A) may be any gas as deemed appropriate, such as nitrogen, product gas, air, hydrocarbons, refinery off-gases, or the like.

A classification gas transfer valve (V10,V10A,V10AA) is configured to regulate classifier gas (A16,A16A) flow through the classifier gas input (A6A,A6AA) to the interior (INA,INB) of the particulate classification vessel (A1A, A1B). Each particulate classification vessel (A1A,A1B) is equipped with a classified recycled bed material output (A7A) in fluid communication with the interior (101) of the first reactor (100) via a classified recycled bed material input (A27,A27A) and a classifier riser (A17,A17A).

The classified recycled bed material input (A27,A27A) is preferably positioned at or above the fluid bed level (L-A) of the first reactor (100) so as to let the recycled bed material or particulate heat transfer material (105) to be recycled back to the interior (101) of the first reactor (100) in an unimpeded manner.

A bed material riser recycle transfer valve (V11,V11A, V11AA) is interposed in each classifier riser (A17,A17A) in between the first reactor (100) and each particulate classification vessel (A1A,A1B) to start and stop flow of the contents transferred therein, and to isolate the particulate classification vessel (A1A,A1B) from the first reactor (100).

Each particulate classification vessel (A1A,A1B) is equipped with a classifier inert feedstock contaminant output (A9A,A9AA) configured to remove classified inert feedstock contaminants (A19,A19A) from the interior (INA, INB).

An inert feedstock contaminant drain valve (V13A, V13AA) is configured to start and stop flow of classified inert feedstock contaminants (A19,A19A) transferring through the classifier inert feedstock contaminant output (A9A,A9AA).

Each particulate classification vessel (A1A,A1B) may also be equipped with a classifier depressurization gas output (A8A,A8AA) configured to evacuate classifier depressurization gas (A18,A18A) from the interior (INA, INB) thus reducing the pressure contained therein.

A depressurization vent valve (V12,V12A,V12AA) is configured to start and stop flow of classifier depressurization gas (A18,A18A) transferred through the classifier depressurization gas output (A8A,A8AA).

The classified recycled bed material output (A7A) is configured to output a classified recycled bed material (A37,A37A) to the interior (101) of the first reactor (100). In embodiments, the classifier riser (A17,A17A) conveys the classified recycled bed material (A37,A37A) to the interior (101) of the first reactor (100) in a suspension of gas (A16,A16A) and conveyed in a dilute-phase flow regime.

A carbonaceous material input (3A-IN1) is introduced to the as first reactor carbonaceous material input (104) and is configured to provide a carbonaceous material (102) to the feed zone (AZ-B) of the first reactor (100).

A carbonaceous material (102) is introduced to the interior (101) of the first reactor (100) for intimate contact with the heated particulate heat transfer material (105) and reactants and oxygen-containing gas contained within the interior (101) to produce a first reactor product gas (122) that is discharged from the interior (101) of the first reactor (100) via a first reactor product gas output (124).

FIG. 28 is to be used in conjunction with FIG. 29 which depicts a valve sequencing diagram that describes the method of operating the sequence of the product gas generation and particulate classification system (1002) embodiment shown in FIG. 28.

FIG. 28 shows one embodiment of the product gas generation and particulate classification system (1002) equipped with a variety of sensors, valves, assets and controllers which are all configured to methodically and systematically manipulate the operation of the particulate classification vessel (A1A,A1B) to accept a variety of inputs and discharge a variety of outputs to and from the first reactor (100).

The particulate classification vessel (A1A,A1B) is configured to accept the bed material and inert feedstock contaminant mixture (A4A,A4AA) transferred from the interior (101) of the first reactor (100). In embodiments, the bed material and inert feedstock contaminant mixture (A4A, A4AA) are conveyed in a dense phase flow regime through the mixture transfer conduit (A3A,A3AA) into the classifier interior (INA,INB). The bed material and inert feedstock contaminant mixture (A4A,A4AA) is comprised of a bed material portion and an inert feedstock contaminant portion. The bed material and inert feedstock contaminant mixture (A4A,A4AA) is transferred to the classifier interior (INA, INB) via a mixture transfer conduit (A3A,A3AA) and flow is regulated through modulation or actuation of an associated mixture transfer valve (V9A,V9AA).

The embodiment shown in FIG. 14 and FIG. 28 show the First reactor (100) having particulate heat transfer material (105) with a mean bed particle characteristic including Geldart Group B solids. Therefore the bed material portion of the mixture (A4A,A4AA) is comprised of Geldart Group B solids and the inert feedstock contaminant portion is comprised of Geldart Group D solids. The embodiment of FIG. 28 shows the classification vessel (A1A,A1B) configured to accept a classifier gas (A16,A16A), such as carbon dioxide, the supply of which is regulated through modulation or actuation of a classification gas transfer valve (V10A, V10AA).

In response to accepting the gas (A16,A16A), the classification vessel (A1A,A1B) is configured to output: (1) a bed material portion to be returned to the first reactor (100); and, (2) an inert feedstock contaminant portion to be discharged from the vessel (A1A,A1B). As a result, the bed material and inert feedstock contaminant mixture (A4A,A4AA), is cleaned to separate the bed material portion (Geldart Group B solids) from the inert feedstock contaminant portion (Geldart Group D solids). The cleaned and separated bed material portion (Geldart Group B solids) is then available to be used again in the first reactor (100) in a thermochemical process to generate a product gas.

The system in FIG. 28 displays a first reactor (100) configured to accept a carbonaceous material (100), such as MSW containing inert feedstock contaminants. The system in FIG. 28 also displays a first reactor (100) configured to accept both a first reactor reactant input (3A-IN2), such as steam, as well as an oxygen-containing gas input (3A-IN3). FIG. 32 and FIG. 33 display a Refinery Superstructure System (RSS) equipped with a Secondary Gas Clean-Up System (6000) configured to remove carbon dioxide from product gas. The Secondary Gas Clean-Up System (6000) has a carbon dioxide laden product gas input (6-IN1) and a carbon dioxide depleted product gas output (6-OUT1). Membrane based carbon dioxide removal systems and processes are preferred to remove carbon dioxide from product gas, however other alternate systems and methods may be utilized to remove carbon dioxide, not limited to adsorption or absorption based carbon dioxide removal systems and processes.

FIG. 32 and FIG. 33 display the Secondary Gas Clean-Up System (6000) discharging a carbon dioxide output (6-OUT2) to both the (1) First Stage Product Gas Generation System (3A), for use as a classifier gas (A16,A16A), and to the (2) the Feedstock Delivery System (2000) to be combined with a carbonaceous material. Thus FIG. 28 displays the product gas generation and particulate classification system (1002) in the context of a Refinery Superstructure System (RSS) as depicted in FIG. 32 and/or FIG. 33 and displays the introduction of the combined carbonaceous material and carbon dioxide into a first reactor via a carbonaceous material input (3A-IN1).

Thus FIG. 28 depicts the system (1002) configured to react the MSW carbonaceous material with steam, carbon dioxide, and an oxygen-containing gas in a thermochemical process to generate a first reactor product gas containing char. For example, in embodiments, the first reactor (100) in FIG. 28 operate under a combination of steam reforming, water-gas shift, dry reforming, and partial oxidation thermochemical processes. FIG. 28 also shows combustion taking place within the first reactor first heat exchangers (HX-A1,HX-A2, HX-A3, HX-A4) to indirectly heat the first reactor particulate heat transfer material (105) contained within the first reactor (100). The first reactor particulate heat transfer material (105) essentially is a bed material and inert feedstock contaminant mixture due to the introduction of MSW introduced to the reactor that contains inert feedstock contaminants that build up within the interior (101) of the first reactor (100).

The product gas shown generated in FIG. 28 contains carbon dioxide, which is then later separated out in the Secondary Gas Clean-Up System (6000) to allow the carbon dioxide to be recycled back to the (1) Feedstock Delivery System (2000) to be combined with a carbonaceous material for transfer to the first reactor (100), and the (2) First Stage Product Gas Generation System (3A) for use as a classifier gas (A16,A16A) to clean the bed material. Thus the first particulate heat transfer material may be cleaned with a gas, or a portion of the product gas generated in the first reactor (100), such as for example, the carbon dioxide portion of the product gas generated in the first reactor that is recycled from a downstream Secondary Gas Clean-Up System (6000).

The embodiment of FIG. 28 shows the bed material portion comprised of Geldart Group B solids free of inert contaminants, transferred and regulated through actuation or modulation of a bed material riser recycle transfer valve (V11A,V11AA) that is positioned on a classifier riser (A17, A17A).

The embodiment of FIG. 28 also shows the classification vessel (A1A,A1B) configured to transfer Geldart Group D solids free of Geldart Group B solids as an inert feedstock contaminant portion from the vessel (A1A,A1B) for removal from the via an inert feedstock contaminant drain valve (V13A,V13AA) positioned on the classifier inert feedstock contaminant output (A9A,A9AA).

FIG. 28 also shows a mass sensor (WT-1) positioned on the particulate classification vessel (A1B) to measure the mass of the bed material and inert feedstock contaminant mixture (A4AA) entering the particulate classification vessel (A1B). The mass sensor (WT-1) is also configured to measure the mass lost from the particulate classification vessel (A1B) due to the classified recycled bed material (A37A) transported to the first reactor (100) via the classifier riser (A17A) using the classifier gas (A16A) as the transport motive.

A depressurization vent valve (V12A,V12AA) may optionally be utilized to evacuate residual pressured gas from the contents of the classification vessel (A1A,A1B) to prevent erosion and solids abrasion of solids passing through the inert feedstock contaminant drain valve (V13A, V13AA).

In embodiments, FIG. 28 depicts a municipal solid waste (MSW) energy recovery system for converting MSW containing inert feedstock contaminants, into a product gas (122), the system comprising: (a) a first reactor (100) comprising: a first reactor interior (101) suitable for accommodating a bed material and endothermically reacting MSW in the presence of steam to produce product gas; a first reactor carbonaceous material input (104) for introducing MSW into the first reactor interior (101); a first reactor reactant input (108) for introducing steam into the first interior (101); a first reactor product gas output (124) through which product gas is removed; a classified recycled bed material input (A27, A27A) in fluid communication with an upper portion of the first reactor interior (101); a particulate output (A2A) connected to a lower portion of the first reactor interior, and through which a mixture of bed material and unreacted inert feedstock contaminants selectively exits the first reactor interior; and (b) a plurality of particulate classification vessels (A1A,A1B) in fluid communication with the first reactor interior, each vessel comprising: (i) a mixture input (A5A, A5AA) connected to the particulate output (A2A, A2AA), for receiving said mixture from the first reactor interior; (ii) a classifier gas input (A6A, A6AA) connected to a source of classifier gas (A16A, 16AA), for receiving classifier gas to promote separation of said bed material from said unreacted inert feedstock contaminants within said vessel; (iii) a bed material output (A7A, A7AA) connected to the classified recycled bed material input (A27, A27A) of the first reactor interior (101) via a classifier riser conduit (A17, A17A), for returning bed material separated from said mixture to the first reactor interior; and (iv) a contaminant output (A9A,A9AA) for removing unreacted inert feedstock contaminants (A19A, 19AA) which have been separated from said mixture, within the vessel.

In embodiments, FIG. 28 discloses a mixture transfer valve (V9A,V9AA) positioned between the particulate output (A2A, A2AA) and the mixture input (A5A, A5AA), to selectively control transfer of said mixture from the first reactor to the vessel; a classification gas transfer valve (V10A,V10AA) positioned between the source of classifier gas (A16A, 16AA) and the classifier gas input (A6A, A6AA), to selectively provide said classifier gas to the vessel; a bed material riser recycle transfer valve (V11A, V11AA) positioned between the bed material output (A7A, A7AA) and the classified recycled bed material input (A27, A27A), to selectively return bed material separated from said mixture, to the first reactor interior; and an inert feedstock contaminant drain valve (V13A,V13AA) configured to selectively remove unreacted inert feedstock contaminants (A19A, 19AA) which have been separated from said mixture. In embodiments, each vessel further comprises a classifier depressurization gas output (A8A,A8AA) and a depressurization vent valve (V12A,V12AA) connected to the classifier depressurization gas output (A8A,A8AA) to selectively vent the vessel.

In embodiments, FIG. 28 depicts a master controller configured to operate the system in any one of a plurality of states, including: a first state in which all of said valves are closed; a second state in which the mixture transfer valve (V9A,V9AA) is open and the remainder of said valves are closed, to allow said mixture to enter the vessel; a third state in which the classification gas transfer valve (V10A, V10AA) and the bed material riser recycle transfer valve (V11A,V11AA) are open and the remainder of said valves are closed, to promote separation of said bed material from said mixture and recycling of separated bed material back into the first reactor; a fourth state in which the depressurization vent valve (V12A,V12AA) is open and the remainder of said valves are closed, to allow the vessel to vent; and a fifth state in which the inert feedstock contaminant drain valve (V13A,V13AA) is open and the remainder of said valves are closed, to remove unreacted inert feedstock contaminants from the vessel. In embodiments, the classifier gas may be carbon dioxide. In embodiments, the product gas (122) generated comprises carbon dioxide and a first portion of the carbon dioxide in the product gas (122) may be introduced into the vessel as the classifier gas.

In embodiments, FIG. 28 further discloses that the inert feedstock contaminants comprise a plurality of different Geldart Group D solids having a size greater than 1000 microns; and the Geldart Group D solids may comprise whole units and/or fragments of one or more of the group consisting of allen wrenches, ball bearings, batteries, bolts, bottle caps, broaches, bushings, buttons, cable, cement, chains, clips, coins, computer hard drive shreds, door hinges, door knobs, drill bits, drill bushings, drywall anchors, electrical components, electrical plugs, eye bolts, fabric snaps, fasteners, fish hooks, flash drives, fuses, gears, glass, gravel, grommets, hose clamps, hose fittings, jewelry, key chains, key stock, lathe blades, light bulb bases, magnets, metal audio-visual components, metal brackets, metal shards, metal surgical supplies, mirror shreds, nails, needles, nuts, pins, pipe fittings, pushpins, razor blades, reamers, retaining rings, rivets, rocks, rods, router bits, saw blades, screws, sockets, springs, sprockets, staples, studs, syringes, USB connectors, washers, wire, wire connectors, and zippers.

In embodiments, the bed material separated from the mixture and returned to the first reactor interior may comprise Geldart Group A solids ranging in size from about 30 microns to about 99.99 microns. These Geldart Group A solids may comprise one or more of the group consisting of inert material, catalyst, sorbent, engineered particles and combinations thereof. The engineered particles comprise one or more of the group consisting of alumina, zirconia, sand, olivine sand, limestone, dolomite, catalytic materials, microballoons, microspheres, and combinations thereof.

In embodiments, the bed material separated from said mixture and returned to the first reactor interior may comprise Geldart Group B solids ranging in size from about 100 to about 999.99 microns. There Geldart Group B solids may be from one or more of group consisting of inert material, catalyst, sorbent, and engineered particles. These engineered particles may comprise one or more of the group consisting of alumina, zirconia, sand, olivine sand, limestone, dolomite, catalytic materials, microballoons, microspheres, and combinations thereof.

In embodiments, the first reactor is operated at a temperature between 320° C. and about 900° C. to endothermically react the MSW in the presence of steam to produce product gas. In embodiments, the first reactor operates at any combination or permutation of thermochemical reactions identified above.

In embodiments, FIG. 28 depicts a method for converting municipal solid waste (MSW) containing Geldart Group D inert feedstock contaminants, into a first reactor product gas (122), the method comprising: (a) introducing the MSW into a first interior (101) of a first reactor (100) containing bed material; (b) reacting the MSW with steam at a temperature between about 320° C. and about 900° C., to produce a first reactor product gas containing char; (c) removing a mixture of bed material and unreacted Geldart Group D inert feedstock contaminants from the first reactor; (d) separating the bed material from the unreacted Geldart Group D inert feedstock contaminants by entraining the bed material with a portion of the first reactor product gas; (e) returning the entrained bed material to the interior (101) of the first reactor (100), and not returning the unreacted Geldart Group D inert feedstock contaminants to said interior (101); wherein: the Geldart Group D inert feedstock contaminants comprise whole units and/or fragments of one or more from the group consisting of allen wrenches, ball bearings, batteries, bolts, bottle caps, broaches, bushings, buttons, cable, cement, chains, clips, coins, computer hard drive shreds, door hinges, door knobs, drill bits, drill bushings, drywall anchors, electrical components, electrical plugs, eye bolts, fabric snaps, fasteners, fish hooks, flash drives, fuses, gears, glass, gravel, grommets, hose clamps, hose fittings, jewelry, key chains, key stock, lathe blades, light bulb bases, magnets, metal audio-visual components, metal brackets, metal shards, metal surgical supplies, mirror shreds, nails, needles, nuts, pins, pipe fittings, pushpins, razor blades, reamers, retaining rings, rivets, rocks, rods, router bits, saw blades, screws, sockets, springs, sprockets, staples, studs, syringes, USB connectors, washers, wire, wire connectors, and zippers.

FIG. 29:

FIG. 29 depicts the Classification Valve States for Automated Controller Operation of a typical particulate classification procedure. FIG. 29 is to be used in conjunction with FIG. 28 and depicts a listing of valve states that may be used in a variety of methods to operate valves associated with the particulate classification vessels (A1A,A1B). FIG. 29 identifies five separate discrete valve states of which any number of states can be selected to result in a sequence of steps for the classification of bed material and recovery of inert feedstock contaminants to prevent defluidization within the first reactor (100).

In embodiments, methods may be implemented for operating the product gas generation and classification system depicted in FIG. 28 by using the discrete states listed in FIG. 29 to realize a sequence of steps. FIG. 28 depicts a master controller, such as a control computer (COMP) that is configured to communicate and cooperate with controllers and valves associated with the particulate classification vessels (A1A,A1B). The master control computer (COMP) may be configured to operate the system using any combinations and permutations of states listed in FIG. 29.

It is contemplated that in some embodiments, sequence steps of a classification method may be chosen from any number of states listed in FIG. 29. In embodiments, sequence steps of a classification method may be chosen from a combination of state 1, state 2, state 3, state 4, and/or state 5, and may incorporate methods or techniques described herein and to be implemented as program instructions and data capable of being stored or conveyed via a master controller. In embodiments, the classification sequence may have only five steps which entail each of the listed in FIG. 29, wherein: step 1 is state 1; step 2 is state 2; step 3 is state 3; step 4 is state 4; and, step 5 is state 5. This may be typical if a carbonaceous material comprising MSW is fed into the first reactor that has a relatively greater than average amount of inert feedstock contaminants, where states 1 through 3 are not repeated because a sufficient quantity of inert feedstock contaminants is sufficiently present within the classifier prior to proceeding with states 4 and state 5 to vent and drain the classifier, respectively.

In embodiments, state 1, state 2, and state 3 may be repeated at least once prior to implementing state 4 and state 5. For example, the classification sequence may have eight steps, wherein states 1 through 3 are repeated once prior to proceeding with state 4 and state 5, wherein: step 1 is state 1; step 2 is state 2; step 3 is state 3; step 4 is state 1; and step 5 is state 2; step 6 is state 3; step 7 is state 4; and, step 8 is state 5. Thus, a classification sequence may entail a multitude of different combinations and permutations of sequence steps given the operator or user defined states to be repeated. For example, from a practical perspective, if a carbonaceous material comprising MSW is fed into the first reactor that has a relatively minimal amount of inert feedstock contaminants, states 1 through 3 may be repeated at least once, or several times, to ensure that a sufficient quantity of inert feedstock contaminants is present within the classifier vessel prior to proceeding with states 4 and state 5 to vent and drain the classifier, respectively.

Nonetheless, any combination or permutation of classifier method states and steps may be selected by a user or operator to realize the goal of cleaning the first particulate heat transfer material with a gas, such as carbon dioxide recycled from a downstream Secondary Gas Clean-Up System (6000), in a systematic, logical, and directed manner.

Disclosed methods or techniques may include the execution and implementation of states associated with the Automated Controller Operated Classification Valve Sequence Matrix as depicted in FIG. 29. Embodiments of the sequencing methods including steps and states may be implemented by program instructions entered into the master control computer (COMP) by a user or operator via an input/output interface (I/O) as disclosed in FIG. 28. Program and sequencing instructions may be executed to perform a particular computational functions such as automated operation of the valves associated with the product gas generation and classification system as depicted in FIG. 28.

FIG. 28 depicts one exemplary embodiment of a master control computer (COMP) including a processor (PROC) coupled to a system memory (MEM) via an input/output interface (I/O). The processor (PROC) may be any suitable processor capable of executing instructions. System memory (MEM) may be configured to store instructions and data accessible by processor (PROC). In various embodiments, system memory (MEM) may be implemented using any suitable memory technology. In the illustrated embodiment, program instructions and data implementing desired functions, are shown stored within system memory (MEM) as code (CODE). In embodiments, the I/O interface (I/O) may be configured to coordinate I/O traffic between processor (PROC), and system memory (MEM). In some embodiments, the I/O interface (I/O) is configured for a user or operator to input necessary sequencing protocol into the master control computer (COMP) for process execution, including sequence timing, repetition of a given number of states to realize a desired sequence of steps and/or states. In embodiments, the mass sensor signal (XWT1) positioned on the classifier vessel may be an input value to be entered into the master control computer (COMP) by the I/O interface (I/O).

Thus, the system is fully flexible to be tuned, configured, an optimized to provide an environment for a scheduling the appropriate process parameters by programmatically controlling the opening and closing of valves at specific time intervals. In embodiments, a user or operator may define cycle times, step numbers, and states which may be programmed into the master control computer (COMP) by an operator accessible input/output interface (I/O). In embodiments, the signal from the mass sensor signal (XWT1) may be incorporated into the sequencing protocol to determine when the classification vessel is full or empty. In embodiments, the signal from the mass sensor signal (XWT1) is used to determine when to switch from classification state 3 to vent state 4 to avoid clogging of the classification vessel, or to prevent process upsets, and to facilitate process optimization.

The following describes various further embodiments of the systems and methods discussed above, and presents exemplary techniques and uses illustrating variations. Thus, the master control computer (COMP) may implement automation of the following controllers and their respective valves: mixture transfer valve controller (C9A,C9AA); classification gas transfer valve controller (C10A,C10AA); bed material riser recycle transfer valve controller (C11A, C11AA); depressurization vent valve controller (C12A, VC12AA); and, inert feedstock contaminant drain valve controller (C13A,C13AA).

Controllers are shown only on the first of two shown particulate classification vessels (A1A) for simplicity in FIG. 28. However, it is to be noted that the each valve depicted in FIG. 28 has an associated controller that acts in communication with the master control computer (COMP).
FIG. 30:

FIG. 30 shows a simplistic block flow control volume diagram of one embodiment of an two-stage energy integrated product gas generation system (1001) used as a Product Gas Generation System (3000). FIG. 30 depicts a one embodiment of a two-stage energy integrated product gas generation system (1001) in the context of a Product Gas Generation System (3000).

The Product Gas Generation Control Volume (CV-3000) of FIG. 30 is comprised of Product Gas Generation System (3000) including a First Stage Product Gas Generation System (3A) and a Second Stage Product Gas Generation System (3B) thermally integrated with one another and configured for the conversion of carbonaceous materials into product gas. A carbonaceous material (500) is provided to the Product Gas Generation Control Volume (CV-3000) through a carbonaceous material input (3-IN1) to realize a product gas output (3-OUT1). More specifically, a carbonaceous material (500) is provided to the First Stage Product Gas Generation System (3A) via a carbonaceous material input (3A-IN1).

The Second Stage Product Gas Generation System (3B) accepts the first reactor product gas output (3A-OUT1) as a first reactor product gas input (3B-IN1) and exothermically reacts a portion of the contents of the first reactor product gas input (3B-IN1) with oxygen-containing gas input (3B-IN3) to generate heat and product gas to be evacuated from the Second Stage Product Gas Generation System (3B) via a product gas output (3B-OUT1).

A second reactor heat exchanger (HX-B) is in thermal contact with the exothermic reaction taking place between at least a portion of the char contained within the product gas transferred through the first reactor product gas input (3B-IN1) with oxygen-containing gas input (3B-IN3) within the Second Stage Product Gas Generation System (3B). The second reactor heat exchanger (HX-B) is configured to accept a heat transfer medium, such as water or steam, at a second reactor inlet temperature (T1), from a second reactor heat transfer medium input (3B-IN2) and transfer heat from the exothermic reaction taking place between the Second Stage Product Gas Generation System (3B) to the contents of the heat transfer medium input (3B-IN2) to result in a second reactor heat transfer medium output (3B-OUT2) at second reactor outlet temperature T2 which is higher than the second reactor inlet temperature (T1).

The first reactor reactant input (3A-IN2) is in fluid communication with the second reactor heat transfer medium output (3B-OUT2) and is configured to introduce at least a portion of the contents therein into the First Stage Product Gas Generation System (3A) to react with the carbonaceous material (500) to realize a first reactor product gas output (3A-OUT1).

The second reactor reactant input (208) is in fluid communication with the second reactor heat transfer medium output (3B-OUT2) and is configured to introduce at least a portion of the contents therein into the Second Stage Product Gas Generation System (3B) to exothermically react with a portion of the contents of the first reactor product gas input (3B-IN1) to realize a product gas output (3B-OUT1).

A first reactor heat exchanger (HX-A) is in thermal contact with the First Stage Product Gas Generation System (3A) to provide the energy to endothermically react the carbonaceous material (500) with the first reactor reactant input (3A-IN2) to realize a first reactor product gas output (3A-OUT1).

The first reactor heat exchanger (HX-A) is comprised of a fuel input (3A-IN4) and a combustion products output (3A-OUT2) and is configured to combust the contents of the fuel input (3A-IN4) to indirectly heat the contents within the First Stage Product Gas Generation System (3A) which in turn then promotes the endothermic reaction between a portion of the contents of the second reactor heat transfer medium output (3B-OUT2) to react with the carbonaceous material (500) to realize a first reactor product gas output (3A-OUT1).

FIG. 31:

FIG. 31 shows an embodiment of a two-stage energy integrated product gas generation method. The Product Gas Generation System (3000) of FIG. 30 may be configured to employ the use of the two-stage energy integrated product gas generation method as elaborated upon in FIG. 31. In embodiments, the method depicted in FIG. 31 can be applied to the disclosed two-stage energy integrated product gas generation system (1001) including a first reactor (100), a first solids separation device (150), a second reactor (200), and a second reactor heat exchanger (HX-B) configured to transfer heat from the second reactor (200) to a heat transfer medium (210) for use as a reactant (106) in the first reactor (100). In embodiments, the method steps depicted in FIG. 31 may be used to describe the embodiment depicted in FIG. 30 showing a two-stage energy integrated product gas generation system (1001) used as a Product Gas Generation System (3000). In embodiments, the method depicted in FIG. 31 may be used to describe the operation of the embodiments of a Refinery Superstructure System (RSS) as indicated in FIGS. 32 and 33 where the First Stage Product Gas Generation System (3A) cooperates with the Second Stage Product Gas Generation System (3B) to realize thermal integration to ultimately produce a liquid fuel.

FIG. 31 discloses a method for producing a first reactor product gas and a second reactor product gas from a carbonaceous material using a first reactor (100) having a first interior (101) and a second reactor (200) having a second interior (201), the method comprising: (a) reacting carbonaceous material with steam in the first reactor to produce a first reactor product gas containing char; (b) separating char from the first reactor product gas; (c) reacting the separated char with an oxygen-containing gas in a second reactor to produce a second reactor product gas; (d) transferring heat from the second reactor through a heat exchanger to a heat transfer medium, the heat transfer medium comprising steam; and, (e) introducing at least a first portion of the steam that has been heated by the second reactor, into the first reactor, to react with the carbonaceous material; and, (f) introducing a second portion of the steam that is heated by the second reactor, back into the second interior of the second reactor, to react with the separated char.

FIG. 32:

FIG. 32 shows Product Gas Generation System (3000) of FIG. 30 utilized in the framework of an entire Refinery Superstructure System (RSS). In embodiments, the RSS system as shown in FIG. 32 may be configured to employ the use of the two-stage energy integrated product gas generation method as elaborated upon in FIG. 31.

The Refinery Superstructure System (RSS) of FIG. 32 is comprised of a: Feedstock Preparation System (1000) contained within a Feedstock Preparation Control Volume (CV-1000); a Feedstock Delivery System (2000) contained within a Feedstock Delivery Control Volume (CV-2000); a First Stage Product Gas Generation System (3A) contained within a First Stage Product Gas Generation Control Volume (CV-3A); a Second Stage Product Gas Generation System (3B) contained within a Second Stage Product Gas Generation Control Volume (CV-3B); a Primary Gas Clean-Up System (4000) contained within a Primary Gas Clean-Up Control Volume (CV-4000); a Compression System (5000) contained within a Compression Control Volume (CV-5000); a Secondary Gas Clean-Up System (6000) contained within a Secondary Gas Clean-Up Control Volume (CV-

6000); a Synthesis System (7000) contained within a Synthesis Control Volume (CV-7000); and, an Upgrading System (8000) contained within a Upgrading Control Volume (CV-8000).

The Feedstock Preparation System (1000) is configured to accept a carbonaceous material input (1-IN1) and discharge a carbonaceous material output (1-OUT1). Some typical sequence systems that might be utilized in the Feedstock Preparation System (1000) include, Large Objects Removal, Recyclables Removal, Ferrous Metal Removal, Size Reduction, Water Removal, Non-Ferrous Metal Removal, Polyvinyl Chloride Removal, Glass Removal, Size Reduction, and Pathogen Removal.

The Feedstock Delivery System (2000) is configured to accept a carbonaceous material input (2-IN1) from the output (1-OUT1) of the Feedstock Preparation System (1000) and blend the carbonaceous material from the input (2-IN1) with the carbon dioxide input (2-IN2) to realize a carbonaceous material output (2-OUT1).

The carbon dioxide input (2-IN2) to the Feedstock Delivery System (2000) is the carbon dioxide output (6-OUT2) from the downstream Secondary Gas Clean-Up System (6000).

The First Stage Product Gas Generation System (3A) is configured to accept the carbonaceous material output (2-OUT1) from the Feedstock Delivery System (2000) as a carbonaceous material input (3A-IN1) and react the carbonaceous material transported through the input (3A-IN1) with a reactant provided by the first reactor reactant input (3A-IN2) to generate a first reactor product gas output (3A-OUT1).

The First Stage Product Gas Generation System (3A) is also equipped with a gas input (3A-IN5) coming from the carbon dioxide output (6-OUT2) of the downstream Secondary Gas Clean-Up System (6000). The First Stage Product Gas Generation System (3A) is configured to output a solids (3A-OUT4) in the form of Geldart Group D solids in the form of inert feedstock contaminants.

The Second Stage Product Gas Generation System (3B) accepts the first reactor product gas output (3A-OUT1) as a first reactor product gas input (3B-IN1) and exothermically reacts a portion of the contents of the first reactor product gas input (3B-IN1) with oxygen-containing gas input (3B-IN3) to generate heat and product gas to be evacuated from the Second Stage Product Gas Generation System (3B) via a product gas output (3B-OUT1). The Second Stage Product Gas Generation System (3B) is also equipped with a gas input (3B-IN4) coming from the carbon dioxide output (6-OUT2) of the downstream Secondary Gas Clean-Up System (6000).

A second reactor heat exchanger (HX-B) is in thermal contact with the exothermic reaction taking place between at least a portion of the char contained within the product gas transferred through the first reactor product gas input (3B-IN1) with oxygen-containing gas input (3B-IN3) within the Second Stage Product Gas Generation System (3B). The second reactor heat exchanger (HX-B) is configured to accept a heat transfer medium, such as water, from a second reactor heat transfer medium input (3B-IN2) and transfer heat from the exothermic reaction taking place between the Second Stage Product Gas Generation System (3B) to the contents of the heat transfer medium input (3B-IN2) to result in a second reactor heat transfer medium output (3B-OUT2).

The first reactor reactant input (3A-IN2) is in fluid communication with the second reactor heat transfer medium output (3B-OUT2) and is configured to introduce at least a portion of the contents therein into the First Stage Product Gas Generation System (3A) to react with the carbonaceous material (500) to realize a first reactor product gas output (3A-OUT1).

The second reactor reactant input (208) is in fluid communication with the second reactor heat transfer medium output (3B-OUT2) and is configured to introduce at least a portion of the contents therein into the Second Stage Product Gas Generation System (3B) to exothermically react with a portion of the contents of the first reactor product gas input (3B-IN1) to realize a product gas output (3B-OUT1).

A first reactor heat exchanger (HX-A) is in thermal contact with the First Stage Product Gas Generation System (3A) to provide the energy to endothermically react the carbonaceous material (500) with the first reactor reactant input (3A-IN2) to realize a first reactor product gas output (3A-OUT1).

The first reactor heat exchanger (HX-A) is comprised of a fuel input (3A-IN4) and a combustion products output (3A-OUT2) and is configured to combust the contents of the fuel input (3A-IN4) to indirectly heat the contents within the First Stage Product Gas Generation System (3A) which in turn then promotes the endothermic reaction between a portion of the contents of the second reactor heat transfer medium output (3B-OUT2) to react with the carbonaceous material (500) to realize a first reactor product gas output (3A-OUT1).

The fuel input (3A-IN4) to the first reactor heat exchanger (HX-A) may be provided by the downstream Synthesis System (7000) as a first synthesis hydrocarbon output (7-OUT2) and may be comprised of Fischer-Tropsch products such as tail gas.

The fuel input (3A-IN4) to the first reactor heat exchanger (HX-A) may be provided by the downstream upgrading System (8000) as a first hydrocarbon output (8-OUT2) such as naphtha.

The Second Stage Product Gas Generation System (3B) is also configured to accept a fuel output (4-OUT2) such as char, SVOC, VOC, or solvent from a downstream Primary Gas Clean-Up System (4000) as a fuel input (3B-IN5).

The Primary Gas Clean-Up System (4000) is equipped to accept a product gas input (4-IN1) from the product gas output (3B-OUT1) of the Second Stage Product Gas Generation System (3B). The Primary Gas Clean-Up System (4000) may also be configured to generate electricity from a portion of the product gas through any conventional well-known system such as a gas turbine, combined cycle, and/or steam turbine.

The Primary Gas Clean-Up System (4000) is configured to reduce the temperature, remove solids, SVOC, VOC, and water from the product gas transported through the product gas input (4-IN1) to in turn discharge a product gas output (4-OUT1).

A fuel output (4-OUT2) Including VOC, SVOC, char, or solvent, may also be discharged from the Primary Gas Clean-Up System (4000) and introduced to the Second Stage Product Gas Generation System (3B) as a fuel input (3B-IN5).

The Compression System (5000) is configured to accept and increase the pressure of the product gas output (4-OUT1) from the Primary Gas Clean-Up System (4000) to in turn discharge a product gas output (5-OUT1).

The Secondary Gas Clean-Up System (6000) is configured to accept and remove at least carbon dioxide from the product gas output (5-OUT1) of the Compression System (5000) to output both a product gas output (6-OUT1) and a carbon dioxide output (6-OUT2).

The product gas output (6-OUT1) is routed to the downstream Synthesis System (7000) as a product gas input (7-IN1).

The carbon dioxide output (6-OUT2) may be routed upstream to either to the: Second Stage Product Gas Generation System (3B) as gas input (3B-IN4); First Stage Product Gas Generation System (3A) as a gas input (3A-IN5); or, the Feedstock Delivery System (2000) as a carbon dioxide input (2-IN2).

The Synthesis System (7000) is configured to accept the product gas output (6-OUT1) from the Secondary Gas Clean-Up System (6000) as a product gas input (7-IN1) and catalytically synthesize hydrocarbons from the product gas transferred through the input (7-IN1). In embodiments, the synthesis system contains a catalyst and can ethanol, mixed alcohols, methanol, dimethyl ether, Fischer-Tropsch products, or the like.

A synthesis product output (7-OUT1) is discharged from the Synthesis System (7000) and is routed to the Upgrading System (8000) where it is accepted as a synthesis product input (8-IN1).

A first synthesis hydrocarbon output (7-OUT2), including Fischer-Tropsch products, such as tail gas, may also be discharged from the Synthesis System (7000) for use as a fuel input (3A-IN4) in the first reactor first heat exchanger (HX-A) of the upstream First Stage Product Gas Generation System (3A).

The Upgrading System (8000) is configured to generate an upgraded product (1500) including renewable fuels and other useful chemical compounds, including alcohols, ethanol, gasoline, diesel and/or jet fuel, discharged via an upgraded product output (8-OUT1).

A first hydrocarbon output (8-OUT2), such as naphtha, may also be discharged from the Upgrading System (8000) for use as a fuel input (3A-IN4) in the first reactor first heat exchanger (HX-A) of the upstream First Stage Product Gas Generation System (3A).

FIG. 32 discloses a method of converting a carbonaceous material into at least one liquid fuel, the method comprising: (a) combining a carbonaceous material and carbon dioxide in a feedstock delivery system; (b) introducing the combined carbonaceous material and carbon dioxide into a first reactor containing a first particulate heat transfer material; (c) introducing steam into the first reactor; (d) reacting the carbonaceous material with steam and carbon dioxide in an endothermic thermochemical reaction to generate a first reactor product gas containing char; (e) introducing a portion of the char into a second reactor containing a second particulate heat transfer material; (f) introducing an oxygen-containing gas into the second reactor; (g) reacting the char with the oxygen-containing gas in the second reactor, in an exothermic thermochemical reaction to generate a second reactor product gas; (h) transferring heat, via a second reactor heat exchanger, from the exothermic thermochemical reaction to a first heat transfer medium in thermal contact with the second reactor, the heat transfer medium comprising steam; (i) introducing at least a portion of the heated first heat transfer medium into the first reactor for use as the source of steam in (c); (j) compressing the first and/or second reactor product gas to thereby form a compressed product gas; (k) removing carbon dioxide from the compressed product gas, and supplying at least a first portion of the removed carbon dioxide to the feedstock delivery system for combining with carbonaceous material in step (a); (l) reacting the compressed product gas with a catalyst after removing carbon dioxide; and, (m) synthesizing at least one liquid fuel from the compressed product gas, after reacting the compressed product gas with a catalyst.

FIG. 32 also discloses cleaning the first particulate heat transfer material with a second portion of the removed carbon dioxide, to remove inert feedstock contaminant from the first reactor. Cleaning the bed material with carbon dioxide to remove unreacted Geldart Group D inert feedstock contaminants can be accomplished through any disclosed system such as in referring to techniques, methods and systems disclosed in FIG. 28 and/or FIG. 29. The systems and methods disclosed in FIG. 28 and FIG. 29 describe several meritorious aspects and advantages for cleaning bed material contained within the first reactor with carbon dioxide to remove unreacted Geldart Group D inert feedstock contaminants.

FIG. 32, used in conjunction with FIG. 28 and FIG. 29, further discloses a method for converting municipal solid waste (MSW) into at least one liquid fuel, the MSW containing Geldart Group D inert feedstock contaminants, the method comprising: (i) combining the MSW and carbon dioxide in a feedstock delivery system; (ii) producing a first reactor product gas; (iii) compressing at least a portion of the first reactor product gas to thereby form a compressed product gas; (iv) removing carbon dioxide from the compressed product gas, and supplying a first portion of the removed carbon dioxide to the feedstock delivery system for combining with the MSW in step (i) and supplying a second portion of the removed carbon dioxide as said portion of the first reactor product gas for entraining the bed material in step (ii); (v) reacting the compressed product gas with a catalyst after removing carbon dioxide; and, (vi) synthesizing at least one liquid fuel from the compressed product gas, after reacting the compressed product gas with a catalyst.

FIG. 32, used in conjunction with FIG. 28 and FIG. 29, further discloses a method for converting municipal solid waste (MSW) into at least one liquid fuel, the MSW containing Geldart Group D inert feedstock contaminants, the method comprising: (a) combining the MSW and carbon dioxide in a feedstock delivery system; (b) introducing the combined MSW and carbon dioxide into a first interior (101) of a first reactor (100) containing bed material; (c) introducing steam into the first reactor; (d) reacting the MSW, with steam and carbon dioxide, in an endothermic thermochemical reaction to generate a first reactor product gas containing char and leaving unreacted Geldart Group D inert feedstock contaminants in the bed material; (e) cleaning the bed material with carbon dioxide to remove said unreacted Geldart Group D inert feedstock contaminants; (f) introducing a portion of the char into a second reactor containing a second particulate heat transfer material; (g) introducing an oxygen-containing gas into the second reactor; (h) reacting the char with the oxygen-containing gas in the second reactor, in an exothermic thermochemical reaction to generate a second reactor product gas; (i) compressing the first and/or second reactor product gas to thereby form a compressed product gas; (j) removing carbon dioxide from the compressed product gas, and supplying a first portion of the removed carbon dioxide to the feedstock delivery system for combining with the MSW in step (a); and supplying a second portion of the removed carbon dioxide to clean the bed material in step (e); (k) reacting the compressed product gas with a catalyst after removing carbon dioxide; and (l) synthesizing at least one liquid fuel from the compressed product gas, after reacting the compressed product gas with a catalyst; wherein: the Geldart Group D inert feedstock contaminants comprise whole units and/or fragments of one or more from the group consisting of allen wrenches, ball bearings, batteries, bolts, bottle caps, broaches, bushings, buttons, cable, cement, chains, clips, coins, computer hard drive shreds, door hinges, door knobs, drill bits, drill bushings, drywall anchors, electrical components, electrical plugs, eye bolts, fabric snaps, fasteners, fish hooks, flash drives, fuses, gears, glass, gravel, grommets, hose clamps, hose fittings, jewelry, key chains, key stock, lathe blades, light bulb bases, magnets, metal audio-visual components, metal brackets, metal shards, metal surgical supplies, mirror shreds, nails, needles, nuts, pins, pipe fittings, pushpins, razor blades, reamers, retaining rings, rivets, rocks, rods, router bits, saw blades, screws, sockets, springs, sprockets, staples, studs, syringes, USB connectors, washers, wire, wire connectors, and zippers.

FIG. 32, used in conjunction with FIG. 30 and FIG. 31, discloses a method of converting a carbonaceous material into at least one liquid fuel, the method comprising: (a) combining a carbonaceous material and carbon dioxide in a feedstock delivery system; (b) reacting carbonaceous material with steam in the first reactor to produce a first reactor product gas containing char; (c) separating char from the first reactor product gas; (d) reacting the separated char with an oxygen-containing gas in a second reactor to produce a second reactor product gas; (e) transferring heat from the second reactor through a heat exchanger to a heat transfer medium, the heat transfer medium comprising steam; (f) introducing at least a first portion of the steam that has been heated by the second reactor, into the first reactor, to react with the carbonaceous material; (g) compressing the first and/or second reactor product gas to thereby form a compressed product gas; (h) removing carbon dioxide from the compressed product gas, and supplying at least a first portion of the removed carbon dioxide to the feedstock delivery system for combining with carbonaceous material in step (a); (i) reacting the compressed product gas with a catalyst after removing carbon dioxide; and (j) synthesizing at least one liquid fuel from the compressed product gas, after reacting the compressed product gas with a catalyst.

FIG. 33:

FIG. 33 shows Primary Gas Clean-Up Heat Exchanger (HX-4) which is in fluid communication with the second reactor heat transfer medium inlet (212) and is configured to remove heat from at least a portion of the product gas input (4-IN1). In embodiments, the RSS system as shown in FIG. 32 may be configured to employ the use of the two-stage energy integrated product gas generation method as elaborated upon in FIG. 31.

FIG. 33 show that the heat transfer medium (210) received by said second reactor heat transfer medium inlet (212) at the second reactor inlet temperature (T1), is provided by a downstream heat exchanger associated with a primary gas clean-up system configured to clean up the product gas.

The product gas input (4-IN1) to the Primary Gas Clean-Up System (4000) comes into thermal contact with the Primary Gas Clean-Up Heat Exchanger (HX-4) to thus effectuate a reduction in temperature to realize a product gas output (4-OUT1) from the System (4000) at a temperature lesser than that of the input (4-IN1).

The Primary Gas Clean-Up Heat Exchanger (HX-4) comprises: a primary gas clean-up heat transfer medium input (4-IN2) configured to receive a heat transfer medium (210) at a primary gas clean-up inlet temperature (T0); and a primary gas clean-up heat transfer medium output (4-OUT3) configured to output the heat transfer medium (210), at a higher, primary gas clean-up outlet temperature (T1), which corresponds to the second reactor inlet temperature (T1).

The second reactor heat transfer medium inlet (212) is in fluid communication with the primary gas clean-up heat transfer medium output (4-OUT3) and is configured to accept at least a portion of said heat transfer medium (210) at a second reactor heat transfer medium input (3B-IN2), at said primary gas clean-up outlet temperature (T1).

It will be appreciated that the foregoing examples, given for purposes of illustration, are not to be construed as limiting the scope of this disclosure. Although only a few exemplary embodiments of this disclosure have been described in detail above, those skilled in the art will readily appreciate that many variation of the theme are possible in the exemplary embodiments without materially departing from the novel teachings and advantages of this disclosure. Accordingly, all such modifications are intended to be included within the scope of this disclosure that is defined in the following claims and all equivalents thereto. Further, it is recognized that many embodiments may be conceived in the design of a given system that do not achieve all of the advantages of some embodiments, yet the absence of a particular advantage shall not be construed to necessarily mean that such an embodiment is outside the scope of the present disclosure.

Although the foregoing text sets forth a detailed description of numerous different embodiments of the disclosure, it should be understood that the scope of the disclosure is defined by the words of the claims set forth at the end of this patent. The detailed description is to be construed as exemplary only and does not describe every possible embodiment of the disclosure because describing every possible embodiment would be impractical, if not impossible. Numerous alternative embodiments could be implemented, using either current technology or technology developed after the filing date of this patent, which would still fall within the scope of the claims defining the disclosure.

Thus, many modifications and variations may be made in the techniques and structures described and illustrated herein without departing from the spirit and scope of the present disclosure. Accordingly, it should be understood that the methods and apparatus described herein are illustrative only and are not limiting upon the scope of the disclosure.

Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the disclosure and does not pose a limitation on the scope of the disclosure otherwise claimed. No language in the specification should be construed as indicating any non-claimed element essential to the practice of the disclosure.

Groupings of alternative elements or embodiments of the disclosure disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

LISTING OF REFERENCE NUMERALS first reactor (100)
carbonaceous material (102A)
carbonaceous material (102B)
carbonaceous material (102C)
carbonaceous material (102D)
carbonaceous material (102E)
carbonaceous material (102F)
first interior (101)
carbonaceous material (102)
first reactor carbonaceous material input (104)
first reactor first carbonaceous material input (104A)
first reactor second carbonaceous material input (104B)
first reactor third carbonaceous material input (104C)
first reactor fourth carbonaceous material input (104D)
first reactor fifth carbonaceous material input (104E)
first reactor sixth carbonaceous material input (104F)
first reactor particulate heat transfer material (105)
first reactor reactant (106)
first reactor dense bed zone reactant (106A)
first reactor feed zone reactant (106B)
first reactor splash zone reactant (106C)
first reactor solids input (107)
first reactor reactant input (108)
first reactor dense bed zone reactant input (108A)
first reactor feed zone reactant input (108B)
first reactor splash zone reactant input (108C)
first reactor heat exchanger fuel (110)
first reactor first heat exchanger fuel (110A)
hydrocarbons (110AA)
hydrocarbons (110AB)
hydrocarbons (110AC)
hydrocarbons (110AD)
first reactor second heat exchanger fuel (110B)
oxygen-containing gas (110BA)
oxygen-containing gas (110BB)
oxygen-containing gas (110BC)
oxygen-containing gas (110BD)
first reactor third heat exchanger fuel (110C)
first reactor fourth heat exchanger fuel (110D)
first reactor first heat exchanger combustion chamber (111)
first reactor first heat exchanger combustion chamber (111A)
first reactor second heat exchanger combustion chamber (111B)
first reactor third heat exchanger combustion chamber (111C)
first reactor fourth heat exchanger combustion chamber (111D)
first reactor heat exchanger fuel inlet (112)
first reactor first heat exchanger fuel inlet (112A)
first hydrocarbon inlet (112A1)
second hydrocarbon inlet (112A2)
oxygen-containing gas inlet (112A3)
first reactor second heat exchanger fuel inlet (112B)
first hydrocarbon inlet (112B1)
second hydrocarbon inlet (112B2)
oxygen-containing gas inlet (112B3)
first reactor third heat exchanger fuel inlet (112C)
first hydrocarbon inlet (112C1)
second hydrocarbon inlet (112C2)
oxygen-containing gas inlet (112C3)
first reactor fourth heat exchanger fuel inlet (112D)
first hydrocarbon inlet (112D1)
second hydrocarbon inlet (112D2)
oxygen-containing gas inlet (112D3)
first heat exchanger resonance tubes (113)
first heat exchanger resonance tubes (113A)
second heat exchanger resonance tubes (113B)
third heat exchanger resonance tubes (113C)
fourth heat exchanger resonance tubes (113D)
combined combustion stream (114)
first reactor first heat exchanger combustion stream (114A)
first reactor second heat exchanger combustion stream (114B)
first reactor third heat exchanger combustion stream (114C)
first reactor fourth heat exchanger combustion stream (114D)
heat exchanger combustion stream outlet (116)
first reactor first heat exchanger combustion stream outlet (116A)
first reactor second heat exchanger combustion stream outlet (116B)
first reactor third heat exchanger combustion stream outlet (116C)
first reactor fourth heat exchanger combustion stream outlet (116D)
first reactor first heat exchanger decoupler (117)
first reactor first heat exchanger decoupler (117A)
first reactor second heat exchanger decoupler (117B)
first reactor second heat exchanger decoupler (117C)
first reactor fourth heat exchanger decoupler (117D)
first reactor oxygen-containing gas (118)
first reactor dense bed zone oxygen-containing gas (118A)
first reactor feed zone oxygen-containing gas (118B)
first reactor splash zone oxygen-containing gas (118C)
first reactor oxygen-containing gas input (120)
first reactor dense bed zone oxygen-containing gas input (120A)
first reactor feed zone oxygen-containing gas input (120B)
first reactor splash zone oxygen-containing gas input (120C)
first reactor product gas (122)
first reactor product gas (122A1)
first reactor product gas (122A2)
first reactor product gas output (124)
internal cyclone (125)
char depleted first reactor product gas (126)
char depleted first reactor product gas (126A1)
char depleted first reactor product gas (126A2)
char depleted first reactor product gas conduit (128)

char depleted first reactor product gas conduit (128A1)
char depleted first reactor product gas conduit (128A2)
first solids separation device (150)
first solids separation device (150A1)
first solids separation device (150A2)
first separation input (152)
first separation input (152A1)
first separation input (152A2)
first separation char output (154)
first separation char output (154A1)
first separation char output (154A2)
first separation gas output (156)
first separation gas output (156A1)
first separation gas output (156A2)
auxiliary heat exchanger combustion stream inlet (160)
auxiliary heat exchanger heat transfer medium (164)
auxiliary heat exchanger heat transfer medium inlet (166)
auxiliary heat exchanger combustion stream outlet (167)
auxiliary heat exchanger heat transfer medium outlet (168)
auxiliary heat exchanger heat transfer medium outlet conduit (170)
first reactor combined reactant conduit (172)
combined heat transfer medium conduit (174)
second reactor (200)
second interior (201)
char (202)
char (202A)
char (202B)
char (202C)
char (202D)
second reactor char input (204)
second reactor first char input (204A)
second reactor second char input (204B)
second reactor third char input (204C)
second reactor fourth char input (204D)
second reactor particulate heat transfer material (205)
second reactor reactant (206)
second reactor dense bed zone reactant (206A)
second reactor feed zone reactant (206B)
second reactor splash zone reactant (206C)
second reactor solids output (207)
second reactor reactant input (208)
second reactor dense bed zone reactant input (208A)
second reactor feed zone reactant input (208B)
second reactor splash zone reactant input (208C)
second reactor heat transfer medium (210)
second reactor heat transfer medium inlet (212)
second reactor heat transfer medium outlet (216)
second reactor oxygen-containing gas (218)
second reactor dense bed zone oxygen-containing gas (218A)
second reactor feed zone oxygen-containing gas (218B)
second reactor splash zone oxygen-containing gas (218C)
second reactor oxygen-containing gas input (220)
second reactor dense bed zone oxygen-containing gas input (220A)
second reactor feed zone oxygen-containing gas input (220B)
second reactor splash zone oxygen-containing gas input (220C)
second reactor product gas (222)
second reactor product gas output (224)
second internal cyclone (225)
solids depleted second reactor product gas (226)
solids depleted second reactor product gas conduit (228)
combined reactor product gas conduit (230)
second reactor separated solids (232)
solids transfer conduit (234)
riser (236)
riser connection (238)
riser conveying fluid (240)
terminal portion (242)
dipleg (244)
dipleg (244A)
dipleg (244B)
solids flow regulator (245)
first solids flow regulator (245A)
second solids flow regulator (245B)
solids flow regulator solids input (246)
first solids flow regulator solids input (246A)
second solids flow regulator solids input (246B)
solids flow regulator solids output (247)
first solids flow regulator solids output (247A)
second solids flow regulator solids output (247B)
third solids flow regulator solids output (247C)
fourth solids flow regulator solids output (247D)
solids flow regulator gas input (248)
solids flow regulator gas input (248A)
solids flow regulator gas input (248B)
solids flow regulator gas (249)
second solids separation device (250)
second separation input (252)
second separation solids output (254)
second separation gas output (256)
fuel (262)
fuel input (264)
water (411)
water inlet (413)
steam (415)
steam outlet (417)
steam drum (425)
steam drum pump (430)
carbonaceous material (500)
Feedstock Preparation System (1000)
two-stage energy integrated product gas generation system (1001)
product gas generation and particulate classification system (1002)
upgraded product (1500)
Feedstock Delivery System (2000)
Product Gas Generation System (3000)
Primary Gas Clean-Up System (4000)
Compression System (5000)
Secondary Gas Clean-Up System (6000)
Synthesis System (7000)
Upgrading System (8000)
carbonaceous material input (1-IN1)
carbonaceous material output (1-OUT1)
carbonaceous material input (2-IN1)
carbon dioxide input (2-IN2)
carbonaceous material output (2-OUT1)
First Stage Product Gas Generation System (3A)
carbonaceous material input (3A-IN1)
first reactor reactant input (3A-IN2)
oxygen-containing gas input (3A-IN3)
fuel input (3A-IN4)
hydrocarbon input (3A-IN4A)
oxygen-containing gas input (3A-IN4B)
gas input (3A-IN5)
solids input (3A-IN6)
water input (3A-IN7)
first reactor product gas output (3A-OUT1)
combustion products output (3A-OUT2)
steam output (3A-OUT3)

solids (3A-OUT4)
vent (3A-OUT5)
Second Stage Product Gas Generation System (3B)
first reactor product gas input (3B-IN1)
second reactor heat transfer medium input (3B-IN2)
oxygen-containing gas input (3B-IN3)
gas input (3B-IN4)
fuel input (3B-IN5)
combustion products input (3B-IN6)
steam input (3B-IN7)
product gas output (3B-OUT1)
second reactor heat transfer medium output (3B-OUT2)
solids output (3B-OUT3)
carbonaceous material input (3-IN1)
product gas output (3-OUT1)
product gas input (4-IN1)
primary gas clean-up heat transfer medium input (4-IN2)
product gas output (4-OUT1)
fuel output (4-OUT2)
primary gas clean-up heat transfer medium output (4-OUT3)
product gas input (5-IN1)
product gas output (5-OUT1)
product gas input (6-IN1)
product gas output (6-OUT1)
carbon dioxide output (6-OUT2)
product gas input (7-IN1)
synthesis product output (7-OUT1)
first synthesis hydrocarbon output (7-OUT2)
synthesis product input (8-IN1)
upgraded product output (8-OUT1)
first hydrocarbon output (8-OUT2)
front tubesheet (A1)
heat exchanger circuit combined mixture inlet (A1F)
heat exchanger circuit water outlet (A1O)
rear tubesheet (A2)
front tubesheet heat transfer medium (AF)
front tubesheet heat transfer medium inlet (AF1)
front tubesheet heat transfer medium outlet (AF2)
rear tubesheet heat transfer medium (AR)
rear tubesheet heat transfer medium inlet (AR1)
rear tubesheet heat transfer medium outlet (AR2)
dense bed zone (AZ-A)
dense bed zone steam/oxygen connection (AZA0)
dense bed zone steam/oxygen (AZA1)
dense bed zone steam/oxygen input (AZA2)
feed zone (AZ-B)
feed zone steam/oxygen connection (AZB0)
feed zone steam/oxygen (AZB1)
first feed zone steam/oxygen input (AZB2)
second feed zone steam/oxygen input (AZB3)
third feed zone steam/oxygen input (AZB4)
fourth feed zone steam/oxygen input (AZB5)
fifth feed zone steam/oxygen input (AZB6)
sixth feed zone steam/oxygen input (AZB7)
splash zone (AZ-C)
splash zone steam/oxygen connection (AZC0)
splash zone steam/oxygen (AZC1)
first splash zone steam/oxygen input (AZC2)
second splash zone steam/oxygen input (AZC3)
third splash zone steam/oxygen input (AZC4)
fourth splash zone steam/oxygen input (AZC5)
fifth splash zone steam/oxygen input (AZC6)
sixth splash zone steam/oxygen input (AZC7)
seventh splash zone steam/oxygen input (AZC8)
eighth splash zone steam/oxygen input (AZC9)
front tubesheet (B1)
rear tubesheet (B2)
front tubesheet heat transfer medium (BF)
front tubesheet heat transfer medium inlet (BF1)
front tubesheet heat transfer medium outlet (BF2)
rear tubesheet heat transfer medium (BR)
rear tubesheet heat transfer medium inlet (BR1)
rear tubesheet heat transfer medium outlet (BR2)
dense bed zone (BZ-A)
dense bed zone steam/oxygen connection (BZA0)
dense bed zone steam/oxygen (BZA1)
dense bed zone steam/oxygen (BZA2)
feed zone (BZ-B)
feed zone steam/oxygen connection (BZB0)
feed zone steam/oxygen (BZB1)
feed zone steam/oxygen input (BZB2)
feed zone steam/oxygen input (BZB3)
feed zone steam/oxygen input (BZB4)
feed zone steam/oxygen input (BZB5)
splash zone (BZ-C)
splash zone steam/oxygen connection (BZC0)
splash zone steam/oxygen (BZC1)
splash zone steam/oxygen input (BZC2)
splash zone steam/oxygen input (BZC3)
splash zone steam/oxygen input (BZC4)
splash zone steam/oxygen input (BZC5)
front tubesheet (C1)
rear tubesheet (C2)
front tubesheet heat transfer medium (CF)
front tubesheet heat transfer medium inlet (CF1)
front tubesheet heat transfer medium outlet (CF2)
heat exchanger circuit combined mixture (CM)
rear tubesheet heat transfer medium (CR)
rear tubesheet heat transfer medium inlet (CR1)
rear tubesheet heat transfer medium outlet (CR2)
Feedstock Preparation Control Volume (CV-1000)
Feedstock Delivery Control Volume (CV-2000)
Product Gas Generation Control Volume (CV-3000)
Primary Gas Clean-Up Control Volume (CV-4000)
Compression Control Volume (CV-5000)
Secondary Gas Clean-Up Control Volume (CV-6000)
Synthesis Control Volume (CV-7000)
Upgrading Control Volume (CV-8000)
First Stage Product Gas Generation Control Volume (CV-3A)
Second Stage Product Gas Generation Control Volume (CV-3B)
front tubesheet (D1)
rear tubesheet (D2)
front tubesheet heat transfer medium (DF)
front tubesheet heat transfer medium inlet (DF1)
front tubesheet heat transfer medium outlet (DF2)
restriction orifice differential pressure (DP-AB)
rear tubesheet heat transfer medium (DR)
rear tubesheet heat transfer medium inlet (DR1)
rear tubesheet heat transfer medium outlet (DR2)
freeboard zone (FB-A)
freeboard zone (FB-B)
auxiliary heat exchanger (HX-2)
Primary Gas Clean-Up Heat Exchanger (HX-4)
first reactor heat exchanger (HX-A)
first reactor first heat exchanger (HX-A1)
front tubesheet heat exchanger (HX-A1A1)
rear tubesheet heat exchanger (HX-A1A2)
first reactor second heat exchanger (HX-A2)
front tubesheet heat exchanger (HX-A2A1)
rear tubesheet heat exchanger (HX-A2A2)
first reactor third heat exchanger (HX-A3)
front tubesheet heat exchanger (HX-A3A1)

rear tubesheet heat exchanger (HX-A3A2)
first reactor fourth heat exchanger (HX-A4)
front tubesheet heat exchanger (HX-A4A1)
rear tubesheet heat exchanger (HX-A4A2)
second reactor heat exchanger (HX-B)
fluid bed level (L-A)
fluid bed level (L-B)
steam drum level sensor (LT1)
steam drum level valve (LV1)
first reactor pressure (P-A)
second reactor pressure (P-B)
steam drum pressure sensor (PT1)
steam drum pressure valve (PV1)
first quadrant (Q1)
second quadrant (Q2)
third quadrant (Q3)
fourth quadrant (Q4)
restriction orifice (RO-B)
Refinery Superstructure System (RSS)
Heat Exchanger (HX-4) heat transfer medium primary gas clean-up inlet temperature (T0)
heat transfer medium second reactor inlet temperature (T1)
heat transfer medium second reactor outlet temperature (T2)
first reactor heat exchanger fuel inlet temperature (T3)
first reactor first heat exchanger fuel inlet temperature (T3A)
first reactor second heat exchanger fuel inlet temperature (T3B)
first reactor third heat exchanger fuel inlet temperature (T3C)
first reactor heat exchanger combined combustion stream outlet temperature (T4)
first reactor first heat exchanger combustion stream outlet temperature (T4A)
first reactor second heat exchanger combustion stream outlet temperature (T4B)
first reactor third heat exchanger combustion stream outlet temperature (T4C)
first reactor fourth heat exchanger combustion stream outlet temperature (T4D)
first reactor auxiliary heat exchanger combustion stream outlet temperature (T5)
first reactor auxiliary heat exchanger heat transfer medium inlet temperature (T6)
first reactor auxiliary heat exchanger heat transfer medium outlet temperature (T7)
water steam drum inlet temperature (T8)
steam drum outlet temperature (T9)
first reactor temperature (T-A)
second reactor temperature (T-B)
first reactor dense bed zone reactant valve (VA1)
first reactor dense bed zone reactant valve controller (CA1)
first reactor dense bed zone reactant valve signal (XA1)
first reactor dense bed zone oxygen-containing gas valve (VA2)
first reactor dense bed zone oxygen-containing gas valve controller (CA2)
first reactor dense bed zone oxygen-containing gas valve signal (XA2)
first reactor feed zone reactant valve (VA3)
first reactor feed zone reactant valve controller (CA3)
first reactor feed zone reactant valve signal (XA3)
first reactor feed zone oxygen-containing gas valve (VA4)
first reactor feed zone oxygen-containing gas valve controller (CA4)
first reactor feed zone oxygen-containing gas valve signal (XA4)
first reactor splash zone reactant valve (VA5)
first reactor splash zone reactant valve controller (CA5)
first reactor splash zone reactant valve signal (XA5)
first reactor splash zone oxygen-containing gas valve (VA6)
first reactor splash zone oxygen-containing gas valve controller (CA6)
first reactor splash zone oxygen-containing gas valve signal (XA6)
first hydrocarbon valve (VA7A)
first hydrocarbon valve controller (CA7A)
first hydrocarbon valve signal (XA7A)
second hydrocarbon valve (VA7B)
second hydrocarbon valve controller (CA7B)
second hydrocarbon valve signal (XA7B)
third hydrocarbon valve (VA7C)
third hydrocarbon valve controller (CA7C)
third hydrocarbon valve signal (XA7C)
fourth hydrocarbon valve (VA7D)
fourth hydrocarbon valve controller (CA7D)
fourth hydrocarbon valve signal (XA7D)
first oxygen-containing gas valve (VA8A)
first oxygen-containing gas valve controller (CA8A)
first oxygen-containing gas valve signal (XA8A)
second oxygen-containing gas valve (VA8B)
second oxygen-containing gas valve controller (CA8B)
second oxygen-containing gas valve signal (XA8B)
third oxygen-containing gas valve (VA8C)
third oxygen-containing gas valve controller (CA8C)
third oxygen-containing gas valve signal (XA8C)
fourth oxygen-containing gas valve (VA8D)
fourth oxygen-containing gas valve controller (CA8D)
fourth oxygen-containing gas valve signal (XA8D)
second reactor heat transfer medium supply valve (VB0)
second reactor heat transfer medium supply valve controller (CB0)
second reactor heat transfer medium supply valve signal (XB0)
second reactor dense bed zone reactant valve (VB1)
second reactor dense bed zone reactant valve controller (CB1)
second reactor dense bed zone reactant valve signal (XB1)
second reactor dense bed zone oxygen-containing gas valve (VB2)
second reactor dense bed zone oxygen-containing gas valve controller (CB2)
second reactor dense bed zone oxygen-containing gas valve signal (XB2)
second reactor feed zone reactant valve (VB3)
second reactor feed zone reactant valve controller (CB3)
second reactor feed zone reactant valve signal (XB3)
second reactor feed zone oxygen-containing gas valve (VB4)
second reactor feed zone oxygen-containing gas valve controller (CB4)
second reactor feed zone oxygen-containing gas valve signal (XB4)
second reactor splash zone reactant valve (VB5)
second reactor splash zone reactant valve controller (CB5)
second reactor splash zone reactant valve signal (XB5)
second reactor splash zone oxygen-containing gas valve (VB6)
second reactor splash zone oxygen-containing gas valve controller (CB6)
second reactor splash zone oxygen-containing gas valve signal (XB6)
second reactor hydrocarbon valve (VB7)
second reactor hydrocarbon valve controller (CB7)
second reactor hydrocarbon valve signal (XB7)

connection (X0)
connection (X1)
connection (X2)
connection (X3)
connection (X4)
connection (X5)
connection (X6)
connection (X7)
connection (X8)
connection (X9)
first reactor feed zone cross-sectional view (XAZ-B)
first reactor splash zone cross-sectional view (XAZ-C)
second reactor feed zone cross-sectional view (XBZ-B)
second reactor splash zone cross-sectional view (XBZ-C)
classifier interior (INA,INB)
particulate classification vessel (A1A,A1B)
bed material and inert feedstock contaminant mixture output (A2A,A2AA)
bed material and inert feedstock contaminant mixture transfer conduit (A3A,A3AA)
bed material and inert feedstock contaminant mixture (A4A, A4AA)
bed material and inert feedstock contaminant mixture input (A5A,A5AA)
classifier gas input (A6A,A6AA)
classified recycled bed material output (A7A,A7AA)
classifier depressurization gas output (A8A,A8AA)
classifier inert feedstock contaminant output (A9A,A9AA)
classifier gas (A16,A16A)
classifier riser (A17,A17A)
classifier depressurization gas (A18,A18A)
classified inert feedstock contaminants (A19,A19A)
classified recycled bed material input (A27,A27A)
classified recycled bed material (A37,A37A)
mixture transfer valve (V9,V9A,V9AA)
mixture transfer valve controller (C9A,C9AA)
classification gas transfer valve (V10,V10A,V10AA)
classification gas transfer valve controller (C10A,C10AA)
bed material riser recycle transfer valve (V11,V11A, V11AA)
bed material riser recycle transfer valve controller (C11A, C11AA)
depressurization vent valve (V12,V12A,V12AA)
depressurization vent valve controller (C12A,VC12AA)
inert feedstock contaminant drain valve (V13,V13A, V13AA)
inert feedstock contaminant drain valve controller (C13A, C13AA)
mass sensor (WT-1)
mass sensor signal (XWT1)
master control computer (COMP)
processor (PROC)
memory (MEM)
input/output intercace (I/O)
code (CODE)

What is claimed is:

1. A two-stage product gas generation system (1001) configured to produce a product gas from a carbonaceous material (102), the system comprising:
(a) a first reactor (100) having a first interior (101) and comprising:
a first reactor carbonaceous material input (104) to the first interior (101);
a first reactor reactant input (108) to the first interior (101), and
a first reactor product gas output (124);
(b) a second reactor (200) having a second interior (201) and comprising:
a second reactor char input (204) to the second interior (201), said second reactor char input (204) being in fluid communication with the first reactor product gas output (124);
a second reactor oxygen-containing gas input (220) to the second interior (201);
a second reactor product gas output (224); and
a second reactor heat exchanger (HX-B) in the second interior (201);
(c) a first solids separation device (150) having:
a first separation input (152) in fluid communication with the first reactor product gas output (124);
a first separation char output (154) in fluid communication with the second reactor char input (204); and
a first separation gas output (156); and
(d) a second solids separation device (250) having:
a second separation input (252) in fluid communication with the second reactor product gas output (224);
a second separation solids output (254) in fluid communication with a solids transfer conduit (234); and
a second separation gas output (256);
wherein:
the second reactor heat exchanger (HX-B) comprises:
a second reactor heat transfer medium inlet (212) configured to receive a heat transfer medium (210) at a second reactor inlet temperature (TI); and
a second reactor heat transfer medium outlet (216) configured to output the heat transfer medium (210), at a higher, second reactor outlet temperature (T2);
the first reactor reactant input (108) is in fluid communication with the second reactor heat transfer medium outlet (216) and is configured to introduce at least a portion of said heat transfer medium (210) into the first interior (101) as a reactant (106) of the first reactor (100);
the first reactor is operated at a first reactor pressure; and
the second reactor is operated at a second reactor pressure, the first reactor pressure being greater than the second reactor pressure.

2. The two-stage product gas generation system (1001) according to claim 1, further comprising:
a second reactor reactant input (208) to the second interior (201); wherein:
the second reactor reactant input (208) is in fluid communication with the second reactor heat transfer medium outlet (216) and is configured to introduce at least a portion of said heat transfer medium (210) into the second interior (201) as a reactant of the second reactor (200).

3. The two-stage product gas generation system (1001) according to claim 1, further comprising:
a first reactor oxygen-containing gas input (120) to the first interior (101) and configured to receive a first reactor oxygen-containing gas (118).

4. The two-stage product gas generation system (1001) according to claim 1, further comprising:
a combined reactor product gas conduit (230) in fluid communication with both the first separation gas output (156) and the second separation gas output (256) and configured to combine product gas created by both the first reactor (100) and the second reactor (200).

5. The two-stage product gas generation system (1001) according to claim 1, wherein the first interior comprises:

a first reactor dense-bed zone (AZ-A);
a first reactor feed zone (AZ-B) located above the first reactor dense-bed zone; and
a first reactor splash zone (AZ-C) located above the first reactor feed zone.

6. The two-stage product gas generation system (1001) according to claim 5, further comprising:
   a first reactor dense-bed zone reactant input (108A) configured to receive a first reactor dense-bed zone reactant (106A) into the first reactor dense bed zone;
   a first reactor feed zone reactant input (108B) configured to receive a first reactor feed zone reactant (106B) into the first reactor feed zone; and
   a first reactor splash zone reactant input (108C) configured to receive a first reactor splash zone reactant (106C) into the first reactor splash zone.

7. The two-stage product gas generation system (1001) according to claim 6, further comprising:
   at least three first reactor feed zone reactant inputs; and
   at least three first reactor splash zone reactant inputs.

8. The two-stage product gas generation system (1001) according to claim 5, further comprising:
   a first reactor dense-bed zone oxygen-containing gas input (120A) configured to receive a first reactor oxygen-containing gas (118A) into the first reactor dense-bed zone;
   a first reactor feed zone oxygen-containing gas input (120B) configured to receive a first reactor feed zone oxygen-containing gas (118B into the first reactor feed zone; and
   a first reactor splash zone oxygen-containing gas input (120C) configured to receive a first reactor splash zone oxygen-containing gas (118C) into the first reactor splash zone.

9. The two-stage product gas generation system (1001) according to claim 8, comprising:
   at least three first reactor feed zone oxygen-containing gas inputs; and
   at least three first reactor splash zone oxygen-containing gas inputs.

10. The two-stage product gas generation system (1001) according to claim 1, wherein the second interior comprises:
    a second reactor dense-bed zone (BZ-A);
    a second reactor feed zone (BZ-B) located above the second reactor dense-bed zone; and
    a second reactor splash zone (BZ-C) located above the second reactor feed zone.

11. The two-stage product gas generation system (1001) according to claim 10, further comprising:
    a second reactor dense-bed zone reactant input (208A) configured to receive a second reactor dense-bed zone reactant (206A) into the second reactor dense-bed zone;
    a second reactor feed zone reactant input (208B) configured to receive a second reactor feed zone reactant (206B) into the second reactor feed zone; and
    a second reactor splash zone reactant input (208C) configured to receive a second reactor splash zone reactant (206C) into the second reactor splash zone.

12. The two-stage product gas generation system (1001) according to claim 11, further comprising:
    a second reactor dense-bed zone oxygen-containing gas input (220A) configured to receive a second reactor oxygen-containing gas (218A) into the second reactor dense-bed zone;
    a second reactor feed zone oxygen-containing gas input (220B) configured to receive a second reactor feed zone oxygen-containing gas (218B into the second reactor feed zone; and
    a second reactor splash zone oxygen-containing gas input (220C) configured to receive a second reactor splash zone oxygen-containing gas (218C) into the second reactor splash zone.

13. The two-stage product gas generation system (1001) according to claim 12, comprising:
    at least three second reactor feed zone oxygen-containing gas inputs; and
    at least three second reactor splash zone oxygen-containing gas inputs.

14. The two-stage product gas generation system (1001) according to claim 13, comprising:
    at least three second reactor feed zone reactant inputs; and
    at least three second reactor splash zone reactant inputs.

15. The two-stage product gas generation system (1001) according to claim 1, further comprising:
    a second reactor solids output (207); and
    a first reactor solids input (107) in fluid communication with the second reactor solids output (207), wherein:
    the first reactor solids input (107) is configured to receive, into the first interior (101), second reactor particulate heat transfer material (205) present in the second interior (201).

16. The two-stage product gas generation system (1001) according to claim 1, wherein the first reactor further comprises:
    a first reactor first heat exchanger (HX-A1) in thermal contact with the first interior (101), the first reactor first heat exchanger (HX-A1) comprising:
    a first reactor first heat exchanger fuel inlet (112A) configured to receive a first reactor first heat exchanger fuel (110A) at a first inlet temperature (T3A); and
    a first reactor first heat exchanger combustion stream outlet (116A) configured to output a first reactor first heat exchanger combustion stream (114A), at a first outlet temperature (T4A).

17. The two-stage product gas generation system (1001) according to claim 16, further comprising:
    an auxiliary heat exchanger (HX-2) external to the first reactor (100) and in thermal contact with the first reactor first heat exchanger combustion stream (114A) exiting the first reactor first heat exchanger combustion stream outlet (116A); wherein
    the auxiliary heat exchanger (HX-2) is configured to transfer heat from the first reactor first heat exchanger combustion stream (114A) to an auxiliary heat exchanger heat transfer medium (164) which exits the auxiliary heat exchanger (HX-2) via auxiliary heat exchanger heat transfer medium outlet conduit (170).

18. The two-stage product gas generation system (1001) according to claim 17, wherein:
    the auxiliary heat exchanger heat transfer medium outlet conduit (170) is in fluid communication with the first reactor reactant input (108) of the first reactor (100), to thereby supply the auxiliary heat exchanger heat transfer medium (164) as a reactant to the first reactor (100).

19. The two-stage product gas generation system (1001) according to claim 17, wherein:
    the auxiliary heat exchanger heat transfer medium outlet conduit (170) is in fluid communication with the second reactor heat transfer medium inlet (212), to thereby supply the auxiliary heat exchanger heat transfer medium (164) to the second reactor heat exchanger (HX-B).

20. The two-stage product gas generation system (1001) according to claim 16, wherein the first reactor comprises:
   two first reactor heat exchangers (HX-A1, HX-A2) positioned in the first interior (101) and vertically spaced apart from one another along a first height dimension of the first interior; wherein:
   alternate first reactor heat exchangers along said first height dimension are arranged cross-wise to one another such that, in a top view of the first interior, the four first reactor heat exchangers define four open vertically extending quadrants (Q1, Q2, Q3, Q4).

21. The two-stage product gas generation system (1001) according to claim 20, comprising:
   six first reactor carbonaceous material inputs (104A-104F) to the first interior (101); wherein:
   only two of the six first reactor carbonaceous material inputs are configured to inject carbonaceous material into the vertically extending quadrants (Q1, Q2, Q3, Q4).

22. The two-stage product gas generation system (1001) according to claim 16, further comprising:
   a front tubesheet heat exchanger (HX-A1 Al) in thermal contact with the first reactor (100) and comprising:
   a front tubesheet heat transfer medium inlet (AF1), and a front tubesheet heat transfer medium outlet (AF2) in fluid communication with the front tubesheet heat transfer medium inlet (AF1).

23. The two-stage product gas generation system (1001) according to claim 22, further comprising:
   a rear tubesheet heat exchanger (HX-A1 A2) in thermal contact with the first reactor (100), and comprising:
   a rear tubesheet heat transfer medium inlet (AR1), and a rear tubesheet heat transfer medium outlet (AR2) in fluid communication with rear tubesheet heat transfer medium inlet (AR1).

24. The two-stage product gas generation system (1001) according to claim 23, wherein:
   the front tubesheet heat transfer medium outlet (AF2) and the rear tubesheet heat transfer medium outlet (AR2) are both in fluid communication with the second reactor heat transfer medium inlet (212), such that:
   at least a portion of fluid exiting the front tubesheet heat transfer medium outlet (AF2) and the rear tubesheet heat transfer medium outlet (AR2) is provided as at least a portion of said heat transfer medium (210) at the second reactor heat transfer medium inlet (212).

25. The two-stage product gas generation system (1001) according to claim 24, further comprising a steam drum (425) having:
   one or more inlets in fluid communication with the front tubesheet heat transfer medium outlet (AF2) and the rear tubesheet heat transfer medium outlet (AR2); and
   one or more outlets in fluid communication with the second reactor heat transfer medium inlet (212).

26. The two-stage product gas generation system (1001) according to claim 25, wherein:
   a portion of the front tubesheet heat transfer medium (AF) entering the front tubesheet heat transfer medium inlet (AF1) in liquid phase exits the front tubesheet heat transfer medium outlet (AF2) as a first vapor phase;
   a portion of the rear tubesheet heat transfer medium (AR) entering the rear tubesheet heat transfer medium inlet (AR1) in liquid phase exits the rear tubesheet heat transfer medium outlet (AR2) as a second vapor phase; and
   the first and second vapor phases enter said steam drum (425).

27. The two-stage product gas generation system (1001) according to claim 1, wherein:
   the heat transfer medium (210) received by said second reactor heat transfer medium inlet (212) at said second reactor inlet temperature (T1) is provided by a downstream heat exchanger associated with a primary gas clean-up system configured to clean up said product gas.

28. A two-stage product gas generation system (1001) configured to produce a product gas from a carbonaceous material (102), the system comprising:
   (a) a first reactor (100) having a first interior (101) provided with a first dense-bed zone (AZ-A), a first feed zone (AZ-B) above the first dense-bed zone , and a first splash zone (AZ-C) above the first feed zone, the first reactor further comprising:
     a first reactor dense-bed zone reactant input (108A) to the first dense-bed zone (AZ-A);
     a first reactor feed zone reactant input (108B) to the first feed zone (AZ-B);
     a first reactor splash zone reactant input (108C) to the first splash zone (AZ-C);
     a first reactor carbonaceous material input (104) to the first feed zone (AZ-B); and
     a first reactor product gas output (124); and
   (b) a second reactor (200) having a second interior (201) provided with a second dense-bed zone (BZ-A), second feed zone (BZ-B) above the second dense-bed zone, and a second splash zone (BZ-C) above the second feed zone, the second reactor further comprising:
     a second reactor char input (204) to the second feed zone (BZ-B), said second reactor char input (204) being in fluid communication with the first reactor product gas output (124);
     a second reactor dense-bed zone reactant input (208A) to the second dense-bed zone (BZ-A);
     a second reactor feed zone reactant input (208B) to the second feed zone (BZ-B);
     a second reactor splash zone reactant input (208C) to the second splash zone (BZ-C);
     a second reactor dense-bed zone oxygen-containing gas input (220A) to the second dense-bed zone (BZ-A);
     a second reactor feed zone oxygen-containing gas input (220B) to the second feed zone (BZ-B);
     a second reactor splash zone oxygen-containing gas input (220C) to the second splash zone (BZ-C);
     a second reactor product gas output (224); and
     a second reactor heat exchanger (HX-B) in thermal contact with the second interior (201);
   wherein:
     the second reactor heat exchanger (HX-B) is configured to receive a heat transfer medium (210) at a second reactor inlet temperature (T1) and output the heat transfer medium (210), at a higher, second reactor outlet temperature (T2), via a second reactor heat transfer medium outlet (216); and
     the second reactor heat transfer medium outlet (216) is configured to be selectively in fluid communication with any combination of the first reactor dense-bed zone reactant input (108A), the first reactor feed zone reactant input (108B) and the first reactor splash zone reactant input (108C);

whereby:
   at least a portion of the heat transfer medium (210) is capable of being introduced into any combination of:
   (i) the corresponding first reactor dense-bed zone (AZ-A),
   (ii) the first reactor feed zone (AZ-B), and
   (iii) the first reactor splash zone (AZ-C).

29. The two-stage product gas generation system (1001) according to claim 28, wherein the first reactor (100) further comprises:
   a first reactor dense-bed oxygen-containing gas input (120A) selectively in fluid communication with an oxygen-containing gas;
   a first reactor feed zone oxygen-containing gas input (120B) selectively in fluid communication with an oxygen-containing gas; and
   a first reactor splash zone oxygen-containing gas input (120C) selectively in fluid communication with an oxygen-containing gas.

30. The two-stage product gas generation system (1001) according to claim 29, wherein the first reactor comprises:
   at least three first reactor feed zone oxygen-containing gas inputs (AZB2,AZB3,AZB4); and
   at least three first reactor splash zone oxygen-containing gas inputs (AZC2,AZC3,AZC4).

* * * * *